US009554405B2

(12) United States Patent
Weel

(10) Patent No.: US 9,554,405 B2
(45) Date of Patent: Jan. 24, 2017

(54) WIRELESS SPEAKER FOR RECEIVING FROM A MOBILE PHONE DIRECTIONS TO RECEIVE AND RENDER A PLAYLIST FROM A CONTENT SERVER ON THE INTERNET

(71) Applicant: Black Hills Media, LLC, Wilmington, DE (US)

(72) Inventor: Martin Weel, Silverado, CA (US)

(73) Assignee: Black Hills Media, LLC, Wilmington, DE (US)

( * ) Notice: Subject to any disclaimer, the term of this patent is extended or adjusted under 35 U.S.C. 154(b) by 0 days.

(21) Appl. No.: 14/835,818

(22) Filed: Aug. 26, 2015

(65) Prior Publication Data

US 2015/0365987 A1 Dec. 17, 2015

Related U.S. Application Data

(63) Continuation of application No. 14/311,690, filed on Jun. 23, 2014, which is a continuation of application
(Continued)

(51) Int. Cl.
*H04W 76/02* (2009.01)
*G06Q 30/06* (2012.01)
(Continued)

(52) U.S. Cl.
CPC .......... *H04W 76/021* (2013.01); *G06F 3/0488* (2013.01); *G06F 17/30772* (2013.01);
(Continued)

(58) Field of Classification Search
CPC ........ H04L 67/16; H04L 67/10; H04L 69/329; H04L 67/02; H04L 67/12; H04L 67/24; H04L 12/581; H04L 5/10; H04L 51/04; G06F 3/002; H04N 2005/4407; H04N 21/4662; Y10S 707/99933; G11B 27/34
See application file for complete search history.

(56) References Cited

U.S. PATENT DOCUMENTS 3,291,919 A 12/1966 Robitaille
3,609,227 A 9/1971 Kuljian
(Continued)

FOREIGN PATENT DOCUMENTS

CN 1276126 12/2000
CN 1477877 2/2004
(Continued)

OTHER PUBLICATIONS

Non-Published U.S. Appl. No. 09/653,964, "Multimedia and Computing System," Steve Perlman, filed Sep. 1, 2000 (first publicly available Mar. 30, 2010) 98 pages.
(Continued)

*Primary Examiner* — Ping Hsieh
*Assistant Examiner* — James Yang

(57) ABSTRACT

An apparatus for playing media includes a network transceiver for communicating with a remote control device and a server. The apparatus provides a device identifier to the remote control device, receives a playlist from the device, sends a media item identifier to a server, and receives a media item from the server. In some embodiments the apparatus is a standalone speaker device, the remote control is a touchscreen cellular phone, and the media item is an audio item. In other embodiments the apparatus is a television. In some embodiments the server comprises a playlist server and a content server. After joining a local network, the remote control is operable to control the apparatus without direct input at the device. In some embodiments the appa-
(Continued)

ratus receives the media item from the content server. In other embodiments the media item flows through the remote control.

25 Claims, 8 Drawing Sheets

Related U.S. Application Data

No. 13/207,113, filed on Aug. 10, 2011, now Pat. No. 8,214,873, which is a continuation of application No. 10/840,109, filed on May 5, 2004, now Pat. No. 8,028,323.

(51) Int. Cl.
| | | |
|---|---|---|
| G06F 3/0488 | (2013.01) | |
| G06F 17/30 | (2006.01) | |
| H04L 29/08 | (2006.01) | |
| H04M 1/725 | (2006.01) | |
| H04W 8/00 | (2009.01) | |

(52) U.S. Cl.
CPC ............ *G06Q 30/06* (2013.01); *H04L 67/02* (2013.01); *H04M 1/72558* (2013.01); *H04W 8/005* (2013.01)

(56) References Cited

U.S. PATENT DOCUMENTS

| | | |
|---|---|---|
| 4,357,710 A | 11/1982 | Kramer et al. |
| 4,682,370 A | 7/1987 | Matthews |
| 4,720,873 A | 1/1988 | Goodman et al. |
| 4,788,675 A | 11/1988 | Jones et al. |
| 4,829,500 A | 5/1989 | Saunders |
| 4,920,432 A | 4/1990 | Eggers et al. |
| 5,035,438 A | 7/1991 | Cronquist |
| 5,119,188 A | 6/1992 | McCalley et al. |
| 5,127,003 A | 6/1992 | Doll, Jr. et al. |
| 5,129,036 A | 7/1992 | Dean et al. |
| 5,132,992 A | 7/1992 | Yurt et al. |
| 5,134,719 A | 7/1992 | Mankovitz |
| 5,168,481 A | 12/1992 | Culbertson et al. |
| 5,189,630 A | 2/1993 | Barstow et al. |
| 5,191,573 A | 3/1993 | Hair |
| 5,192,999 A | 3/1993 | Graczyk et al. |
| 5,215,466 A | 6/1993 | Rubio |
| 5,262,875 A | 11/1993 | Mincer et al. |
| 5,282,028 A | 1/1994 | Johnson et al. |
| 5,305,438 A | 4/1994 | MacKay et al. |
| 5,349,678 A | 9/1994 | Morris et al. |
| 5,351,276 A | 9/1994 | Doll, Jr. et al. |
| 5,355,302 A | 10/1994 | Martin et al. |
| 5,396,417 A | 3/1995 | Burks et al. |
| 5,414,455 A | 5/1995 | Hooper et al. |
| 5,418,713 A | 5/1995 | Allen |
| 5,440,334 A | 8/1995 | Walters et al. |
| 5,440,336 A | 8/1995 | Buhro et al. |
| 5,442,701 A | 8/1995 | Guillou et al. |
| 5,455,570 A | 10/1995 | Cook et al. |
| 5,475,835 A | 12/1995 | Hickey |
| 5,481,535 A | 1/1996 | Hershey |
| 5,512,935 A | 4/1996 | Majeti et al. |
| 5,526,284 A | 6/1996 | Mankovitz |
| 5,534,913 A | 7/1996 | Majeti et al. |
| 5,539,635 A | 7/1996 | Larson, Jr. |
| 5,544,161 A | 8/1996 | Bigham et al. |
| 5,550,576 A | 8/1996 | Klosterman |
| 5,553,126 A | 9/1996 | Tang |
| 5,557,541 A | 9/1996 | Schulhof et al. |
| 5,568,645 A | 10/1996 | Morris et al. |
| 5,570,134 A | 10/1996 | Hong |
| 5,572,442 A | 11/1996 | Schulhof et al. |
| 5,577,128 A | 11/1996 | Farinelli |
| 5,581,461 A | 12/1996 | Coll et al. |
| 5,581,479 A | 12/1996 | McLaughlin et al. |
| 5,583,763 A | 12/1996 | Atcheson et al. |
| 5,592,511 A | 1/1997 | Schoen et al. |
| 5,594,779 A | 1/1997 | Goodman |
| 5,616,876 A | 4/1997 | Cluts |
| 5,617,565 A | 4/1997 | Augenbraun et al. |
| 5,618,045 A | 4/1997 | Kagan |
| 5,625,608 A | 4/1997 | Grewe et al. |
| 5,629,867 A | 5/1997 | Goldman |
| 5,636,211 A | 6/1997 | Newlin et al. |
| 5,640,193 A | 6/1997 | Wellner |
| 5,652,841 A | 7/1997 | Nemirovsky et al. |
| 5,654,886 A | 8/1997 | Zereski, Jr. et al. |
| 5,661,787 A | 8/1997 | Pocock |
| 5,671,436 A | 9/1997 | Morris et al. |
| 5,673,322 A | 9/1997 | Pepe et al. |
| 5,682,525 A | 10/1997 | Bouve et al. |
| 5,684,799 A | 11/1997 | Bigham et al. |
| 5,703,795 A | 12/1997 | Mankovitz |
| 5,706,427 A | 1/1998 | Tabuki |
| 5,710,970 A | 1/1998 | Walters et al. |
| 5,721,827 A | 2/1998 | Logan et al. |
| 5,727,048 A | 3/1998 | Hiroshima et al. |
| 5,732,216 A | 3/1998 | Logan et al. |
| 5,734,719 A | 3/1998 | Tsevdos et al. |
| 5,734,893 A | 3/1998 | Li et al. |
| 5,758,257 A | 5/1998 | Herz et al. |
| 5,768,527 A | 6/1998 | Zhu et al. |
| 5,781,889 A | 7/1998 | Martin |
| 5,790,426 A | 8/1998 | Robinson |
| 5,790,935 A | 8/1998 | Payton |
| 5,793,980 A | 8/1998 | Glaser et al. |
| 5,794,217 A | 8/1998 | Allen |
| 5,796,727 A | 8/1998 | Harrison et al. |
| 5,805,154 A | 9/1998 | Brown |
| 5,809,246 A | 9/1998 | Goldman |
| 5,812,765 A | 9/1998 | Curtis |
| 5,812,937 A | 9/1998 | Takahisa et al. |
| 5,815,662 A | 9/1998 | Ong |
| 5,818,510 A | 10/1998 | Cobbley et al. |
| 5,818,512 A | 10/1998 | Fuller |
| 5,819,160 A | 10/1998 | Foladare et al. |
| 5,819,273 A | 10/1998 | Vora et al. |
| 5,828,839 A | 10/1998 | Moncreiff |
| 5,832,499 A | 11/1998 | Gustman |
| 5,844,893 A | 12/1998 | Gollnick et al. |
| 5,850,340 A | 12/1998 | York |
| 5,852,610 A | 12/1998 | Olaniyan |
| 5,855,015 A | 12/1998 | Shoham |
| 5,857,149 A | 1/1999 | Suzuki |
| 5,862,171 A | 1/1999 | Mahany |
| 5,864,682 A | 1/1999 | Porter et al. |
| 5,870,390 A | 2/1999 | Campanella |
| 5,874,986 A | 2/1999 | Gibbon et al. |
| 5,878,223 A | 3/1999 | Becker et al. |
| 5,878,429 A | 3/1999 | Morris et al. |
| 5,880,721 A | 3/1999 | Yen |
| 5,884,048 A | 3/1999 | Takano |
| 5,884,282 A | 3/1999 | Robinson |
| 5,890,152 A | 3/1999 | Rapaport et al. |
| 5,903,892 A | 5/1999 | Hoffert et al. |
| 5,903,901 A | 5/1999 | Kawakura et al. |
| 5,905,865 A | 5/1999 | Palmer et al. |
| 5,907,831 A | 5/1999 | Lotvin et al. |
| 5,914,941 A | 6/1999 | Janky |
| 5,918,223 A | 6/1999 | Blum et al. |
| 5,920,856 A | 7/1999 | Syeda-Mahmood |
| 5,923,902 A | 7/1999 | Inagaki |
| 5,926,624 A | 7/1999 | Katz et al. |
| 5,930,765 A | 7/1999 | Martin |
| 5,933,822 A | 8/1999 | Braden-Harder et al. |
| 5,943,422 A | 8/1999 | Van Wie et al. |
| 5,948,084 A | 9/1999 | Ha |
| 5,949,492 A | 9/1999 | Mankovitz |
| 5,949,776 A | 9/1999 | Mahany et al. |
| 5,949,877 A | 9/1999 | Traw et al. |
| 5,953,005 A | 9/1999 | Liu |
| 5,956,716 A | 9/1999 | Kenner et al. |

(56) References Cited

U.S. PATENT DOCUMENTS

| | | |
|---|---|---|
| 5,959,945 A | 9/1999 | Kleiman |
| 5,968,120 A | 10/1999 | Guedalia |
| 5,973,722 A | 10/1999 | Wakai et al. |
| 5,973,724 A | 10/1999 | Riddle |
| 5,974,441 A | 10/1999 | Rogers et al. |
| 5,983,200 A | 11/1999 | Slotznick |
| 5,983,218 A | 11/1999 | Syeda-Mahmood |
| 5,986,692 A | 11/1999 | Logan et al. |
| 5,990,868 A | 11/1999 | Frederick |
| 5,991,306 A | 11/1999 | Burns et al. |
| 5,991,693 A | 11/1999 | Zalewski |
| 5,991,737 A | 11/1999 | Chen |
| 6,005,563 A | 12/1999 | White et al. |
| 6,006,225 A | 12/1999 | Bowman et al. |
| 6,009,422 A | 12/1999 | Ciccarelli |
| 6,012,086 A | 1/2000 | Lowell |
| 6,014,569 A | 1/2000 | Bottum |
| 6,018,768 A | 1/2000 | Ullman et al. |
| 6,026,150 A | 2/2000 | Frank et al. |
| 6,029,165 A | 2/2000 | Gable |
| 6,032,202 A | 2/2000 | Lea |
| 6,035,350 A | 3/2000 | Swamy et al. |
| 6,038,591 A | 3/2000 | Wolfe et al. |
| 6,038,601 A | 3/2000 | Kemper et al. |
| 6,038,668 A | 3/2000 | Chipman et al. |
| 6,041,311 A | 3/2000 | Chislenko et al. |
| 6,041,326 A | 3/2000 | Amro et al. |
| 6,051,389 A | 4/2000 | Ahl et al. |
| 6,055,566 A | 4/2000 | Kikinis |
| 6,060,997 A | 5/2000 | Taubenheim et al. |
| 6,064,379 A | 5/2000 | DeMoney |
| 6,067,562 A | 5/2000 | Goldman |
| 6,081,780 A | 6/2000 | Lumelsky |
| 6,081,830 A | 6/2000 | Schindler |
| 6,088,455 A | 7/2000 | Logan et al. |
| 6,088,722 A | 7/2000 | Herz et al. |
| 6,092,142 A | 7/2000 | Mehta |
| 6,093,880 A | 7/2000 | Arnalds |
| 6,104,334 A | 8/2000 | Allport |
| 6,105,060 A | 8/2000 | Rothblatt |
| 6,108,686 A | 8/2000 | Williams, Jr. |
| 6,122,658 A | 9/2000 | Chaddha |
| 6,122,757 A | 9/2000 | Kelley |
| 6,125,387 A | 9/2000 | Simonoff et al. |
| 6,127,941 A | 10/2000 | Van Ryzin |
| 6,128,663 A | 10/2000 | Thomas |
| 6,131,130 A | 10/2000 | Van Ryzin |
| 6,134,590 A | 10/2000 | Perlman |
| 6,144,375 A | 11/2000 | Jain et al. |
| 6,157,411 A | 12/2000 | Williams et al. |
| 6,160,997 A | 12/2000 | Oberlaender |
| 6,161,132 A | 12/2000 | Roberts |
| 6,161,142 A | 12/2000 | Wolfe et al. |
| 6,166,735 A | 12/2000 | Dom et al. |
| 6,167,393 A | 12/2000 | Davis, III et al. |
| 6,169,573 B1 | 1/2001 | Sampath-Kumar et al. |
| 6,182,128 B1 | 1/2001 | Kelkar et al. |
| 6,192,340 B1 | 2/2001 | Abecassis |
| 6,195,436 B1 | 2/2001 | Scibora et al. |
| 6,195,654 B1 | 2/2001 | Wachtel |
| 6,195,657 B1 | 2/2001 | Rucker et al. |
| 6,199,076 B1 | 3/2001 | Logan et al. |
| D440,553 S | 4/2001 | Bolas et al. |
| 6,212,282 B1 | 4/2001 | Mershon |
| 6,223,210 B1 | 4/2001 | Hickey |
| 6,226,672 B1 | 5/2001 | DeMartin et al. |
| 6,229,621 B1 | 5/2001 | Kulakowski et al. |
| 6,233,430 B1 | 5/2001 | Helferich |
| 6,233,682 B1 | 5/2001 | Fritsch |
| 6,243,725 B1 | 6/2001 | Hempleman et al. |
| 6,243,760 B1 | 6/2001 | Armbruster et al. |
| 6,246,672 B1 | 6/2001 | Lumelsky |
| 6,248,946 B1 | 6/2001 | Dwek |
| 6,253,069 B1 | 6/2001 | Mankovitz |
| 6,255,961 B1 | 7/2001 | Van Ryzin et al. |
| 6,256,303 B1 | 7/2001 | Drakoulis et al. |
| 6,256,554 B1 | 7/2001 | DiLorenzo |
| 6,263,503 B1 | 7/2001 | Margulis |
| 6,263,507 B1 | 7/2001 | Ahmad et al. |
| 6,289,165 B1 | 9/2001 | Abecassis |
| 6,292,786 B1 | 9/2001 | Deaton et al. |
| 6,295,093 B1 | 9/2001 | Park et al. |
| 6,295,555 B1 | 9/2001 | Goldman |
| 6,311,194 B1 | 10/2001 | Sheth et al. |
| 6,314,094 B1 | 11/2001 | Boys |
| 6,317,722 B1 | 11/2001 | Jacobi et al. |
| 6,317,784 B1 | 11/2001 | Mackintosh et al. |
| 6,334,127 B1 | 12/2001 | Bieganski et al. |
| 6,335,927 B1 | 1/2002 | Elliott et al. |
| 6,338,044 B1 | 1/2002 | Cook et al. |
| 6,339,693 B1 | 1/2002 | Chan |
| 6,344,607 B2 | 2/2002 | Cliff |
| 6,345,289 B1 | 2/2002 | Lotspiech et al. |
| 6,349,329 B1 | 2/2002 | Mackintosh et al. |
| 6,349,339 B1 | 2/2002 | Williams |
| 6,351,596 B1 | 2/2002 | Ostrover |
| 6,351,733 B1 | 2/2002 | Saunders et al. |
| 6,354,748 B1 | 3/2002 | Vrvilo |
| 6,372,974 B1 | 4/2002 | Gross et al. |
| 6,374,237 B1 | 4/2002 | Reese |
| 6,377,782 B1 | 4/2002 | Bishop et al. |
| 6,385,596 B1 | 5/2002 | Wiser et al. |
| 6,389,469 B1 | 5/2002 | Vekslar et al. |
| 6,407,750 B1 | 6/2002 | Gioscia et al. |
| 6,411,992 B1 | 6/2002 | Srinivasan et al. |
| 6,415,282 B1 | 7/2002 | Mukherjea et al. |
| 6,438,579 B1 | 8/2002 | Hosken |
| 6,446,080 B1 | 9/2002 | Van Ryzin et al. |
| 6,456,234 B1 | 9/2002 | Johnson |
| 6,460,076 B1 | 10/2002 | Srinivasan |
| 6,473,792 B1 | 10/2002 | Yavitz et al. |
| 6,477,707 B1 | 11/2002 | King et al. |
| 6,487,390 B1 | 11/2002 | Virine et al. |
| 6,496,122 B2 | 12/2002 | Sampsell |
| 6,496,802 B1 | 12/2002 | van Zoest et al. |
| 6,501,389 B1 | 12/2002 | Aguirre |
| 6,502,194 B1 | 12/2002 | Berman et al. |
| 6,505,123 B1 | 1/2003 | Root et al. |
| 6,505,160 B1 | 1/2003 | Levy et al. |
| 6,507,727 B1 | 1/2003 | Henrick |
| 6,519,770 B2 | 2/2003 | Ford |
| 6,526,335 B1 | 2/2003 | Treyz et al. |
| 6,526,411 B1 | 2/2003 | Ward |
| 6,546,421 B1 | 4/2003 | Wynblatt et al. |
| 6,546,555 B1 | 4/2003 | Hjelsvold et al. |
| 6,549,942 B1 | 4/2003 | Janky |
| 6,560,651 B2 | 5/2003 | Katz et al. |
| 6,567,847 B1 | 5/2003 | Inoue |
| 6,581,103 B1 | 6/2003 | Dengler |
| 6,587,127 B1 | 7/2003 | Leeke et al. |
| 6,600,898 B1 | 7/2003 | De Bonet et al. |
| 6,608,907 B1 | 8/2003 | Lee |
| 6,609,039 B1 | 8/2003 | Schoen |
| 6,609,096 B1 | 8/2003 | De Bonet et al. |
| 6,615,039 B1 | 9/2003 | Eldering |
| 6,622,018 B1 | 9/2003 | Erekson |
| 6,628,928 B1 | 9/2003 | Crosby et al. |
| 6,631,410 B1 | 10/2003 | Kowalski et al. |
| 6,640,145 B2 | 10/2003 | Hoffberg et al. |
| 6,643,376 B1 | 11/2003 | Ackerman |
| 6,647,389 B1 | 11/2003 | Fitch et al. |
| 6,647,411 B2 | 11/2003 | Towell et al. |
| 6,647,417 B1 | 11/2003 | Hunter et al. |
| 6,657,116 B1 | 12/2003 | Gunnerson |
| 6,662,231 B1 | 12/2003 | Drosset et al. |
| 6,670,537 B2 | 12/2003 | Hughes et al. |
| 6,675,015 B1 | 1/2004 | Martini et al. |
| 6,675,268 B1 | 1/2004 | DeKoning et al. |
| 6,675,384 B1 | 1/2004 | Block et al. |
| 6,678,215 B1 | 1/2004 | Treyz et al. |
| 6,684,249 B1 | 1/2004 | Frerichs et al. |
| 6,690,657 B1 | 2/2004 | Lau |
| 6,697,824 B1 | 2/2004 | Bowman-Amuah |
| 6,701,355 B1 | 3/2004 | Brandt et al. |

(56) References Cited

U.S. PATENT DOCUMENTS

| | | |
|---|---|---|
| 6,711,622 B1 | 3/2004 | Fuller et al. |
| 6,711,741 B2 | 3/2004 | Yeo |
| 6,721,403 B1 | 4/2004 | Mandalia |
| 6,725,461 B1 | 4/2004 | Dougherty et al. |
| 6,728,585 B2 | 4/2004 | Neoh |
| 6,741,869 B1 | 5/2004 | Lehr |
| 6,748,237 B1 | 6/2004 | Bates et al. |
| 6,754,468 B1 | 6/2004 | Sieben et al. |
| 6,769,028 B1 | 7/2004 | Sass et al. |
| 6,772,127 B2 | 8/2004 | Saunders et al. |
| 6,779,115 B1 | 8/2004 | Naim |
| 6,782,253 B1 | 8/2004 | Shteyn et al. |
| 6,792,280 B1 | 9/2004 | Hori et al. |
| 6,792,470 B2 | 9/2004 | Hakenberg et al. |
| 6,793,142 B2 | 9/2004 | Yap |
| 6,823,225 B1 | 11/2004 | Sass |
| 6,826,283 B1 | 11/2004 | Wheeler et al. |
| 6,829,475 B1 | 12/2004 | Lee et al. |
| 6,839,705 B1 | 1/2005 | Grooters |
| 6,853,841 B1 | 2/2005 | St. Pierre |
| 6,865,600 B1 | 3/2005 | Brydon et al. |
| 6,865,609 B1 | 3/2005 | Gubbi |
| 6,876,642 B1 | 4/2005 | Adams et al. |
| 6,876,643 B1 | 4/2005 | Aggarwal |
| 6,879,963 B1 | 4/2005 | Rosenberg |
| 6,882,299 B1 | 4/2005 | Allport |
| 6,882,641 B1 | 4/2005 | Gallick et al. |
| 6,892,230 B1 | 5/2005 | Gu |
| 6,925,489 B1 | 8/2005 | Curtin |
| 6,933,433 B1 | 8/2005 | Porteus et al. |
| 6,937,860 B2 | 8/2005 | Jahn |
| 6,946,988 B2 | 9/2005 | Edwards et al. |
| 6,947,571 B1 | 9/2005 | Rhoads et al. |
| 6,954,443 B2 | 10/2005 | Forstadius et al. |
| 6,954,763 B2 | 10/2005 | Nunome et al. |
| 6,970,127 B2 | 11/2005 | Rakib |
| 6,970,703 B2 | 11/2005 | Fuchs et al. |
| 6,973,476 B1 | 12/2005 | Naden et al. |
| 6,975,266 B2 | 12/2005 | Abraham et al. |
| 6,981,040 B1 | 12/2005 | Konig et al. |
| 6,982,780 B2 | 1/2006 | Morley et al. |
| 6,985,694 B1 | 1/2006 | De Bonet et al. |
| 6,990,208 B1 | 1/2006 | Lau et al. |
| 6,990,497 B2 | 1/2006 | O'Rourke et al. |
| 6,993,532 B1 | 1/2006 | Platt et al. |
| 6,999,783 B2 | 2/2006 | Toyryla et al. |
| 7,000,188 B1 | 2/2006 | Eustace |
| 7,010,263 B1 | 3/2006 | Patsiokas |
| 7,010,613 B2 | 3/2006 | Connor |
| 7,020,704 B1 | 3/2006 | Lipscomb et al. |
| 7,020,710 B2 | 3/2006 | Weber et al. |
| 7,022,905 B1 | 4/2006 | Hinman et al. |
| 7,028,082 B1 | 4/2006 | Rosenberg et al. |
| 7,028,327 B1 | 4/2006 | Dougherty et al. |
| 7,031,931 B1 | 4/2006 | Meyers |
| 7,035,871 B2 | 4/2006 | Hunt et al. |
| 7,035,912 B2 | 4/2006 | Arteaga |
| 7,043,477 B2 | 5/2006 | Mercer et al. |
| 7,047,092 B2 | 5/2006 | Wimsatt |
| 7,047,315 B1 | 5/2006 | Srivastava |
| 7,058,694 B1 | 6/2006 | De Bonet et al. |
| 7,061,482 B2 | 6/2006 | Ferris |
| 7,065,342 B1 | 6/2006 | Rolf |
| 7,065,579 B2 | 6/2006 | Traversat |
| 7,072,309 B2 | 7/2006 | Xie et al. |
| 7,072,932 B1 | 7/2006 | Stahl |
| 7,075,000 B2 | 7/2006 | Gang et al. |
| 7,076,204 B2 | 7/2006 | Richenstein |
| 7,076,523 B2 | 7/2006 | Schneider et al. |
| 7,079,807 B1 | 7/2006 | Daum et al. |
| 7,081,579 B2 | 7/2006 | Alcalde et al. |
| 7,099,296 B2 | 8/2006 | Belcea |
| 7,102,067 B2 | 9/2006 | Gang et al. |
| 7,103,643 B1 | 9/2006 | Jacobs et al. |
| 7,107,045 B1 | 9/2006 | Knoop |
| 7,109,975 B2 | 9/2006 | Fedorak et al. |
| 7,120,871 B1 | 10/2006 | Harrington |
| 7,130,608 B2 | 10/2006 | Hollstrom et al. |
| 7,130,616 B2 | 10/2006 | Janik |
| 7,133,924 B1 | 11/2006 | Rosenberg et al. |
| 7,134,040 B2 | 11/2006 | Ayres |
| 7,136,399 B2 | 11/2006 | Lanigan |
| 7,136,934 B2 | 11/2006 | Carter et al. |
| 7,139,770 B2 | 11/2006 | Nakase et al. |
| 7,143,939 B2 | 12/2006 | Henzerling |
| 7,149,983 B1 | 12/2006 | Robertson et al. |
| 7,152,110 B2 | 12/2006 | Pierce |
| 7,171,018 B2 | 1/2007 | Rhoads et al. |
| 7,171,491 B1 | 1/2007 | O'Toole et al. |
| 7,181,023 B1 | 2/2007 | Andrews |
| 7,187,947 B1 | 3/2007 | White et al. |
| 7,188,352 B2 | 3/2007 | Nathan et al. |
| 7,194,322 B2 | 3/2007 | Kaneko et al. |
| 7,203,838 B1 | 4/2007 | Glazer et al. |
| 7,206,838 B2 | 4/2007 | Boyd et al. |
| 7,215,949 B2 | 5/2007 | Sauriol |
| 7,218,611 B2 | 5/2007 | Mimura et al. |
| 7,228,054 B2 | 6/2007 | Cowgill |
| 7,237,198 B1 | 6/2007 | Chaney |
| 7,240,106 B2 | 7/2007 | Cochran et al. |
| 7,248,893 B2 | 7/2007 | Christensen et al. |
| 7,249,147 B2 | 7/2007 | Juszkiewicz |
| 7,249,367 B2 | 7/2007 | Bove, Jr. et al. |
| 7,260,638 B2 | 8/2007 | Crosbie |
| 7,269,854 B2 | 9/2007 | Simmons et al. |
| 7,277,765 B1 | 10/2007 | Beckmann et al. |
| 7,277,955 B2 | 10/2007 | Elliott |
| 7,281,034 B1 | 10/2007 | Eyal |
| 7,292,588 B2 | 11/2007 | Milley et al. |
| 7,293,277 B1 | 11/2007 | Nathan |
| 7,299,271 B2 | 11/2007 | Sato |
| 7,299,304 B2 | 11/2007 | Saint-Hilaire et al. |
| 7,301,900 B1 | 11/2007 | Laksono |
| 7,302,224 B2 | 11/2007 | Sibley |
| 7,308,489 B2 | 12/2007 | Weast |
| 7,325,043 B1 | 1/2008 | Rosenberg et al. |
| 7,340,768 B2 | 3/2008 | Rosenberger |
| 7,343,141 B2 | 3/2008 | Ellis et al. |
| 7,343,160 B2 | 3/2008 | Morton |
| 7,343,414 B2 | 3/2008 | Lipscomb et al. |
| 7,370,016 B1 | 5/2008 | Hunter et al. |
| 7,373,109 B2 | 5/2008 | Pohja et al. |
| 7,403,769 B2 | 7/2008 | Kopra et al. |
| 7,426,329 B2 | 9/2008 | Calhoon et al. |
| 7,428,023 B2 | 9/2008 | Allen et al. |
| 7,451,177 B1 | 11/2008 | Johnson et al. |
| 7,454,511 B2 * | 11/2008 | Weast ........................... 709/231 |
| 7,468,934 B1 | 12/2008 | Janik |
| 7,469,283 B2 | 12/2008 | Eyal et al. |
| 7,472,353 B1 | 12/2008 | Wolff et al. |
| 7,483,958 B1 | 1/2009 | Elabbady et al. |
| 7,490,171 B2 | 2/2009 | Saint-Hilaire et al. |
| 7,496,665 B2 | 2/2009 | Karaoguz et al. |
| 7,503,059 B1 | 3/2009 | Rothschild |
| 7,512,685 B2 | 3/2009 | Lunsford |
| 7,512,702 B1 | 3/2009 | Srivastava et al. |
| 7,516,212 B2 | 4/2009 | Nguyen et al. |
| 7,525,289 B2 | 4/2009 | Janik et al. |
| 7,533,091 B2 * | 5/2009 | Plastina et al. ............... 705/26.1 |
| 7,535,465 B2 | 5/2009 | Morse et al. |
| 7,555,543 B2 | 6/2009 | Encarnacion et al. |
| 7,567,987 B2 | 7/2009 | Shappell |
| 7,571,014 B1 | 8/2009 | Lambourne et al. |
| 7,590,084 B2 | 9/2009 | Perlman |
| 7,606,872 B2 | 10/2009 | Stevenson et al. |
| 7,627,343 B2 | 12/2009 | Fadell et al. |
| 7,643,894 B2 | 1/2010 | Braithwaite et al. |
| 7,647,385 B2 | 1/2010 | Encarnacion et al. |
| 7,652,844 B2 | 1/2010 | Edwards et al. |
| 7,660,601 B2 | 2/2010 | Janik et al. |
| 7,668,939 B2 * | 2/2010 | Encarnacion et al. ........ 709/220 |
| 7,688,803 B1 | 3/2010 | Young et al. |
| 7,693,992 B2 | 4/2010 | Watson |
| 7,698,723 B2 | 4/2010 | Hicks |

(56) References Cited

U.S. PATENT DOCUMENTS

| | | |
|---|---|---|
| 7,702,363 B2 | 4/2010 | Cao et al. |
| 7,702,403 B1 | 4/2010 | Gladwin et al. |
| 7,711,838 B1 | 5/2010 | Boulter et al. |
| 7,712,125 B2 | 5/2010 | Herigstad et al. |
| 7,734,688 B2 | 6/2010 | Langdon |
| 7,739,335 B2 | 6/2010 | Siegel et al. |
| 7,742,606 B2 | 6/2010 | Kreifeldt et al. |
| 7,768,234 B2 | 8/2010 | Janik et al. |
| 7,783,722 B1 | 8/2010 | Rosenberg et al. |
| 7,786,705 B2 | 8/2010 | Janik et al. |
| 7,797,272 B2 | 9/2010 | Picker et al. |
| 7,802,278 B2 | 9/2010 | Kweon |
| 7,827,110 B1 | 11/2010 | Wieder |
| 7,827,236 B2 | 11/2010 | Ferris |
| 7,827,581 B1 | 11/2010 | Eiger |
| 7,840,691 B1 | 11/2010 | De Bonet et al. |
| 7,856,485 B2 | 12/2010 | Prager et al. |
| 7,870,088 B1 | 1/2011 | Chen et al. |
| 7,890,661 B2 | 2/2011 | Spurgat et al. |
| 7,899,915 B2 | 3/2011 | Reisman |
| 7,904,579 B2 | 3/2011 | Janik et al. |
| 7,917,557 B2 | 3/2011 | Shteyn et al. |
| 7,917,645 B2 | 3/2011 | Ikezoye et al. |
| 7,920,824 B2 | 4/2011 | Janik et al. |
| 7,926,085 B2 | 4/2011 | Del Beccaro et al. |
| 7,928,310 B2 | 4/2011 | Georges et al. |
| 7,996,873 B1 | 8/2011 | Nathan et al. |
| 8,005,724 B2 | 8/2011 | Dunning et al. |
| 8,014,423 B2 | 9/2011 | Thaler et al. |
| 8,023,998 B2 | 9/2011 | Croome |
| 8,024,419 B2 | 9/2011 | Gudorf |
| 8,028,093 B2 | 9/2011 | Karaoguz et al. |
| 8,028,323 B2 | 9/2011 | Weel |
| 8,036,265 B1 | 10/2011 | Reynolds et al. |
| 8,045,952 B2 | 10/2011 | Qureshey et al. |
| 8,050,652 B2 | 11/2011 | Qureshey et al. |
| 8,082,355 B1 | 12/2011 | Weber et al. |
| 8,086,287 B2 | 12/2011 | Mooney |
| 8,135,796 B1 | 3/2012 | Abdelaziz et al. |
| 8,160,495 B2 | 4/2012 | Khedouri et al. |
| 8,214,873 B2 | 7/2012 | Weel |
| 8,281,001 B2 | 10/2012 | Busam et al. |
| 8,359,351 B2 | 1/2013 | Istvan et al. |
| 8,381,252 B2 | 2/2013 | Young |
| 8,433,240 B2 | 4/2013 | Slotznick |
| 8,832,746 B2 | 9/2014 | Pack et al. |
| 8,918,480 B2 | 12/2014 | Qureshey et al. |
| 2001/0005368 A1 | 6/2001 | Rune |
| 2001/0025259 A1 | 9/2001 | Rouchon |
| 2001/0034763 A1 | 10/2001 | Jacobs et al. |
| 2001/0039659 A1 | 11/2001 | Simmons et al. |
| 2001/0042107 A1 | 11/2001 | Palm |
| 2001/0042109 A1 | 11/2001 | Bolas et al. |
| 2001/0044321 A1 | 11/2001 | Ausems et al. |
| 2001/0051852 A1 | 12/2001 | Sundaravel et al. |
| 2001/0053994 A1 | 12/2001 | Atcheson et al. |
| 2001/0054060 A1 | 12/2001 | Fillebrown |
| 2002/0002039 A1 | 1/2002 | Qureshey et al. |
| 2002/0007418 A1 | 1/2002 | Hegde et al. |
| 2002/0010759 A1 | 1/2002 | Hitson et al. |
| 2002/0013852 A1 | 1/2002 | Janik |
| 2002/0022453 A1 | 2/2002 | Balog et al. |
| 2002/0023270 A1 | 2/2002 | Thomas et al. |
| 2002/0026442 A1 | 2/2002 | Lipscomb |
| 2002/0032019 A1 | 3/2002 | Marks et al. |
| 2002/0035616 A1 | 3/2002 | Diamond et al. |
| 2002/0040255 A1 | 4/2002 | Neoh |
| 2002/0042915 A1 | 4/2002 | Kubischta et al. |
| 2002/0048224 A1 | 4/2002 | Dygert et al. |
| 2002/0049037 A1 | 4/2002 | Christensen et al. |
| 2002/0049760 A1 | 4/2002 | Scott et al. |
| 2002/0053078 A1 | 5/2002 | Holtz et al. |
| 2002/0065902 A1 | 5/2002 | Janik et al. |
| 2002/0068558 A1 | 6/2002 | Janik |
| 2002/0072326 A1 | 6/2002 | Qureshey et al. |
| 2002/0073204 A1 | 6/2002 | Dutta et al. |
| 2002/0080719 A1 | 6/2002 | Parkvall et al. |
| 2002/0083148 A1 | 6/2002 | Hussain et al. |
| 2002/0087996 A1* | 7/2002 | Bi et al. ........................ 725/89 |
| 2002/0116082 A1 | 8/2002 | Gudorf |
| 2002/0122410 A1 | 9/2002 | Kulikov |
| 2002/0123276 A1 | 9/2002 | Peetz |
| 2002/0138630 A1 | 9/2002 | Solomon et al. |
| 2002/0144259 A1 | 10/2002 | Gutta et al. |
| 2002/0147782 A1 | 10/2002 | Dimitrova et al. |
| 2002/0161858 A1 | 10/2002 | Goldman |
| 2002/0165912 A1 | 11/2002 | Wenocur et al. |
| 2002/0166123 A1 | 11/2002 | Schrader et al. |
| 2002/0168938 A1 | 11/2002 | Chang |
| 2002/0170062 A1 | 11/2002 | Chen et al. |
| 2002/0173273 A1 | 11/2002 | Spurgat et al. |
| 2002/0173339 A1 | 11/2002 | Safadi |
| 2002/0174243 A1 | 11/2002 | Spurgat et al. |
| 2002/0174426 A1 | 11/2002 | Gutta et al. |
| 2002/0183059 A1 | 12/2002 | Noreen et al. |
| 2002/0184635 A1 | 12/2002 | Istvan |
| 2002/0194260 A1 | 12/2002 | Headley et al. |
| 2002/0194619 A1 | 12/2002 | Chang et al. |
| 2002/0199001 A1 | 12/2002 | Wenocur et al. |
| 2003/0014750 A1 | 1/2003 | Kamen |
| 2003/0014759 A1 | 1/2003 | Van Stam |
| 2003/0022675 A1 | 1/2003 | Mergler |
| 2003/0023427 A1 | 1/2003 | Cassin et al. |
| 2003/0041110 A1 | 2/2003 | Wenocur et al. |
| 2003/0045955 A1 | 3/2003 | Janik |
| 2003/0050062 A1 | 3/2003 | Chen et al. |
| 2003/0058805 A1 | 3/2003 | Meyerson |
| 2003/0060157 A1 | 3/2003 | Henrick |
| 2003/0080874 A1 | 5/2003 | Yumoto et al. |
| 2003/0088479 A1 | 5/2003 | Wooten et al. |
| 2003/0093790 A1 | 5/2003 | Logan et al. |
| 2003/0093797 A1 | 5/2003 | Bazzaz |
| 2003/0103627 A1 | 6/2003 | Nierzwick et al. |
| 2003/0103644 A1 | 6/2003 | Klayh |
| 2003/0115351 A1 | 6/2003 | Giobbi |
| 2003/0126211 A1 | 7/2003 | Anttila et al. |
| 2003/0126239 A1 | 7/2003 | Hwang |
| 2003/0126293 A1 | 7/2003 | Bushey |
| 2003/0130009 A1 | 7/2003 | Kung |
| 2003/0137531 A1 | 7/2003 | Katinsky et al. |
| 2003/0140343 A1 | 7/2003 | Falvo et al. |
| 2003/0147624 A1 | 8/2003 | Trajkovic et al. |
| 2003/0165128 A1 | 9/2003 | Sisodia |
| 2003/0177503 A1 | 9/2003 | Sull et al. |
| 2003/0182315 A1 | 9/2003 | Plastina et al. |
| 2003/0204439 A1 | 10/2003 | Cullen, III |
| 2003/0217102 A1 | 11/2003 | Jystad et al. |
| 2003/0225834 A1 | 12/2003 | Lee et al. |
| 2003/0227478 A1 | 12/2003 | Chatfield |
| 2003/0229549 A1 | 12/2003 | Wolinsky et al. |
| 2003/0229900 A1 | 12/2003 | Reisman |
| 2003/0236843 A1 | 12/2003 | Weber et al. |
| 2004/0002938 A1 | 1/2004 | Deguchi |
| 2004/0006634 A1 | 1/2004 | Ferris |
| 2004/0010798 A1 | 1/2004 | Galli et al. |
| 2004/0015401 A1 | 1/2004 | Lee et al. |
| 2004/0019497 A1 | 1/2004 | Volk et al. |
| 2004/0024912 A1 | 2/2004 | Fukao et al. |
| 2004/0030929 A1 | 2/2004 | Bi et al. |
| 2004/0031058 A1 | 2/2004 | Reisman |
| 2004/0055014 A1 | 3/2004 | Edelson |
| 2004/0057348 A1 | 3/2004 | Shetyn et al. |
| 2004/0078382 A1 | 4/2004 | Mercer et al. |
| 2004/0086120 A1 | 5/2004 | Akins, III et al. |
| 2004/0090984 A1 | 5/2004 | Saint-Hilaire et al. |
| 2004/0103280 A1 | 5/2004 | Balfanz et al. |
| 2004/0107219 A1 | 6/2004 | Rosenberger |
| 2004/0107242 A1 | 6/2004 | Vert et al. |
| 2004/0119894 A1 | 6/2004 | Higgins et al. |
| 2004/0121723 A1 | 6/2004 | Poltorak |
| 2004/0133914 A1 | 7/2004 | Smith et al. |
| 2004/0148393 A1 | 7/2004 | Breiter et al. |
| 2004/0160307 A1 | 8/2004 | Saikkonen et al. |
| 2004/0162830 A1 | 8/2004 | Shirwadkar et al. |

(56) References Cited

U.S. PATENT DOCUMENTS

| | | |
|---|---|---|
| 2004/0174863 A1 | 9/2004 | Caspi et al. |
| 2004/0181604 A1 | 9/2004 | Immonen |
| 2004/0186733 A1 | 9/2004 | Loomis et al. |
| 2004/0186887 A1* | 9/2004 | Galli et al. ............ 709/206 |
| 2004/0199494 A1 | 10/2004 | Bhatt |
| 2004/0205028 A1 | 10/2004 | Verosub et al. |
| 2004/0225519 A1 | 11/2004 | Martin |
| 2004/0225746 A1 | 11/2004 | Niell et al. |
| 2004/0246372 A1 | 12/2004 | Megeid |
| 2004/0249708 A1 | 12/2004 | Jacobs et al. |
| 2004/0255340 A1 | 12/2004 | Logan |
| 2004/0260407 A1 | 12/2004 | Wimsatt |
| 2004/0260786 A1 | 12/2004 | Barile |
| 2004/0267899 A1 | 12/2004 | Rahman et al. |
| 2004/0267965 A1 | 12/2004 | Vasudevan et al. |
| 2005/0021369 A1 | 1/2005 | Cohen et al. |
| 2005/0021470 A1 | 1/2005 | Martin et al. |
| 2005/0025320 A1 | 2/2005 | Barry |
| 2005/0033780 A1 | 2/2005 | Simelius et al. |
| 2005/0044561 A1 | 2/2005 | McDonald |
| 2005/0059379 A1 | 3/2005 | Sovio et al. |
| 2005/0060264 A1 | 3/2005 | Schrock et al. |
| 2005/0071881 A1 | 3/2005 | Deshpande |
| 2005/0091693 A1 | 4/2005 | Amine et al. |
| 2005/0113946 A9 | 5/2005 | Janik |
| 2005/0120373 A1 | 6/2005 | Thomas et al. |
| 2005/0149967 A1 | 7/2005 | Hanley et al. |
| 2005/0160270 A1 | 7/2005 | Goldberg et al. |
| 2005/0165888 A1 | 7/2005 | Elliott |
| 2005/0187976 A1 | 8/2005 | Goodman et al. |
| 2005/0196153 A1 | 9/2005 | Bullwinkle et al. |
| 2005/0198233 A1 | 9/2005 | Manchester et al. |
| 2005/0210507 A1 | 9/2005 | Hawkins et al. |
| 2005/0234995 A1 | 10/2005 | Plastina et al. |
| 2005/0240494 A1 | 10/2005 | Cue et al. |
| 2005/0240959 A1 | 10/2005 | Kuhn et al. |
| 2005/0245233 A1 | 11/2005 | Anderson |
| 2005/0251453 A1 | 11/2005 | Lu |
| 2005/0251565 A1 | 11/2005 | Weel |
| 2005/0251566 A1 | 11/2005 | Weel |
| 2005/0251576 A1 | 11/2005 | Weel |
| 2005/0251807 A1 | 11/2005 | Weel |
| 2005/0262204 A1 | 11/2005 | Szeto et al. |
| 2005/0278380 A1 | 12/2005 | Ferris |
| 2006/0020662 A1 | 1/2006 | Robinson |
| 2006/0059260 A1 | 3/2006 | Kelly et al. |
| 2006/0072724 A1 | 4/2006 | Cohen et al. |
| 2006/0085821 A9 | 4/2006 | Simmons et al. |
| 2006/0135059 A1 | 6/2006 | Hill |
| 2006/0156346 A1 | 7/2006 | Kulakowski |
| 2006/0168264 A1 | 7/2006 | Baba et al. |
| 2006/0174348 A1 | 8/2006 | Rhoads et al. |
| 2006/0212442 A1 | 9/2006 | Conrad et al. |
| 2006/0212444 A1 | 9/2006 | Handman et al. |
| 2006/0218180 A1 | 9/2006 | Bodlaender et al. |
| 2006/0256669 A1 | 11/2006 | Sakuma et al. |
| 2006/0287746 A1 | 12/2006 | Braithwaite et al. |
| 2007/0038999 A1 | 2/2007 | Millington |
| 2007/0078660 A1 | 4/2007 | Ferris |
| 2007/0088804 A1 | 4/2007 | Qureshey et al. |
| 2007/0089132 A1 | 4/2007 | Qureshey et al. |
| 2007/0089135 A1 | 4/2007 | Qureshey et al. |
| 2007/0180063 A1 | 8/2007 | Qureshey et al. |
| 2007/0247979 A1 | 10/2007 | Brillon et al. |
| 2008/0033821 A1 | 2/2008 | Jacobi et al. |
| 2008/0109095 A1 | 5/2008 | Braithwaite et al. |
| 2008/0114481 A1 | 5/2008 | Braithwaite et al. |
| 2008/0133520 A1 | 6/2008 | Hempleman et al. |
| 2009/0077041 A1 | 3/2009 | Eyal et al. |
| 2009/0193472 A1 | 7/2009 | Braithwaite et al. |
| 2010/0172512 A1 | 7/2010 | Braithwaite et al. |
| 2011/0016483 A1 | 1/2011 | Opdycke |
| 2011/0026727 A1 | 2/2011 | Braithwaite et al. |
| 2011/0044468 A1 | 2/2011 | Braithwaite et al. |
| 2011/0044469 A1 | 2/2011 | Braithwaite et al. |
| 2011/0157476 A1 | 6/2011 | Arling et al. |
| 2012/0042007 A1 | 2/2012 | Weel |
| 2012/0042094 A1 | 2/2012 | Qureshey et al. |
| 2012/0042337 A1 | 2/2012 | De Bonet et al. |
| 2012/0143729 A1 | 6/2012 | Qureshey et al. |

FOREIGN PATENT DOCUMENTS

| | | |
|---|---|---|
| EP | 0663737 | 7/1995 |
| EP | 0789502 | 8/1997 |
| EP | 984584 | 3/2000 |
| JP | 09-081164 | 3/1997 |
| JP | 2000-148169 | 5/2000 |
| JP | 2001-222288 | 8/2001 |
| JP | 2002-006868 | 1/2002 |
| JP | 2002-082679 | 3/2002 |
| WO | WO 96/17451 | 6/1996 |
| WO | WO 97/26601 | 7/1997 |
| WO | WO 97/44747 | 11/1997 |
| WO | WO 98/21891 | 5/1998 |
| WO | WO 99/18518 | 4/1999 |
| WO | WO 99/38266 | 7/1999 |
| WO | WO 99/43111 | 8/1999 |
| WO | WO 99/57646 | 11/1999 |
| WO | WO 00/52935 | 9/2000 |
| WO | WO 01/36064 | 5/2001 |
| WO | WO 01/53994 | 7/2001 |
| WO | WO 01/61894 | 8/2001 |
| WO | WO 02/21841 | 3/2002 |
| WO | WO 2004/027606 | 4/2004 |

OTHER PUBLICATIONS

"Defendant Sonos Inc.'s Initial Disclosures," Civil Action No. 2:13-cv-06062, Oct. 28, 2013, 21 pages.

2:14-cv-471—BHM v. Pioneer Corporation, et al.—Pioneer/Yamaha Courtesy Invalidity Contentions, Jan. 29, 2014, 37 pages.

ITC Investigation No. 337-TA-882 Respondents and Intervenors Joint Notice of Prior Art—Appendix A1—UPnP AV 1.0 Chart directed to U.S. Pat. No. 8,028,323, 181 pages.

ITC Investigation No. 337-TA-882 Respondents and Intervenors Joint Notice of Prior Art—Appendix A2—UPnP AV 1.0 Chart directed to U.S. Pat. No. 8,214,873, 269 pages.

ITC Investigation No. 337-TA-882 Respondents and Intervenors Joint Notice of Prior Art—Appendix B1—UPnP Version 1.0 Chart directed to U.S. Pat. No. 8,028,323, 222 pages.

ITC Investigation No. 337-TA-882 Respondents and Intervenors Joint Notice of Prior Art—Appendix B2—UPnP Version 1.0 Chart directed to U.S. Pat. No. 8,214,873, 324 pages.

ITC Investigation No. 337-TA-882 Respondents and Intervenors Joint Notice of Prior Art—Appendix C1—Encarnacion Chart directed to U.S. Pat. No. 8,028,323, 189 pages.

ITC Investigation No. 337-TA-882 Respondents and Intervenors Joint Notice of Prior Art—Appendix C2—Encarnacion Chart directed to U.S. Pat. No. 8,214,873, 266 pages.

ITC Investigation No. 337-TA-882 Respondents and Intervenors Joint Notice of Prior Art—Appendix D1—Weast Chart directed to U.S. Pat. No. 8,028,323, 152 pages.

ITC Investigation No. 337-TA-882 Respondents and Intervenors Joint Notice of Prior Art—Appendix D2—Weast Chart directed to U.S. Pat. No. 8,214,873, 225 pages.

ITC Investigation No. 337-TA-882 Respondents and Intervenors Joint Notice of Prior Art—Appendix E1—Khedouri Chart directed to U.S. Pat. No. 8,028,323, 212 pages.

ITC Investigation No. 337-TA-882 Respondents and Intervenors Joint Notice of Prior Art—Appendix E2—Khedouri Chart directed to U.S. Pat. No. 8,214,873, 352 pages.

ITC Investigation No. 337-TA-882 Respondents and Intervenors Joint Notice of Prior Art—Appendix F1—Chen 062 Chart directed to U.S. Pat. No. 8,028,323, 170 pages.

ITC Investigation No. 337-TA-882 Respondents and Intervenors Joint Notice of Prior Art—Appendix F2—Chen 062 Chart directed to U.S. Pat. No. 8,214,873, 244 pages.

(56) References Cited

OTHER PUBLICATIONS

ITC Investigation No. 337-TA-882 Respondents and Intervenors Joint Notice of Prior Art—Appendix G1—IEEE 2003 Article Chart directed to U.S. Pat. No. 8,028,323, 110 pages.
ITC Investigation No. 337-Ta-882 Respondents and Intervenors Joint Notice of Prior Art—Appendix G2—IEEE 2003 Article Chart directed to U.S. Pat. No. 8,214,873, 169 pages.
ITC Investigation No. 337-TA-882 Respondents and Intervenors Joint Notice of Prior Art—Appendix H1—Janik 616 Chart directed to U.S. Pat. No. 8,028,323, 88 pages.
ITC Investigation No. 337-TA-882 Respondents and Intervenors Joint Notice of Prior Art—Appendix H2—Janik 616 Chart directed to U.S. Pat. No. 8,214,873, 132 pages.
ITC Investigation No. 337-TA-882 Respondents and Intervenors Joint Notice of Prior Art—Appendix 11—Palm Chart directed to U.S. Pat. No. 8,028,323, 214 pages.
ITC Investigation No. 337-TA-882 Respondents and Intervenors Joint Notice of Prior Art—Appendix I2—Palm Chart directed to U.S. Pat. No. 8,214,873, 321 pages.
ITC Investigation No. 337-TA-882 Respondents and Intervenors Joint Notice of Prior Art—Appendix J1—Caspi Chart directed to U.S. Pat. No. 8,028,323, 172 pages.
ITC Investigation No. 337-TA-882 Respondents and Intervenors Joint Notice of Prior Art—Appendix J2—Caspi Chart directed to U.S. Pat. No. 8,214,873, 259 pages.
"3Com Demonstrates Kerbango Internet Radio at NAB Radio Show," San Francisco, CA, Sep. 21, 2000, 2 pages.
"3COM Plans to Acquire Kerbango, Developers of the First Internet Radio," Business Wire, Santa Clara, California, Jun. 27, 2000, 3 pages.
Alvear, Jose, "3Com to Acquire Kerbango for $80 Million," Streaming Media Magazine, Jun. 27, 2000.
U.S. Appl. No. 60/157,736, Libscomb, et al., filed Oct. 5, 1999, 13 pages.
U.S. Appl. No. 60/174,706, "Networked Audio Player Transport Protocol and Architecture," Palm, filed Jan. 6, 2000, 10 pages.
U.S. Appl. No. 60/176,829, Lipscomb, filed Jan. 19, 2000, 14 pages.
U.S. Appl. No. 60/176,830, Lipscomb, filed Jan. 19, 2000, 15 pages.
U.S. Appl. No. 60/176,833, Libscomb, filed Jan. 19, 2000, 37 pages.
U.S. Appl. No. 60/177,063, Lipscomb, filed Jan. 19, 2000, 29 pages.
U.S. Appl. No. 60/177,783, Lipscomb, et al., filed Jan. 24, 2000, 4 pages.
U.S. Appl. No. 60/177,867, Lipscomb, et al., filed Jan. 24, 2000, 29 pages.
U.S. Appl. No. 60/177,884, Libscomb, et al., filed Jan. 24, 2000, 5 pages.
U.S. Appl. No. 60/212,831, "User Customized Radio," Fleenor, filed Jun. 21, 2000, 14 pages.
Pachet, Francois, "A Combinatorial Approach to Content-based Music Selection," IEEE 1999.
Kouvelas, "A Combined Network, System and User Based Approach to improving the Quality of Multicast Audio," Department of Computer Science, University College London, May 1998, 125 pages.
"A complete implementation of the Universal Plug and Play Standard for networked devices," SimpleDevices, May 2, 2004, http://web.archive.org/web/20040502165533/http://simpledevices.com/up np enabler.shtml.
Li, Yalun, "A Framework for Universal Personal Computing," Dept. of Electrical Engineering, The University of British Columbia, 1996.
Mauve, M., "A General Framework and Communication Protocol for the Real-Time Transmission of Interactive Media," Reihe Informatik 16/98, 16 pages.
Gbaguidi, C., et al., "A Generic Service Management Architecture for Multimedia Multipoint Communications," Swiss Federal Institute of Technology, Telecommunications Laboratory / Telecommunications Services Group (1995) 12 pages.
"A Music Revolution . . . SoundServer," imerge, date unknown but obtained on or prior to Dec. 28, 2007, 2 pages.

"A new way to bring enhanced content and services to your connected media devices," SimpleDevices, Apr. 13, 2004, http://web.archive.org/web/20040413143604/http://simpledevices.com/mu sic explorer.shtml.
Yang, et al., "A Real-Time Synchronization Model and Transport Protocol for Multimedia Applications," Copyright 1994 IEEE, Communications and Multimedia Laboratory, Department of Computer Science and Information Engineering, National Taiwan University, 8 pages.
Alexander Sinitsyn, "A Synchronization Framework for Personal Mobile Servers," Philips Research, Proceedings of the Second IEEE Annual Conference on Pervasive Computing and Communications Workshops (PERCOMW'04), 2004 IEEE.
"About Intermind's Channel Communications Patents," downloaded from <http://www.intermind.com/materials/patent_desc.html> on Feb. 27, 1998, 5 pages.
"About SimpleDevices, Inc.," SimpleDevices, Inc., May 1, 2004, http://web.archive.org/web/20040501022142/http://www.simpledevices.co m/aboutus.shtml.
"About.com: http://quintura.com/," at <http://websearch.about.com/gi/dynamic/offsite.htm?zi=1/XJ&sdn=web...f=10&su=p284.8.150.ip_&tt=13&bt=0&bts=0&zu=http%3A//quintura.com/>, copyright 2007, Quintura Inc., printed Oct. 17, 2007, 2 pages.
Mao, Zhuoqing, "Achieving Service Portability in ICEBERG," EECS Dept., University of California at Berkeley, IEEE 2000.
"AddressBook:1 Service," for UPnP Verson 1.0, Standardized DCP (SDCP) Dec. 10, 2012, Document Version 1.0, Service Template Version 2.00, 35 pages.
Kawaguchi, N., et al., "Ad-Hoc On-Demand Communication System Based on Mobile Agents," Proceedings of the 3rd International Symposium on Wireless Personal Multimedia Communications (WPMC2000) 2000, 6 pages.
Schneider, "Adhoc Personal Ubiquitous Multimedia Services Via UPNP," Siemens Corporate Research, 2001 IEEE International Conference on Multimedia and Expo ISBN 0-7695-1198-8/01.
"Alcatel and Korean WiderThan.com extend cooperation agreement with global reseller alliance," Pressi.com, Feb. 17, 2003.
"ALi and Oregan Offer Industry Leading 802.11a/b/g Networked DVD Player and Digital Media Adapter Solutions," Business Wire, Jan. 5, 2004.
Hiles, "All MHS Use Cases," Digital Home Working Group, v0.5, Feb. 27, 2004, pp. 1-259.
"Allegro Media Server Lets Users Stream iTunes," Online Reporter, Jan. 24, 2004.
Declaration of Kevin Almeroth, Ph.D., with regard to U.S. Pat. No. 8,028,323, Apr. 20, 2014 (Inter Partes Review No. IPR2014-00709), 32 pages.
Declaration of Kevin Almeroth, Ph.D., with regard to U.S. Pat. No. 8,214,873, May 1, 2014 (Inter Partes Review No. IPR2014-00723), 32 pages.
"AltaVista Radio Now Available on 3Com Kerbango Internet Tuning Service—The Heart of the Soon to be Released Kerbango Internet Radio," San Francisco, Sep. 21, 2000, Nab Radio Show, 3 pages.
"Amazon.com: Kerbango 100E Internet Radio: MP3 Players & Accessories," Amazon.com, first available Sep. 4, 1999) printed Sep. 2, 2013.
Kevin C. Almeroth et al., "An Alternative Paradigm for Scalable On-Demand Applications: Evaluating and Deploying the Interactive Multimedia Jukebox," IEEE Transactions on Knowledge and Data Engineering, vol. 11, No. 4, Jul./Aug. 1999, pp. 658-672, copyright 1999 IEEE, 15 pages.
Lingnau et al., "An HTTP-based Infrastructure for Mobile Agents," at <http://www.w3.org/Conferences/WWW4/Papers/150/>, 1995, pp. 1-15, printed Dec. 20, 1999, 15 pages.
"An introduction to the Synchronized Multimedia Integration Language," Editor Peiy Liu, Siemens Corporate Research, IEEE 1998.
"Announcing Liquid Player 5.0 Preview," http://web.archive.org/web/20000229110956/http://www.liquidaudio.com.
"anthony.liekens.net >> Music >> Cloud," at <http://anthony.liekens.net/index.php/Music/Cloud>, page last modified on Apr. 12, 2007, copyright 2000-2006, Anthony Liekens, printed Oct. 17, 2007, 4 pages.

(56) References Cited

OTHER PUBLICATIONS

"AOL Music Now," at <http://web.archive.org/web/20060508184531/aol.musicnow.com/az/home.jhtml?_requesti . . . >, copyright 2006, AOL Music Now LLC, printed Nov. 16, 2007, 1 page.
"Apogee claims to be first with content-based billing.(Apogee Networks)(Brief Article)(Product Announcement)," New Media Age, HighBeam Research, Mar. 8, 2001.
"Apogee unveils platform for accurate billing of WAP-based Internet service.(Company Business and Marketing)(Brief Article)," Telecomworldwire, HighBeam Research, Mar. 1, 2001.
"Apple—iPod + iTunes," at <http://www.apple.com/itunes/>, copyright 2007 by Paramount Pictures, printed Feb. 7, 2007, 2 pages.
"Apple—iPod classic," at <http://www.apple.com/ipodclassic/>, printed Oct. 26, 2007, 1 page.
"Arcadyan Ships First Digital Media Receiver for European Market," Business Wire, Dec. 17, 2003.
Caesar, Matthew, "Architecture of iMode," Apr. 3, 2002.
Ramanathan, et al., "Architectures for Personalized Multimedia," IEEE MultiMedia (1994), vol. 1, Issue 1, 10 pages.
"Arrakis Digilink DC4-100," Protocol Update—Jul. 10, 2000, Arrakis Systems, Inc., 2 pages.
"ATSC Recommended Practice: Program and System Information Protocol Implementation Guidelines for Broadcasters" Jun. 25, 2002, Advanced Television Systems Committee, 8 pages.
Helder, "Audio on Demand extensions to Jungle Monkey," University of Michigan, EECS 571 Project Report, Apr. 20, 1999.
"Audio Point: Welcome to the Coolest Way to Listed to Digital Music Over Your Conventional Stereo Equipment," Home Director, Inc., Revision Se. 2002, 2 pages.
Dipert, B., ed., "Audio Receivers Tune in to Binary Broadcasts," Apr. 26, 2001, 5 pages.
Bloom, B., "Audio Request ARQ1-20 Home MP3/CD Player/Recorder With HD Storage," Equipment Review No. 2, Mar./Apr. 2001, Audiophile Audition, 7 pages.
"Audio Request: Music the Way You Want It," Copyright 2001, ReQuest, Inc., 75 pages.
"Audio ReQuest User Manual: ReQuest Serious Play," Copyright 2005, ReQuest, Inc., 44 pages.
"Audio ReQuest Users Manual for ARQTera ARQFusion ARQnitro ARQ2 Pro ARQ Zone ARQ1 Pro," ReQuest, Inc., date unknown, 63 pages.
Jonas, Karl, "Audio Streaming on the Internet Experiences with Real-Time Streaming of Audio Streams," German National Research Center for Information Technology (GMD), IEEE 1997.
"Audio Switcher Model CCSW84-01," Computer Concepts Corp. Digital Commercial System, Feb. 1991, 3 pages.
"Audio: 1 Sample Service Template for UPnP Version 1.0," Contributing Members of the UPnP Forum, 2001.
"AudioTron: Digital Music Player for Home Networks—Accessories," Turtle Beach Connected Audio, Feb. 12, 2003 (Archived at http://web.archive.org/web/20030212144240/http://www.turtlebeach.com/site/products/audiotron/accessories.asp) 2 pages.
"AudioTron: Digital Music Player for Home Networks—Accessories," Turtle Beach Connected Audio, Aug. 6, 2002 (Archived at http://web.archive.org/web/20020806183335/http://www.turtlebeach.com/site/products/audiotron/accessories.asp) 2 pages.
"AudioTron Digital Music and Internet Radio Player—Reference Manual," AudioTron Reference Manual, Version 3.0, May 2002, Copyright 2002 Voyetra Turtle Beach, Inc., 70 pages.
Heathering, B., "AudioTron Digital Music Player," Feb. 24, 2003, Home Toys Inc. Copyright 1996-2002 (Archived at http://web.archive.org. . . www.hometoys.com/htinews/apr01/reviews/audiotron/audiotron.com) 2 pages.
"AudioTron: Digital Music Player for Home Networks," Turtle Beach Connected Audio, Apr. 1, 2003 (Archived at http://web.archive.org/web/20030401095445/http://www.turtlebeach.com/site/products/audiotron/producthome.asp) 2 pages.
"AudioTron: Digital Music Player for Home Networks—Frequently Asked Questions," Turtle Beach Connected Audio, Feb. 12 2003 (Archived at http://web.archive.org/web/20030212144110/http://www.turtlebeach.com/site/products/audiotron/faqs.asp) 10 pages.
"AudioTron: Digital Music Player for Home Networks—In Detail," Turtle Beach Connected Audio, Apr. 1, 2003 (Archived at http://web.archive.org/web/20030401211824/http://www.turtlebeach.com/site/products/audiotron/indetail.asp) 2 pages.
"AudioTron: Digital Music Player for Home Networks—In Detail," Turtle Beach Connected Audio, Jun. 9, 2002 (Archived at http://web.archive.org/web/20020609155522/http://www.turtlebeach.com/site/products/audiotron/indetail.asp) 2 pages.
"AudioTron: Digital Music Player for Home Networks—Partner Products," Turtle Beach Connected Audio, Feb. 2, 2003 (Archived at http://web.archive.org/web/20030202062712/http://www.turtlebeach.com/site/products/audiotron/partners.asp) 2 pages.
"AudioTron: Digital Music Player for Home Networks—Product Downloads," Turtle Beach Connected Audio, Aug. 7, 2002 (Archived at http://web.archive.org/web/20020807224358/http://www.turtlebeach.com/site/products/audiotron/downloads.asp) 1 page.
"AudioTron: Digital Music Player for Home Networks—Products & Awards," Turtle Beach Connected Audio, Feb. 10, 2003 (Archived at http://web.archive.org/web/20030210104730/http://www.turtlebeach.com/site/products/audiotron/reviews.asp) 3 pages.
"AudioTron: Digital Music Player for Home Networks—Product Reviews & Awards," Turtle Beach Connected Audio, Aug. 6, 2002 (Archived at http://web.archive.org/web/20020806184002/http://www.turtlebeach.com/site/products/audiotron/reviews.asp) 3 pages.
"AudioTron Setup Guide—Digital Music Player for Home Networks," Copyright 2001-2002, Voyetra Turtle Beach, Inc., 38 pages.
"AudioTron: Digital Music Player for Home Networks—Specifications," Turtle Beach Connected Audio, Feb. 2, 2003 (Archived at http://web.archive.org/web/20030202062309/http://www.turtlebeach.com/site/products/audiotron/specs.asp) 2 pages.
"AudioTron: Digital Music Player for Home Networks—Specifications," Turtle Beach Connected Audio, Aug. 6, 2002 (Archived at http://web.archive.org/web/20020806184248/http://www.turtlebeach.com/site/products/audiotron/specs.asp) 2 pages.
"AudioTron: Digital Music Player for Home Networks—Requirements," Turtle Beach Connected Audio, Feb. 2, 2003 (Archived at http://web.archive.org/web/20030202063415/http://www.turtlebeach.com/site/products/audiotron/whatdoineed.asp) 2 pages.
"AudioTron: Digital Music Player for Home Networks—System Requirements," Turtle Beach Connected Audio, Apr. 9, 2002 (Archived at http://web.archive.org/web/20020409132409/http://www.turtlebeach.com/site/products/audiotron/whatdoineed.asp) 1 page.
"AudioTron: Digital Music Player for Home Networks—Top 10 Things to Look at Before You Buy a Digital Audio Receiver," Turtle Beach Connected Audio, Feb. 28, 2003 (Archived at http://web.archive.org/web/20030228031931/http://www.turtlebeach.com/site/products/audiotron/comparisons.asp) 2 pages.
"AudioTron: Digital Music Player for Home Networks—User Comments," Turtle Beach Connected Audio, Feb. 12, 2003 (Archived at http://web.archive.org/web/20030212144608/http://www.turtlebeach.com/site/products/audiotron/feedback.asp) 2 pages.
"AudioTron: Digital Music Player for Home Networks—User Comments," Turtle Beach Connected Audio, Aug. 7, 2002 (Archived at http://web.archive.org/web/20020807224930/http://www.turtlebeach.com/site/products/audiotron/feedback.asp) 2 pages.
"AudioTron: Digital Music Player for Home Networks—Product Downloads," Turtle Beach Connected Audio, Feb. 12, 2003 (Archived at http://web.archive.org/web/20030212145129/http://www.turtlebeach.com/site/products/audiotron/downloads.asp) 1 page.
"AvantGo arrives in UK.(Industry Trend or Event), (Brief Article)," New Media Age, HighBeam Research, Nov. 30, 2000.
AVS Forum, "CD Changers (200-300)," Jul. 22, 2000, 4 pages.
Buerk, L., et al, "AVTransport: 1 Service Template Version 1.01," for UPnP Version 1.0, Standardized DCP, Jun. 25, 2002, UPnP Forum, 67 pages.

(56) References Cited

OTHER PUBLICATIONS

"AVTransport:1 Service, Annex A—Control Point Requirements," for UPnP Version 1.0, Standardized DCP Annex, Oct. 6, 2010, Service Template Version: 2:00, 4 pages.
"AVTransport:2 Service Template Version 1.01," for UPnP Version 1.0, Standardized DCP, Sep. 30, 2008, Document Version 1.0, 96 pages.
"AVTransport:2 Service, Annex A—Control Point Requirements," for UPnP Version 1.0, Standardized DCP Annex, Oct. 6, 2010, Service Template Version: 2.00, 5 pages.
"AVTransport:3 Service," for UPnP Version 1.0, Standardized Dcp (SDCP), Dec. 31, 2010, Service Template Version 1.01, 131 pages.
"AVTransportl.SyntaxTests.xml," date unknown, 3 pages.
"AVTransportl.xml," date unknown, 7 pages.
"AVTransport2.SyntaxTests.xml," date unknown, 4 pages.
"AVTransport2.xml," date unknown, 12 pages.
"Basic:1.0 Device Definition Version 1.0 for UPnP Version 1.0," Contributing Members of the UPnP Forum, 2002.
"BasicManagement:1 Service Template Version 1.01," for UPnP Version 1.0, Standardized DCP (SDCP) Jul. 20, 2010, 72 pages.
"BasicManagement:2 Service Template Version 1.01," for UPnP Version 1.0, Standardized DCP (SDCP) Feb. 16, 2012, 145pages.
*BHM* v *Sonos* "First Amended Complaint for Patent Infringement," filed Sep. 11, 2012, in Civil Action No. 1:12-cv-00637(RGA), 22 pages.
*BHM* v *Sonos* "Complaint for Patent Infringement," filed Jan. 21, 2014, in Civil Action No. 2:14-cv-00486, 31 pages.
Dismissal Order in *Black Hills Media, LLC* v. *Yamaha Corp. of America*, Case No. 2:13-cv-06054 (C.D. Cal.) Dated Jan. 14, 2014, 7 pages.
Order Staying *Black Hills Media, LLC* v. *Yahama Corp. of America*, Case No. 8:14-cv-00101 (C.D. Cal.) dated May 8, 2014, 9 pages.
2:14-cv-471—*BHM* v. *Pioneer Corporation, et al.*—Pioneer/ Yamaha Courtesy Invalidity Contentions—Exhibit D-1—Leeke Chart—U.S. Pat. No. 6,587,127 to Leeke, et al., directed to U.S. Pat. No. 8,050,652 to Qureshey, Jan. 29, 2014, 6 pages.
2:14-cv-471—*BHM* v. *Pioneer Corporation, et al.*—Pioneer/ Yamaha Courtesy Invalidity Contentions—Exhibit D-10—Perlman Chart—WIPO Publication No. WO 02/21841 to Perlman, directed to U.S. Pat. No. 8,050,652 to Qureshey, Jan. 29, 2014, 36 pages.
2:14-cv-471—*BHM* v. *Pioneer Corporation, et al.*—Pioneer/ Yamaha Courtesy Invalidity Contentions—Exhibit D-11—Watson Chart—U.S. Pat. No. 7,693,992 to Watson, directed to U.S. Pat. No. 8,050,652 to Qureshey, Jan. 29, 2014, 109 pages.
2:14-cv-471—*BHM* v. *Pioneer Corporation, et al.*—Pioneer/ Yamaha Courtesy Invalidity Contentiond—Exhibit D-12—Langdon Chart—U.S. Pat. No. 7,734,688 to Langdon, directed to U.S. Pat. No. 8,050,652 to Qureshey, Jan. 29, 2014, 17 pages.
2:14-cv-471—*BHM* v. *Pioneer Corporation, et al.*—Pioneer/ Yamaha Courtesy Invalidity Contentions—Exhibit D-13—Sass Chart—U.S. Pat. No. 6,823,225 to Sass, directed to U.S. Pat. No. 8,050,652 to Qureshey, Jan. 29, 2014, 15 pages.
2:14-cv-471—*BHM* v. *Pioneer Corporation, et al.*—Pioneer/ Yamaha Courtesy Invalidity Contentions—Exhibit D-2—Berman Chart—U.S. Pat. No. 6,502,194 to Berman, et al. in view of WIPO Publication No. WO 99/38266 to Qureshey, et al., directed to U.S. Pat. No. 8,050,652 to Qureshey, Jan. 29, 2014, 5 pages.
2:14-cv-471—*BHM* v. *Pioneer Corporation, et al.*—Pioneer/ Yamaha Courtesy Invalidity Contentions—Exhibit D-3d—Lansonic DAS-750 Device Chart—Lansonic DAS-750 System, directed to U.S. Pat. No. 8,050,652 to Qureshey, Jan. 29, 2014, 47 pages.
2:14-cv-471—*BHM* v. *Pioneer Corporation, et al.*—Pioneer/ Yamaha Courtesy Invalidity Contentions—Exhibit D-3w—Lansonic DAS-750 Website Chart—Lansonic Digital Audio Server Das-750 Web Pages, directed to U.S. Pat. No. 8,050,652 to Qureshey, Jan. 29, 2014, 6 pages.
2:14-cv-471—*BHM* v. *Pioneer Corporation, et al.*—Pioneer/ Yamaha Courtesy Invalidity Contentions—Exhibit D-4—White Chart—U.S. Pat. No. 7,187,947 to White, et al., directed to U.S. Pat. No. 8,050,652 to Qureshey, Jan. 29, 2014, 5 pages.
2:14-cv-471—*BHM* v. *Pioneer Corporation, et al.*—Pioneer/ Yamaha Courtesy Invalidity Contentions—Exhibit D-5—Johnson Chart—U.S. Pat. No. 7,451,177 to Johnson, et al., directed to U.S. Pat. No. 8,050,652 to Qureshey, Jan. 29, 2014, 8 pages.
2:14-cv-471—*BHM* v. *Pioneer Corporation, et al.*—Pioneer/ Yamaha Courtesy Invalidity Contentions—Exhibit D-6—Lipscomb Chart - U.S. Pat. No. 7,020,704 to Lipscomb, directed to U.S. Pat. No. 8,050,652 to Qureshey, Jan. 29, 2014, 8 pages.
2:14-cv-471—*BHM* v. *Pioneer Corporation, et al.*—Pioneer/ Yamaha Courtesy Invalidity Contentions—Exhibit D-7—Leyden Chart—WIPO Publication No. WO 01/61894 to Leyden, et al., directed to U.S. Pat. No. 8,050,652 to Qureshey, Jan. 29, 2014, 8 pages.
2:14-cv-471—*BHM* v. *Pioneer Corporation, et al.*—Pioneer/ Yamaha Courtesy Invalidity Contentions—Exhibit D-8d—Philips FW-i1000 Chart—Philips FW-i1000 (Fwi) Kerbango Device, directed to U.S. Pat. No. 8,050,652 to Qureshey, Jan. 29, 2014, 55 pages.
2:14-cv-471—*BHM* v. *Pioneer Corporation, et al.*—Pioneer/ Yamaha Courtesy Invalidity Contentions—Exhibit D-8m—Philips Fw-i1000 Manual—Philips Streamium Fw-i1000 Manual, directed to U.S. Pat. No. 8,050,652 to Qureshey, Jan. 29, 2014, 11 pages.
2:14-cv-471—*BHM* v. *Pioneer Corporation, et al.*—Pioneer/ Yamaha Courtesy Invalidity Contentions—Exhibit D-9d—Kerbango Device Chart—Kerbango Radio 100E device, directed to U.S. Pat. No. 8,050,652 to Qureshey, Jan. 29, 2014, 62 pages.
2:14-cv-471—*BHM* v. *Pioneer Corporation, et al.*—Pioneer/ Yamaha Courtesy Invalidity Contentions—Exhibit D-9p—Kerbango Press Chart—Kerbango Prior Art Press Publications, directed to U.S. Pat. No. 8,050,652 to Qureshey, Jan. 29, 2014, 46 pages.
2:14-cv-471—*BHM* v. *Pioneer Corporation, et al.*—Pioneer/ Yamaha Courtesy Invalidity Contentions—Exhibit E-1—Janik Chart—U.S. Patent Publication No. 2002/0068558 to Janik, in view of U.S Patent Publication No. 2002/0065902 to Janik, directed to U.S. Pat. No. 8,214,873 to Weel, Jan. 29, 2014, 5 pages.
2:14-cv-471—*BHM* v. *Pioneer Corporation, et al.*—Pioneer/ Yamaha Courtesy Invalidity Contentions—Exhibit E-10d—cd3o Device Chart—cd3o System, directed to U.S. Pat. No. 8,214,873 to Weel, Jan. 29, 2014, 22 pages.
2:14-cv-471—*BHM* v. *Pioneer Corporation, et al.*—Pioneer/ Yamaha Courtesy Invalidity Contentions—Exhibit E-10m—cd3o Manual Chart—cd3o Network MP3 Player Product Manual, directed to U.S. Pat. No. 8,214,873 to Weel, Jan. 29, 2014, 8 pages.
2:14-cv-471—*BHM* v. *Pioneer Corporation, et al.*—Pioneer/ Yamaha Courtesy Invalidity Contentions—Exhibit E-11d—Lansonic DAS-750 Device Chart—Lansonic DAS-750 System, directed to U.S. Pat. No. 8,214,873 to Weel Jan. 29, 2014, 26 pages.
2:14-cv-471—*BHM* v. *Pioneer Corporation, et al.*—Pioneer/ Yamaha Courtesy Invalidity Contentions—Exhibit E-11m—Lansonic DAS-750 Manual Chart—Lansonic Digital Audio Server Operating Instructions Version 2.2.0 DAS-750-PRO, directed to U.S. Pat. No. 8,214,873 to Weel Jan. 29, 2014, 7 pages.
2:14-cv-471—*BHM* v. *Pioneer Corporation, et al.*—Pioneer/ Yamaha Courtesy Invalidity Contentions—Exhibit E-12d—Lansonic DAS-950 Device Chart—Lansonic DAS-950 System, directed to U.S. Pat. No. 8,214,873 to Weel Jan. 29, 2014, 24 pages.
2:14-cv-471—*BHM* v. *Pioneer Corporation, et al.*—Pioneer/ Yamaha Courtesy Invalidity Contentions—Exhibit E-12p—Lansonic DAS-950 Archived Web Chart—Lansonic DAS-950 Pro Series Archived Web Page dated 2-2-02, directed to U.S. Pat. No. 8,214,873 to Weel Jan. 29, 2014, 17 pages.
2:14-cv-471—*BHM* v. *Pioneer Corporation, et al.*—Pioneer/ Yamaha Courtesy Invalidity Contentions—Exhibit E-13—Juszkiewicz Chart—U.S. Pat. No. 7,249,147 to Juszkiewicz, directed to U.S. Pat. No. 8,214,873 to Weel, Jan. 29, 2014, 8 pages.
2:14-cv-471—*BHM* v. *Pioneer Corporation, et al.*—Pioneer/ Yamaha Courtesy Invalidity Contentions—Exhibit E-14—IEEE 2003 Article Chart—Non-Patent Literature Document entitled, "Streaming Multimedia Content Over Home Network With an

(56) References Cited

OTHER PUBLICATIONS

Intelligent Controller," (IEEE 2003 Article) directed to U.S. Pat. No. 8,214,873 to Weel, Jan. 29, 2014, 24 pages.
2:14-cv-471—*BHM* v. *Pioneer Corporation, et al.*—Pioneer/Yamaha Courtesy Invalidity Contentions—Exhibit E-2—Bi + Erekson Chart—U.S. Patent Publication No. 2002/0087996 to Bi, et al. in view of U.S. Pat. No. 6,622,018 to Erekson, directed to U.S. Pat. No. 8,214,873 to Weel, Jan. 29, 2014, 4 pages.
2:14-cv-471—*BHM* v. *Pioneer Corporation, et al.*—Pioneer/Yamaha Courtesy Invalidity Contentions—Exhibit E-3—Berman + Van Ryzin Chart—U.S. Pat. No. 6,502,194 to Berman, et al. in view of U.S. Pat. No. 6,127,941 to Van Ryzin, directed to U.S. Pat. No. 8,214,873 to Weel, Jan. 29, 2014, 4 pages.
2:14-cv-471—*BHM* v. *Pioneer Corporation, et al.*—Pioneer/Yamaha Courtesy Invalidity Contentions—Exhibit E-4—UPnP AV 1.0 Chart—Non-Patent Literature Document entitled, "UPNP AV Architecture:1," directed to U.S. Pat. No. 8,214,873 to Weel, Jan. 29, 2014, 28 pages.
2:14-cv-471—*BHM* v. *Pioneer Corporation, et al.*—Pioneer/Yamaha Courtesy Invalidity Contentions—Exhibit E-5—Encarnacion Chart—U.S. Pat. No. 7,668,939 to Encarnacion, directed to U.S. Pat. No. 8,214,873 to Weel, Jan. 29, 2014, 30 pages.
2:14-cv-471—*BHM* v. *Pioneer Corporation, et al.*—Pioneer/Yamaha Courtesy Invalidity Contentions—Exhibit E-6—Weast Chart—U.S. Pat. No. 7,454,511 to Weast, directed to U.S. Pat. No. 8,214,873 to Weel, Jan. 29, 2014, 20 pages.
2:14-cv-471—*BHM* v. *Pioneer Corporation, et al.*—Pioneer/Yamaha Courtesy Invalidity Contentions—Exhibit E-7—Chen Chart—U.S. Patent Publication No. 2002/0170062 to Chen, directed to U.S. Pat. No. 8,214,873 to Weel, Jan. 29, 2014, 29 pages.
2:14-cv-471—*BHM* v. *Pioneer Corporation, et al.*—Pioneer/Yamaha Courtesy Invalidity Contentions—Exhibit E-8—Khedouri Chart—U.S. Pat. No. 8,160,495 to Khedouri, directed to U.S. Pat. No. 8,214,873 to Weel, Jan. 29, 2014, 30 pages.
2:14-cv-471—*BHM* v. *Pioneer Corporation, et al.*—Pioneer/Yamaha Courtesy Invalidity Contentions—Exhibit E-9d—TurtleBeach AudioTron Device Chart—TurtleBeach AudioTron System, directed to U.S. Pat. No. 8,214,873 to Weel, Jan. 29, 2014, 41 pages.
2:14-cv-471—*BHM* v. *Pioneer Corporation, et al.*—Pioneer/Yamaha Courtesy Invalidity Contentions—Exhibit E-9m—TurtleBeach AudioTron Manual Chart—TurtleBeach AudioTron Reference Manual, directed to U.S. Pat. No. 8,214,873 to Weel, Jan. 29, 2014, 17 pages.
2:14-cv-471—*BHM* v. *Pioneer Corporation, et al.*—Pioneer/Yamaha Courtesy Invalidity Contentions—Exhibit H-10d—'323—TurtleBeach AudioTron Device Chart—TurtleBeach AudioTron System, directed to U.S. Pat. No. 8,028,323 to Weel, Jan. 29, 2014, 27 pages.
2:14-cv-471—*BHM* v. *Pioneer Corporation, et al.*—Pioneer/Yamaha Courtesy Invalidity Contentions—Exhibit H-10m—'323—TurtleBeach AudioTron Manual Chart—TurtleBeach AudioTron Reference Manual, directed to U.S. Pat. No. 8,028,323 to Weel, Jan. 29, 2014, 12 pages.
2:14-cv-471—*BHM* v. *Pioneer Corporation, et al.*—Pioneer/Yamaha Courtesy Invalidity Contentions—Exhibit H-11d—'323—Lansonic DAS-750 Device Chart—Lansonic Das-750 System, directed to U.S. Pat. No. 8,028,323 to Weel Jan. 29, 2014, 16 pages.
2:14-cv-471—*BHM* v. *Pioneer Corporation, et al.*—Pioneer/Yamaha Courtesy Invalidity Contentions—Exhibit H-11m—'323—Lansonic DAS-750 Manual Chart—Lansonic Digital Audio Server Operating Instructions Version 2.2.0 DAS-750-Pro, directed to U.S. Pat. No. 8,028,323 to Weel Jan. 29, 2014, 5 pages.
2:14-cv-471—*BHM* v. *Pioneer Corporation, et al.*—Pioneer/Yamaha Courtesy Invalidity Contentions—Exhibit H-12d—'323—Lansonic Das-950 Device Chart—Lansonic Das-950 System, directed to U.S. Pat. No. 8,028,323 to Weel Jan. 29, 2014, 16 pages.
2:14-cv-471—*BHM* v. *Pioneer Corporation, et al.*—Pioneer/Yamaha Courtesy Invalidity Contentions—Exhibit H-12P—'323—Lansonic Das-950 Archived Web Chart - Lansonic DAS-950 Pro Series Archived Web Page dated 2-2-02, directed to U.S. Pat. No. 8,028,323 to Weel Jan. 29, 2014, 12 pages.
2:14-cv-471—*BHM* v. *Pioneer Corporation, et al.*—Pioneer/Yamaha Courtesy Invalidity Contentions—Exhibit H-1d—'323—cd3o Device Chart—cd3o System, directed to U.S. Pat. No. 8,028,323 to Weel, Jan. 29, 2014, 16 pages.
2:14-cv-471—*BHM* v. *Pioneer Corporation, et al.*—Pioneer/Yamaha Courtesy Invalidity Contentions—Exhibit H-1m—'323—cd3o Manua Chart—cd3o Network MP3 Player Product Manual, directed to U.S. Pat. No. 8,028,323 to Weel, Jan. 29, 2014, 6 pages.
2:14-cv-471—*BHM* v. *Pioneer Corporation, et al.*—Pioneer/Yamaha Courtesy Invalidity Contentions—Exhibit H-2—'323—Janik + Janik Chart—U.S. Patent Publication No. 2002/0068558 to Janik, in view of U.S. Patent Publication No. 2002/0065902 to Janik, et al., directed to U.S. Pat. No. 8,028,323 to Weel, Jan. 29, 2014, 4 pages.
2:14-cv-471—*BHM* v. *Pioneer Corporation, et al.*—Pioneer/Yamaha Courtesy Invalidity Contentions—Exhibit H-3—'323—Bi Chart—U.S. Patent Publication No. 2002/0087996 to Bi, et al., directed to U.S. Pat. No. 8,028,323 to Weel, Jan. 29, 2014, 3 pages.
2:14-cv-471—*BHM* v. *Pioneer Corporation, et al.*—Pioneer/Yamaha Courtesy Invalidity Contentions—Exhibit H-4—'323—Berman + Van Ryzin Chart—U.S. Pat. No. 6,502,194 to Berman, et al. in view of U.S. Pat. No. 6,127,941 to Van Ryzin, directed to U.S. Pat. No. 8,028,323 to Weel, Jan. 29, 2014, 4 pages.
—*BHM* v. *Pioneer Corporation, et al.*—Pioneer/Yamaha Courtesy Invalidity Contentions—Exhibit H-5—'323—UPnP AV 1.0 Chart—Non-Patent Literature Document entitled, "UPnP AV Architecture:1," directed to U.S. Pat. No. 8,028,323 to Weel, Jan. 29, 2014, 16 pages.
2:14-cv-471—*BHM* v. *Pioneer Corporation, et al.*—Pioneer/Yamaha Courtesy Invalidity Contentions—Exhibit H-6—'323—Encarnacion Chart—U.S. Pat. No. 7,668,939 to Encarnacion, directed to U.S. Pat. No. 8,028,323 to Weel, Jan. 29, 2014, 16 pages.
2:14-cv-471—*BHM* v. *Pioneer Corporation, et al.*—Pioneer/Yamaha Courtesy Invalidity Contentions—Exhibit H-7—'323—Weast Chart—U.S. Pat. No. 7,454,511 to Weast, directed to U.S. Pat. No. 8,028,323 to Weel, Jan. 29, 2014, 13 pages.
2:14-cv-471—*BHM* v. *Pioneer Corporation, et al.*—Pioneer/Yamaha Courtesy Invalidity Contentions—Exhibit H-8—'323—Chen Chart—U.S. Patent Publication No. 2002/0170062 to Chen, directed to U.S. Pat. No. 8,028,323 to Weel, Jan. 29, 2014, 20 pages.
2:14-cv-471—*BHM* v. *Pioneer Corporation, et al.*—Pioneer/Yamaha Courtesy Invalidity Contentions—Exhibit H-9—'323—Khedouri Chart—U.S. Pat. No. 8,160,495 to Khedouri, directed to U.S. Pat. No. 8,028,323 to Weel, Jan. 29, 2014, 21 pages.
"Billboard Music Charts - Latest Music News—Music Videos," http://www.billboard.com/bbcom/index.jsp, printed Feb. 7, 2007, 2 pages.
"BinaryLight:1 Device Template Version 1.01," for UPnP Version 1.0, Standardized DCP, Nov. 23, 2003, 7 pages.
"Blockbuster and IBM Announce New Multimedia Ventures," May 11, 1993, 2 pages.
Pique, J. G., et al., "Bluetooth," Oct. 4, 2013, 12 pages.
Kardach, "Bluetooth Architecture Overview," Intel Corporation, Technology Journal Q2, 2000, 7 pages.
Kansal, "Bluetooth Primer," Copyright 2002, Red-M, 30 pages.
"Specification of the Bluetooth System," Specification vol. 1, v1.0 B, Bluetooth, Dec. 1, 1999 (Part H1) 255 pages.
"Specification of the Bluetooth System," Specification vol. 1, v1.0 B, Bluetooth, Dec. 1, 1999 (Parts A-B) 182 pages.
"Specification of the Bluetooth System," Specification vol. 1, v1.0 B, Bluetooth, Dec. 1, 1999 (Parts C-D) 150 pages.
"Specification of the Bluetooth System," Specification vol. 1, v1.0 B, Bluetooth, Dec. 1, 1999 (Parts E-F) 207 pages.
"Specification of the Bluetooth System," Specification vol. 1, v1.0 B, Bluetooth, Dec. 1, 1999 (Parts H2-H4) 57 pages.
"Specification of the Bluetooth System," Specification vol. 1, v1.0 B, Bluetooth, Dec. 1, 1999 (Parts I-Index) 290 pages.
"Bluetooth White Paper 1.1," Au-System, Jan. 2000, 26 pages.
Declaration of V. Michael Bove, Jr., with regard to U.S. Pat. No. 8,214,873, May 16, 2014 (Inter Partes Review No. IPR2014-00766), 41 pages.

(56) References Cited

OTHER PUBLICATIONS

Declaration of V. Michael Bove, Jr., with regard to U.S. Pat. No. 8,050,652, Sep. 18, 2013 (Inter Partes Review No. IPR2013-00594), 41 pages.
Declaration of V. Michael Bove, Jr., with regard to U.S. Pat. No. 8,214,873, Sep. 18, 2013 (Inter Partes Review No. IPR2013-00598), 42 pages.
"Calendar:1 Service," for UPnP Verson 1.0, Standardized Dcp (SDCP) Dec. 10, 2012, Document Version 1.0, Service Template Version 2.00, 39 pages.
"CallManagement:1 Service," For UPnP Verson 1.0, Standardized Dcp (SDCP) Mar. 22, 2011, Document Version 1.0, Service Template Version 2.00, 312 pages.
"CallManagement:2 Service," For UPnP Verson 1.0, Standardized Dcp (SDCP) Dec. 10, 2012, Document Version 1.0, Service Template Version 2.00, 303 pages.
"CD Player: 1 Sample Service Template for UPnP Version 1.0," Contributing Members of the UPnP Forum, 2001.
"Cd3o Network MP3 Player Product Manual," Copyright 2003, cd3o, Inc., 65 pages.
"Cd3o Network MP3 Player Quick Installation Guide," cd3o, date unknown, 1 page.
"Cd3o Network MP3 Player Voice-Guide Remove Control," cd3o, date unknown, 1 page.
Blackwell, G., "cd3o Wireless Network MP3 Player," date unknown, at least as early as Oct. 12, 2013, (http://www.wi-fiplanet.com/reviews/CD/article.php/3338481/cd3o-Wireless-Network-MP3-Player.htm) 2 pages.
Stone, Glen, "CEA R7.7 Wireless Entertainment Networking," Digital Home Working Group, Aug. 5, 2003.
CEDIA (Custom Electronic Design and Installation Association) Expo 2002, Mineapolis, Sep. 25-29, 2002, Panel, 4 pages.
Jepson, Brian, "Cellular Networking with CDPD," Web Techniques, Nov. 2001.
"ChangeDisc: 1 Sample Service Template for UPnP Version 1.0," Contributing Members of the UPnP Forum, 2000.
"Checklist for UPnP Standard Device Template Version 1.01," Contributing Members of the UPnP Forum, publication date unknown.
"Checklist for UPnP Standard Service Templates Version 1.01," Contributing Members of the UPnP Forum, publication date unknown.
"Cirrus Logic's Maverick Processor Chosen for Turtle Beach Audiotron Internet Audio Appliance," Cirrus Logic, Inc. Press Release, News Archive 2000, 2 pages.
"CNET Names Prismiq MediaPlayer Best of CES," PR Newswire, Jan. 14, 2003, pp. 1-2.
"CNN.com—Breaking News, U.S., World, Weather, Entertainment & Video News," http://www.cnn.com/, copyright 2007 Cable News Network LP, LLLP, printed Feb. 7, 2007, 3 pages.
"CodeName: "Streamer,"," Date Unknown, 2 pages.
Nielsen, J., et al., "Comparative Design Review: An Exercise in Parallel Design," Interchi '93, Apr. 24-29, 1993, pp. 414-417.
"Competition Catastrophe: A Device That Will Add 800 Stations to Your Market," Radio Ink, vol. XIV, No. 21—Oct. 11, 1999, 6 pages.
Clark, Louise; Sasse, Angela, "Conceptual Design Reconsidered: The Case of the Internet Session Directory Tool," University College London, In People and Computers XII: Proceedings of HCI'97.
"ConfigurationManagement:1 Service Template Version 1.01," for UPnP Version 1.0, Standardized DCP (SDCP) Jul. 20, 2010, 103 pages.
"ConfigurationManagement:2 Service Template Version 1.01," For UPnP Version 1.0, Standardized DCP (SDCP) Mar. 4, 2013, 160 pages.
Petersson, Justus, "Connected Home—the Home Ims Gateway," Ericsson, Telefonica, Feb. 28, 2007.
"Connection Manager: 1 Service Template Vrsion 1.01," Contributing Members of the UPnP Forum, Jun. 25, 2002.
"ConnectionManager:1 Service, Annex A—Control Point Requirements," For UPnP Version 1.0, Standardized DCP Annex, Oct. 6, 2010, Service Template Version: 2.00, 4 pages.
"ConnectionManager:2 Service Template Version 1.01," For UPnP Version 1.0, Approved Standard, May 31, 2006, Document Version 1.00, 49 pages.
"ConnectionManager:2 Service, Annex A—Control Point Requirements," for UPnP Version 1.0, Standardized DCP Annex, Oct. 6, 2010, Service Template Version: 2.00, 4 pages.
"ConnectionManager:3 Service," for UPnP Version 1.0, Standardized Dcp (SDCP), Dec. 31, 2010, Service Template Version 1.01, 84 pages.
"ConnectionManager1.SyntaxTests.xml," date unknown, 1 page.
"ConnectionManager1.xml," date unknown, 3 pages.
"ConnectionManager2.SyntaxTests.xml," date unknown, 1 page.
"ConnectionManager2.xml," date unknown, 4 pp.pages.
Pope, S. T., et al., "Content Analysis and Queries in a Sound and Music Database," International Computer Music Conference Proceedings (1999) pp. 124-130.
K. Debique, et al., Content Directory:1 Service Template Version 1.01 for UPnP Version 1.0, Standardized DCP, Jun. 25, 2002, Copyright 1999-2002 Contributing Members of the UPnP Forum, 89 pages.
"ContentDirectory:1 Service Annex A—Control Point Requirements," For UPnP Version 1.0, Standardized DCP Annex, Oct. 6, 2010, Service Template Version 2:00, 4 pages.
"ContentDirectory:2 Service Annex A—Control Point Requirements," For UPnP Version 1.0, Standardized DCP Annex, Oct. 6, 2010, Service Template Version 2:00, 4 pages.
"ContentDirectory:2 Service Template Version 1.01," For UPnP Version 1.0, Approved Standard, May 31, 2006, Document Version 1.00, 172 pages.
"ContentDirectory:3 Service Annex A—Control Point Requirements," for UPnP Version 1.0, Standardized DCP Annex, Oct. 6, 2010, Service Template Version 2:00, 5 pages.
"ContentDirectory:3 Service Template Version 1.01," For UPnP Version 1.0, Standardized DCP, Sep. 30, 2008, Document Version 1.00, 248 pages.
"ContentDirectory:4 Service," For UPnP Version 1.0, Standardized DCP (SDCP) Dec. 31, 2010, Service Template Version 1.01, 377 pages.
"ContentDirectory1.SyntaxTests.xml," date unknown, 3 pages.
"ContentDirectory1.xml," date unknown, 6 pages.
"ContentDirectory2.SyntaxTests.xml," date unknown, 3 pages.
"ContentDirectory2.xml," date unknown, 8 pages.
"ContentDirectory3.SyntaxTests.xml," date unknown, 4 pages.
"ContentDirectory3.xml," date unknown, 10 pages.
"ContentSync:1 Service Template Version 1.01, for UPnP Version 1.0," Contributing Members of the UPnP Forum, 2009, 111 pages.
"Continential Automated Buldings Association,Digital Home White Paper, IS 2003-31," Digital Home Working Group, Jun. 2003, 14 pages.
"ControlValve:1 Service Template for UPnP Device Architecture V 1.0," Contributing Members of the UPnP Forum, 2003, 15 pages.
Douglas, G., "Copyright and Peer-To-Peer Music File Sharing: The Napster Case and the Argument Against Legislative Reform," vol. 11, No. 1 (Mar. 2004) 16 pages.
Corrected Petition for Inter Partes Review of U.S. Pat. No. 8,050,652 (Inter Partes Review No. IPR2015-00590) Filed Feb. 9, 2015, 60 pages.
"Creative Introduces the Zen X-Fi and the Zen X-Fi With Wireless Lan—The Only Players to Improve the Quality of MP3 Music Playback With X-Fi Audio Technology," Creative Press Release, Singapore, Jul. 10, 2008, 2 pages.
"Creative Sound Blaster Wireless Music," User's Guide, Copyright 2003, Creative Technology Ltd. (Version 1.0, Aug. 2003) 66 pages.
Krishnan, V., et al., "Customized Internet Radio," Proceedings of the 9th International World Wide Web Conference on Computer Networks: the International Journal of Computer and Telecommunications Networking, vol. 33, Issue 1-6, Jun. 2000, pp. 609-618.
Krishnan, Venky, Chang, Grace, "Customized Internet Radio," Hewlett-Packard Labs, 2000.

(56) References Cited

OTHER PUBLICATIONS

"CyberLink Reveals UPnP-Compliant Home," PR Newswire, Apr. 12, 2004, pp. 1-3.
"DCS Live! Live Radio Just Got Easier," Computer Concepts Corporation, obtained on or prior to Dec. 28, 2007, 1 page.
"DCS Overview," Computer Concepts Corporation, obtained on or prior to Dec. 28, 2007, 1 page.
Hermann, R., et al., "DEAPspace—Transient ad hoc Networking of Pervasive Devices," Computer Networks 35 (2001) pp. 411-428.
Decision—Institution of Inter Partes Review entered Jan. 24, 2013 for IPR2012-00004, 28 pages.
Decision—Institution of Inter Partes Review entered Jul. 3, 2014 for IPR2013-00175, 21 pages.
Decision—Institution of Inter Partes Review entered Mar. 20, 2014 for IPR2013-00594, 34 pages.
Decision—Institution of Inter Partes Review entered Mar. 20, 2014 for IPR2013-00598, 26 pages.
Decision—Institution of Inter Partes Review entered Nov. 4, 2014 for IPR2014-00709, 20 pages.
Decision—Institution of Inter Partes Review entered Nov. 4, 2014 for IPR2014-00723, 20 pages.
Decision—Institution of Inter Partes Review entered Nov. 4, 2014 for IPR2014-00737, 24 pages.
Decision—Institution of Inter Partes Review entered Nov. 24, 2014 for IPR2014-00766, 24 pages.
Decision—Institution of Inter Partes Review and Grant of Joinder entered Jan. 28, 2015 for IPR2015-00337, 6 pages.
Decision—Institution of Inter Partes Review and Grant of Joinder entered Jan. 28, 2015 for IPR2015-00339, 6 pages.
Matthew Eccles, "Telephonic Discovery Deposition of Matthew Eccles," in ITC Investigation No. 337TA-882, Taken Oct. 14, 2013, 12 pages.
Kim, Dong-Sung, "Design and Implementation of Home Network Systems Using UPnP Middleware for Networked Appliances," School of Electrical Engineering and Computer Science, Seoul National University, Jul. 22, 2002, 10 pages.
Shin, "Design and Implementation of the SMIL (Synchronized Multimedia Inegration Language) Player," Dept. of Computer Engineering, Sejong University, IEEE, Jun. 24, 2002.
DLNA, "Design Guidelines," Jul. 1, 2004, http://www.dlna.org/resources, 1 page.
"Designing a UPnP AV MediaServer," Version 1.00, Intel Corporation, 2003, 46 pages.
Kruse, Kelly; Mori, Rob, "Designing an Internet Radio Interface Prototype," Sun Microsystems, Inc., Interactive Posters, CHI Mar. 31-Apr. 5, 2001.
"DeviceProtection:1 Service," For UPnP Version 1.0, Standardized Dcp (SDCP), Version 1.0, Feb. 24, 2011, Service Template Version 2.00, 67 pages.
"DeviceSecurity:1 Service Template for UPnP Device Architure 1.0," Contributing Members of the UPnP Forum, 2003, 66 pages.
"DeviceType:V Device Template Version 1.01 for UPnP Version 1.0," Contributing Members of the UPnP Forum, Jan. 16, 2001, 9 pages.
Stone, Glen, "DHWG HNv1 and Use Case Subcommittee Update," Digital Home Working Group, 2004, 35 pages.
Stone, Glen, "DHWG Status to CEA," Digital Home Working Group, Nov. 11, 2003, 10 pages.
"Digilink 4 Control Protocol," Arrakis Systems, Inc., Dec. 14, 2000, 51 pages.
"DigiLink 4 by Arrakis Systems, Inc. Music Library Features," Arrakis Systems, Inc., Jan. 21, 2000, 82 pages.
"Digilink Application Note—Link Groups Feature," Arrakis Systems, Inc., May 12, 2000, 1 page.
"Digilink Application Note—Recording the Latest News, Weather, Sports," Arrakis Systems, Inc., Jun. 26, 2000, 1 page.
"Digilink DC4-100 Whole House Music Library System, 3rd Party Control Systems," Arrakis Systems, Inc., Feb. 15, 2001, 5 pages.

"Digilink DC4-100 Whole House Music Library System, CD Music Management for the Home," Arrakis Systems, Inc., date unknown, 2 pages.
Peter Jansen Associates, "Digital Convergence and Home Entertainment," Apr. 1, 2002, web.archive.org/web/20040619093957/http://www.mediabolic.com/press/i tem.php?id=58, 9 pages.
"Digital Home White Paper," IS 2003-31, Jun. 2003, <www.caba.org. 14 pages.
Smith, "Digital home group touts convergence spec," The Register, Jun. 23, 2004, 2 pages.
"Digital Home Working Group Design Guidelines," Version 1.0, Working Draft, Apr. 1, 2004, Copyright 2004 Digital Home Working Group, 160 pages.
DHWG/DLNA, "Digital Home Working Group Design Guidelines, Version: 1.0," Digital Home Working Group, Version No. HNv1-0.900, Apr. 1, 2004, 160 pages.
Howard, B., "Digital Jukeboxes," PC Magazine, Oct. 1, 2002, 3 pages.
DHWG/DLNA, "Digital Living Network Alliance Home Networked Device Interoperability Guidelines Version: 1.0," Digital Living Network Alliance, Jun. 2, 2004, pp. 1-151.
"Digital On-Air Studio System," Jan. 31, 1994, Copyright format only 1997, Knight-Ridder Info., 1 page.
"DigitalSecurityCamera:1 Device Template version 1.01," For UPnP Version 1.0, Standardized Dcp, Mar. 24, 2005, 8 pages.
"DigitalSecurityCameraMotionlmage:1 Service Template Version 1.01," For UPnP Version 1.0, Standardized DCP, Mar. 24, 2005, 23 pages.
"DigitalSecurityCameraSettings:1 Service Template Version 1.01," For UPnP Version 1.0, Standardized DCP, Mar. 24, 2005, 18 pages.
"DigitalSecurityCameraStillImage:1 Service Template Version 1.01," For UPnP Version 1.0, Standardized DCP, Mar. 24, 2005, 20 pages.
"DimmableLight:1 Device Template Version 1.01," For UPnP Version 1.0, Standardized DCP, Nov. 23, 2003, 7 pages.
"Dimming:1 Service Template Version 1.01," For UPnP Version 1.0, Standardized DCP, Nov. 23, 2003, 29 pages.
"D-Link Unveils 1st UPnP-Enabled Central Home Storage Drive," PR Newswire, Sep. 16, 2003, pp. 1-3.
"D-Link Wireless Media Player Validated by Intel to Meet Interoperability Guidelines D-Link is the First Major Networking Device Manufacturer to Earn Intel(R) Networked Media Product Requirements (Intel(R) NMPR) Conformance Validation," PR Newswire, May 4, 2004, 4 pages.
D-Link's New Wireless Media Device Plays Digital Music, Videos, and Photos on Home Television and Stereo New D-Link Digital Home Solution Merges Home Entertainment Center With Home Network for Seamless Delivery of Multimedia Content Anywhere in the Home, Jan. 20, 2004, 4 pages.
Ailara, "DLNA Strides Toward Consumer-Friendly Home Networked Devices With New Interoperability Guidelines," DLNA, Jun. 22, 2004, 4 pages.
"Don't Dream It. Stream It. Streamium Broadband Internet Micro System MCi200," Copyright 2001, Philips Consumer Electronic Company, 2 pages.
"Downloadable Kerbango Logos," Kerbango, Inc., date unknown, 2 pages.
DV Archive From Wikipedia, the free encyclopedia, en.wikipedia.org/wiki/DVArchive, printed on Sep. 3, 2013.
Brumitt, Barry, "Easy Living: Technologies for Intelligent Environments," The Easy Living Project, Microsoft Research, Handheld and Ubigitous Computing, 2nd International Symposium, Bristol, UKSep. 2000, 12 pages.
Aguilera, M.K. and Strom, R.E., "Efficient Atomic Broadcast Using Deterministic Merge," Proceedings of ACM Symposium on Principles of Distributed Computing (PODC), Jul. 16-19, 2000, copyright 2000, ACM, New York, New York, 10 pages.
Brassil, Jack, "Enhancing Internet Streaming Media with Cueing Protocols," IEEE INFOCOM 2001.
"Enigma Digital and Kerbango Enter Strategic Promotional Relationship to Offer Music Lifestyles at the Touch of a Button," Santa Monica, CA and Cupertino, CA, Mar. 16, 2000, 2 pages.

(56) References Cited

OTHER PUBLICATIONS

"Bluetooth—The Universal Radio Interface for AdHoc, Wireless Connectivity," Ericsson Review: The Telecommunications Technology Journal, vol. 75, No. 3., 1998, 44 pages.
"Escient and Audio Request Compatibility Memo (ZR-4630)," Niles Audio Corporation, Dec. 4, 2002, 1 page.
"P800/P802," Sony Ericsson White Paper, Jan. 2003, pp. 1-14, 24-25, 36, 70-72, 87-88, 94, and 112 (24 pages).
Expert Report of Dr. Kevin C. Almeroth, ITC Investigation No. 337-TA-882, filed Nov. 12, 2013, 178 pages.
Expert Report of Jerry Black, Ph.D., ITC Investigation No. 337-TA-882, filed Nov. 12, 2013, 26 pages.
Expert Report of Kevin Jeffay Ph.D., ITC Investigation No. 337-TA-882, filed Nov. 12, 2013, 155 pages.
"ExternalActivity:1.0 Service Template Version 1.01," For UPnP version 1.0, Standardized DCP, Sep. 11, 2002, 16 pages.
Huhn, Mary, "Fed Up With Radio? Create Your Own Online Station," New York Post, at <http://pqasb.pqarchiver.com/nypost/access/68457933.html?FMT=FT&di . . . >, Nov. 22, 1998, printed Oct. 13, 2009, 2 pages.
"Feeder:1.0 Service Template Version 1.01," For UPnP Version 1.0, Standardized DCP, Sep. 11, 2002, 20 pages.
Final Written Decision of IPR, with regard to U.S. Pat. No. 8,230,873, Mar. 18, 2015 (Inter Partes Review No. IPR2013-00598), 24 pages.
Hauver, David, "Flycasting: Using Collaborative Filtering to Generate a Playlist for Online Radio," Dept. Of Computer Science, University of Virginia, IEEE 2001.
Mandayan Raghunath et al., "Fostering a Symbiotic Handheld Environment," IEEE Computer Society, pp. 56-65, Sep. 2003.
"Frequently Asked Questions about Intermind's Patents," downloaded from <http://www.intermind.com/materials/patent_faq.html> on Feb. 27, 1998, 9 pages.
Bonanno, C., "From the Computer Room to the Living Room: The Future of Digital Home Audio," Home Toys Article, Aug. 2000 (Archived at http://web.archive.org/web/200302020092947/http://hometoys.com/htinews/aug00/articles/tbeach/tbeach.htm) 2 pages.
Williams, "Gadgets getting connected with DLNA," PC World Business Centre, Oct. 14, 2004, 3 pages.
"Goombah" Preview, at <http://www.goombah.com/preview.html>, printed Jan. 8, 2008, 5 pages.
"The HAVi Specification Version 1.1 of the Home Audio/Video Interoperability (HAVi) Architecture," HAVi, Inc., May 15, 2001, 529 pages.
Jussi Teirikangas, "HAVi: Home Audio Video Interoperability," Helsinki University of Technology, 2001, 10 pages.
DHWG/DLNA, "HNv1 Approved Phase 1 Use Cases," Digital Home Working Group, Jan. 29, 2004, pp. 1-23.
DHWG/DLNA, "HNv1 Approved Phase 2 Use Cases," Digital Home Working Group, Jan. 29, 2004, pp. 1-18.
"Home Control Via Touch Panel," Elan Home Systems, Copyright 2002, 4 pages.
"2003 Canadian Product Catalog," Home Director, Trusted Technology Advisor for Builders, Version 6.4, Copyright 2003, Home Director, Inc., 30 pages.
"Home Director Announces Availability of AudioPoint Digital Audio Receiver; Play MP3 Digital Music or Streaming Internet Radio on Conventional Stereo Equipment," PR Newswire, Sep. 27, 2002, 4 pages.
"Home Director Announces Availability of AudioPoint Digital Audio Receiver; Play MP3 Digital Music or Streaming Internet Radio on Conventional Stereo Equipment," PR Newswire, Sep. 27, 2002, 2 pages.
"Home Director: Innovations in Home Networking," Home Director, Inc., Copyright 2002 (Archived at web.archive.org/web/20031129164409/http://homedirector.com/) 1 page.
"Home Entertainment Solutions," SimpleDevices, Apr, 13, 2004, http://web.archive.org/web/20040413030604/http://www.simpledevices.co m/homeentertainment.shtml, 1 page.

Peter M. Corcoran et al., "Home Network Infrastructure for Handheld/Wearable Appliances," IEEE Transactions on Consumer Electronics, vol. 48, No. 3, Aug. 2002, pp. 490-495.
DHWG/DLNA, "Home Networked Device Ineroperability Guidelines v1.0," Digital Living Network Alliance, 2004, pp. 1-202.
DHWG/DLNA, "Home Networked Device Ineroperability Guidelines White Paper," Digital Living Network Alliance, Jun. 2004, pp. 1-16.
Wong, W., "Home Networking Opens Its Doors for Business," CNET News, Oct. 19, 1999, 4 pages.
Miller, "Home Networking with Universal Plug and Play," IEEE Communications Magazine, Dec. 2001 vol. 39 No. 12, 16 pages.
"HouseStatus:1 Service Template for UPnP Device Architecture 1.0," Standardized DCP, May 13, 2003, Contributing Members of the UPnP Forum, 17 pages.
"HP Digital Entertainment Center Owner's Guide: DE100C," Copyright 2001, Hewlett-Packard Company, 118 pages.
"HP Digital Media Receiver User's Guide," Copyright 2002, Hewlett-Packard Company, 67 pages.
"HVAC_FanOperatingMode:1 Service Template for UPnP Device Architecture 1.0," Standardized DCP, May 13, 2003, Contributing Members of the UPnP Forum, 12 pages.
"HVAC_SetpointSchedulel Service Template for UPnP Device Architecture 1.0," Contributing Members of the UPnP Forum, 2003, 16 pages.
"HVAC_System:1 Device Template for UPnP Device Architecture 1.0," Contributing Members of the UPnP Forum, 2003, 8 pages.
"HVAC_UserOperatingMode:1 Service Template for UPnP Device Architecture 1.0," Contributing Members of the UPnP Forum, 2003, 15 pages.
"HVAC_ZoneThermostat:1 Device Template for UPnP Device Architecture 1.0," Contributing Members of the UPnP Forum, 2003, 10 pages.
Kaplan, Marc A., "IBM Cryptolopes Tm, SuperDistribution and Digital Rights Management," found at <http://www.research.ibm.com/people/k/kaplan/cryptolope-docs/crypap.html> from the Internet Archive, copyright Dec. 30, 1996, IBM Corporation, printed Mar. 15, 2000, 7 pages.
"IBM Launches Business to Deploy Multimedia Applications and Services," Jan. 20, 1993, 3 pages.
Ma; Gibbs; Kaplan, "IDTV Broadcast Applications for a Handheld Device," Panasonic Technologies Co., IEEE Communications Society, pp. 85-89, 2004 IEEE.
Krigel, Beth Lipton, "Imagine Radio spinning off," CNET News, at <http://news.cnet.com/Imagine-Radio-spinning-off/2100-1033_3-213613.html>, Jul. 22, 1998, printed Oct. 13, 2009, 3 pages.
"iMerge M1000 SoundServer—Specs," iMerge Ltd, Manufactured Nov. 2000-Aug. 2003 (downloaded from the Internet Oct. 12, 2013) <URL:www.imerge.co.uk/products/m1000/m1000_home.php> 2 pages.
"iMerge M1000 SoundServer User Guide," Copyright 2001, iMerge Ltd., 40 pages.
"Imerge Multi-room SoundServer Application note," Issue 1.1, Aug. 2000, 9 pages.
"iMerge S1000 SoundServer—Specs," iMerge Ltd, Manufactured May 2001-Nov. 2002 (downloaded from the Internet Oct. 12, 2013) <URL:www.imerge.co.uk/products/s1000/s1000_home.php> 2 pages.
"iMerge S1000 SoundServer User Guide," Copyright 2001, iMerge Ltd., 60 pages.
"iMerge S2000 SoundServer—Specs," iMerge Ltd, Manufactured Nov. 2002-Aug. 2004 (downloaded from the Internet Oct. 12, 2013) <URL:www.imerge.co.uk/products/s2000/s2000_home.php> 2 pages.
"iMerge S2000 SoundServer Hard Disk Audio System User Guide," Copyright 2002, iMerge Ltd., 48 pages.
Veronica Hendricks, "Imerge SoundServer," Techonline, http://www.techonline.com/scripts/tol.exe?TEMPLATE,top.ops&AREA,1&CONTENT,8988&NET,13&USER.todd_Bergeson@3com.com, Copyright 1999-2000 TechOnLine, Inc., printed Sep. 22, 2000, 2 pages.
"iMerge XiVA Server Utilities Application Note," Copyright 2002, iMerge Ltd., 4 pages.

(56) References Cited

OTHER PUBLICATIONS

"iMerge XiVA Server Utilities User Manual," Copyright 2002, iMerge Ltd., 4 pages.
Vacca, John, "I-Mode Crash Course," McGraw-Hill, 2002, 4 pages.
"InboundConnectionConfig:1 Service," For UPnP Version 1.0, Standardized DCP, Sep. 30, 2009, Document Version 1.0, Service Template Version 2.0, 21 pages.
Carroll, J., "Industries Blind to What's Ahead," Globe & Mail, Mar. 12, 2001, 2 pages.
"InferNote is an exploration tool for your music collection," at <http://www.itweaks.com/infdoc/index.html>, copyright 2004, otherslikeyou.com Inc., printed Feb. 7, 2007, 13 pages.
"InputConfig:1 Service," For UPnP Verson 1.0, Standardized DCP (SDCP) Mar. 22, 2011, Document Version 1.0, Service Template Version 2.00, 43 pages.
Schulzrinne, "Integrated Internet Appliances: More than Just a Phone," Internet Real-Time (IRT) Laboratory, Columbia University, Feb. 15, 1999.
"Intel accelerates the delivery of the digital home with the extended wireless PC initiative," TV Meets the Web, Sep. 10, 2002, pp. 1-2.
Schwartz, Ephraim, "Intel moving into home electronics with new digital initiative; Chipmaker to support Microsoft UPnP as way to connect TVs and stereos," InfoWorld, Sep. 9, 2002, pp. 1-3.
Salvator, Dave, "Intel Pushes Plug and Play Into Homes ; Universal Plug and Play and 802.11 remain the technology Intel is betting on to infiltrate home entertainment networks," ExtremeTech.com, Sep. 10, 2002, pp. 1-3.
"Intel UPnP -Based Remote I/O Developer's Guide," Version 0.4, Intel Corporation, Sep. 12, 2003, 25 pages.
Lemon, Sumner, "Intel: Digital media adapters to hit market in 2003; Dell, Gateway, Mitac, Legend set to launch adapters next year," InfoWorld, Oct. 15, 2002, 2 pages.
"IntelliControl Home Theater Automation System," Niles Audio Corporation, Copyright 2003, 8 pages.
Drummond; Ionescu; Holte, "Intelligent Browsing for Multimedia Applications," University of Ottawa, Proceedings of Multimedia '96, pp. 386-89, 1996 IEEE.
Egyhazy et al., "Intelligent Web Search Agents," at <http://csgrad.cs.vt.eduhtplunket/article.html>, pp. 1-23, printed Dec. 20, 1999, 23 pages.
"Intel's Digital Home Vision Moves Closer to Reality With New Industry Enabling Building Blocks," Business Wire, Feb. 28, 2003, pp. 1-4.
"Intermind Announces Approval of First Patent Application," dated Oct. 7, 1997, downloaded from <http://www.intermind.com/inside/press_rel/100797_allow.html>, 3 pages.
"Internet Audio iM Jukebox (PC Link) Set-Up" Quick Reference Guide—Internet Audio Operations, iM Jukebox, Apr. 20, 2001, 2 pages.
"Internet Audio Mini Hi-Fi System," Philips FwW-i1000 Manual, EL4965E006/MAC4110/12-98, 106 pages.
Stoll, Felderhoff, Spikofski, "Internet Radio and Excellent Audio Quality; Dreamboat or Reality?" IBC'97, Amsterdam, Sep. 12-16, 1997.
Crouch, Cameron, "Internet radio dumps the PC; New stand-alone devices let you listen to Web-based broadcasts, from CDs to radio stations. (Kerbango/AudioRamp.com) (Product Information)," Network World, Feb. 14, 2000, 2 pages.
"Internet Radio Feature Proposal," Anonymous, Date Unknown, 6 pages.
"InternetGatewayDevice:1 Device Template Version 1.01 for UPnP Version 1.0," Contributing Members of the UPnP Forum, 2001, 15 pages.
"InternetGatewayDevice:2 Device Template Version 1.01," for UPnP Versions 1.0 and 1.1, Standardized DCP (SDCP), Version 1.00, Dec. 10, 2010, 28 pages.
"Interoperable Home Infrastructure," Intel Technology Journal, vol. 6, Issue 04, ISSN 1535-766X, Nov. 15, 2002, 78 pages.
"Introducing the Digital Home Working Group," Digital Home Working Group, 2004, 16 pages.

"iPAQ Music Center—Addendum A," Copyright 2002, Compaq Computer Corporation, 38 pages.
"iPronto—Dashboard for the Digital Home," Copyright 2002, Philips Consumer Electronics, 13 pages.
"iPronto tsi6400—Getting Started," Philips, date unknown, 9 pages.
"iPronto tsi6400—Getting Started," Philips, date unknown, 4 pages.
"iPronto tsi6400 Installation Guide," Copyright Royal Philips Electronics NV (date unknown) 67 pages.
"Is Bluetooth Worth the Wait?" The Economist, Dec. 7, 2000, 7 pages.
Carroll, J., "Is This Guy Crazy or Just Way Ahead of His Time," Link Magazine, Jul. 2002, pp. 18-20.
Jeronimo, "It Just Works: UPnP in the Digital Home," Oct. 5, 2004, http://www.artima.com/spontaneous/upnp digihome.html, 16 pages.
"Respondents' and Intervenor's Joint Notice of Prior Art," ITC Investigation No. 337-TA-882, filed Oct. 25, 2013, 49 pages.
Declaration of Kevin Jeffay, Ph.D., with regard to U.S. Pat. No. 8,050,652, May 8, 2014 (Inter Partes Review No. IPR2014-00737), 37 pages.
Expert Report of Dr. Kevin Jeffay, Exhibit No. 35—Lipscomb Chart directed to U.S. Pat. No. 8,050,652, 71 pages.
Expert Report of Dr. Kevin Jeffay, Exhibit No. 58—RealPlayer Chart directed to U.S. Pat. No. 8,050,652, 98 pages.
O'Hara, K., et al., "Jukola: Democratic Music Choice in a Public Space," DIS 2004, Aug. 1-4, 2004, Cambridge, MA pp. 145-154.
"Searching," Kerbango, Inc., date unknown, 4 pages.
"Kerbango," from Wikipedia, the free encyclopedia, en.wikipedia.org/wiki/Kerbango, Last Modified May 16, 2012, 2 pages.
Kerbango AM/FM Internet Radio, Kerbango.com, publication date unknown, DS-01-041100, 2 pages.
Metcalfe, Bob, "Kerbango AM/FM/IM Radio moves us toward the Broadcast Internet," web.archive.org/web/20081229161920/http://www.infoworld.com/articles/op/xml/00/06/12/000612opmetcalfe.html, printed Sep. 2, 2013, 3 pages.
"Kerbango and ApplianceWare Deliver Digital Music Library," Indian Wells, California Demo 2000, Feb. 7, 2000 (3Com Corporation Press Release) 2 pages.
"Kerbango and Arbitron Strike Strategic Alliance to Enhance Internet Radio Industry's Most In-Depth Research to Internet Broadcasters and Advertisers," Cupertino, CA and New York, NY, May 23, 2000, 4 pages.
"Kerbango and Interep Interactive Team Up on Advertising for Kerbango Internet Radio," Boston, MA, Radio Ink Internet Conference, May 17, 2000, Kerbango, Inc., 2 pages.
Image of Kerbango Device, rear perspective, date unknown, 1 page.
Image of Kerbango Device, front perspective, date unknown, 1 page.
Image of Kerbango Device, front side perspective, date unknown, 1 page.
Kerbango FAQ web.archive.org/web/20000617123538/http://kerbango.com/radio/faq.html, Jun. 17, 2000, printed Sep. 2, 2013, 2 pages.
"Kerbango Group Photo," Kerbango, Inc., date unknown, 1 page.
"Identity—Ingredient Brand: Sizing and Clear Space," Kerbango, Inc., date unknown (updated 0.02.01-luckow) 2 pages.
Kerbango Internet Radio, "www.gadgetcentral.com/kerbango_intro.html," posted Jan. 2000, 2 pages.
"Kerbango Internet Radio by 3Com Clinches Awards at the 2001 International Consumer Electronics Show: World's First Stand-Alone Internet Radio Appliance Wins CEA Innovations 2001 "Best of Show" Lauren and Dealerscope Magazine's "Editors' Choice" Award," Jan. 8, 2001, 2 pages.
"Kerbango Internet Radio, Product Intro," http://web.archive.org/web/20000824175603, Apr. 1, 2000, 3 pages.
"Kerbango Internet Radio, Product Intro," http://web.archive.org/web/20000522143057, Apr. 1, 2000, 3 pages.
"Kerbango Partner Quotes," Kerbango, Inc., date unknown, 5 pages.
"Kerbango Partners," Kerbango, Inc., date unknown, 1 page.
"Kerbango Photo," Kerbango, Inc., date unknown, 1 page.
"Kerbango Presentation," Kerbango, Inc., date unknown, 18 pages.

(56) References Cited

OTHER PUBLICATIONS

"Kerbango Radio AM FM Internet, Model 100E for Broadband Connections, Tuning Service," Copyright 2000, Kerbango, a division of 3Com Corporation, DS-01-091300, 2 pages.
"What the Reviewers Think of Kerbango," Kerbango, Inc., date unknown, 2 pages.
Kerbango Software Screenshot, Kerbango, Inc., date unknown, 1 page.
Kerbango Software Screenshot - Search Results, Kerbango, Inc., date unknown, 1 page.
Kerbango Tuning Service, Kerbango.com, publication date unknown, DS-02-041100, 2 pages.
Kerbango Tuning Service Screenshot, Kerbango, Inc., Mar. 1, 2000, 1 page.
Kerbango Tuning Service Screenshot, Kerbango, Inc., Mar. 1, 2000, (Archived at web.archive.org/web/20000301135348/http://www.kerbango.com/tuner/index.html?fcn_menu=1&tuning_id=0&bwc=) 1 page.
"Kerbango Tuning Service User Guide," Copyright 2000, Kerbango, Inc., (Archived at web.archive.org/web/.../http://www.kerbango.com/help/index.html?play_sound=1) 3 pages.
Kerbango User Guide, web.archive.org/web/20000614154943/http://kerbango.com/help/index.html?bwc=, Kerbango, Inc, 3 pages.
"LANDevice:1 Device Template Version 1.01 for UPnP Version 1.0," Contributing Members of the UPnP Forum, 2001, 9 pages.
"LANHostConfigManagement:1 Service Template Version 1.01 for UPnP Version 1.0," Contributing Members of the UPnP Forum, 2001, 27 pages.
"Lansonic Capabilities," [online] Aug. 17, 2000 [Downloaded from the Internet on Aug. 23, 2013] URL: <web.archive.org/web/20000817023735/http://www.lansonic.com/capability.htm> (p. 6 of Yamaha Corporation of America Exhibit 1013) 1 page.
"Lansonic Company Information," [online] Sep. 18, 2000 [Downloaded from the Internet on Aug. 23, 2013] URL: <web.archive.org/web/20000918102826/http://www.lansonic.com/co info.htm> (p. 20 of Yamaha Corporation of America Exhibit 1013) 1 page.
"Lansonic Digital Audio Server Das-750," Sep. 18, 2000, 21 pages.
"Lansonic DAS-750 Digital Audio Server Operating Instructions, Version 2.2.0," Copyright 2001, Digital Voice Systems, Inc. (Feb. 2, 2002) 104 pages.
"Lansonic DAS-750 Product Photographs," [online] Jun. 19, 2000 [Downloaded from the Internet on Aug. 23, 2013] URL: <web.archive.org/web/20000619153458/http://www.lansonic.com/photos.htm> (p. 7 of Yamaha Corporation of America Exhibit 1013) 1 page.
"Lansonic DAS-750 Product Photographs—Enlarged Front," [online] Jun. 20, 2000 [Downloaded from the Internet on Aug. 23, 2013] URL: <web.archive.org/web/20000620195000/http://www.lansonic.com/images/a_ned_front.jpg> (p. 8 of Yamaha Corporation of America Exhibit 1013) 1 page.
"Lansonic DAS-750 User Manual," [online] Sep. 18, 2000 [Downloaded from the Internet on Aug. 23, 2013] URL: <web.archive.org/web/20000918102806/http://www.lansonic.com/excertps.htm> (pp. 12-17 of Yamaha Corporation of America Exhibit 1013) 6 pages.
"Lansonic DAS-950 Pro Series," [online] Feb. 2, 2002 [Downloaded from the Internet on Jan. 21, 2014] URL: <web.archive.org . . . http://www.lansonic.com/DAS-950_main.htm> 2 pages.
"Lansonic Digital Audio Server and MP3 Player Frequently Asked Questions," [online] Aug. 17, 2000 [Downloaded from the Internet on Aug. 23, 2013] URL: <web.archive.org/web/20000817023740/http://www.lansonic.com/faq_3_1_00.htm> (pp. 9-11 of Yamaha Corporation of America Exhibit 1013) 3 pages.
"Lansonic Digital Audio Server DAS-750," [online] Sep. 18, 2000 [Downloaded from the Internet on Aug. 23, 2013] URL: <web.archive.org/web/20000918102747/http://www.lansonic.com/configuration.htm> (pp. 1-2 of Yamaha Corporation of America Exhibit 1013) 2 pages.

"Lansonic Ignites Digital Music Revolution," [online] Press Release Dated Jan. 5, 2000 [Downloaded from the Internet on Aug. 23, 2013] Downloaded from Internet Archive Dated Jun. 19, 2000, URL: <web.archive.org/web/20000619182933/http://www.lansonic.com/pr.htm> (p. 21 of Yamaha Corporation of America Exhibit 1013) 1 page.
"Lansonic Order Form," [online] Aug. 17, 2000 [Downloaded from the Internet on Aug. 23, 2013] URL: <web.archive.org/web/20000817024550/http://www.lansonic.com/order.htm> (pp. 18-19 of Yamaha Corporation of America Exhibit 1013) 2 pages.
"Lansonic Professional Series—Digital Audio Server—Operating Instructions," Version 2.2.0, Feb. 2002, DAS-750-PRO, 120 pages.
"Lansonic Specifications," [online] Aug. 17, 2000 [Downloaded from the Internet on Aug. 23, 2013] URL: <web.archive.org/web/20000817023726/http://www.lansonic.com/specifications.htm> (p. 5 of Yamaha Corporation of America Exhibit 1013) 1 page.
"Lansonic's New 3-Zone Output Digital Audio Server," CEDIA, 2002, Westford, MA, Home Toys, date unknown (CEDIA Expo 2002 held Sep. 25-29, 2002,Minneapolis, MN) 3 pages.
"LAUNCHcast Radio—Yahoo! Messenger," http://messenger.yahoo.com/launch.php, copyright 2007 Yahoo! Inc., printed Nov. 8, 2007, 1 page.
"Layer3Forwarding:1 Service Template Version 1.01 for UPnP Version 1.0," Contributing Members of the UPnP Forum, 2001, 14 pages.
Brumbaugh, Pete, "Leading GPS Innovator Takes Wireless to the Streets," Garmin Int'l, Oct. 1, 1998, 1 page.
Lehmann-Haupt, Rachel, "Library/Internet Radio; Listeners Take on Role of the Deejay," The New York Times, at <http://www.nytimes.com/1998/11/05/technology/library-internetradio-lis . . . >, Nov. 5, 1998, printed Oct. 13, 2009, 2 pages.
Lehmann-Haupt, Rachel, "Library/Internet Radio; On Spinner, Wide Range of Choices," The New York Times, at <http://www.nytimes.com/1998/11/05/technology/library-internet-radio-on-spinner-wide-range-of-choices.html?scp=18,sq=On . . . >, Nov. 5, 1998, printed Oct. 15, 2009, 5 pages.
Lehmann-Haupt, Rachel, "Library/Internet Radio; Web Radio Expands Listening Horizons," The New York Times, at <http://www.nytimes.com/1998/11/05/technology/library-internet-radio-web-radio-expands-listening-horizons.html?scp=28,sq= . . . >, Nov. 5, 1998, printed Oct. 15, 2009, 5 pages.
Mascia, J. and Reddy, S., "cs219 Project Report—Lifetrak: Music in Tune With Your Life," Department of Electrical Engineering, UCLA '06, Los Angeles, California, copyright 2006, ACM, 11 pages.
"LinkAuthentication:1," Service Template Version 1.01, For UPnP Version 1.0, Standardized Dcp, Oct. 17, 2003, 32 pages.
"Linksys Quick Installation Guide—Instant Wireless Series WPC11 ver. 3.0," Date Unknown, QIWPC11 ver. 3.0-012201NC KL, 9 pages.
"Liquid Audio Products and Services," http://web.archive.org/web/20000615070537, Jun. 15, 2000, printed on Sep. 24, 2013.
"Live365's Extensive Internet Radio Station Collection Coming to 3COM Kerbangosm Tuning Service," Santa Clara, CA, Jan. 8, 2001, 3 pages.
Boswell, Wendy, "Loading'Quintura—Search With Quintura, a Tag Cloud Search Engine'," at <http://websearch.about.com/od/dailywebsearchtips/qt/dnt0830.htm?p=1>, copyright 2007, About.com, Inc., printed Oct. 17, 2007, 1 page.
"LowPowerDevice:1 Service Template Version 1.01," For UPnP Version 1.0, Design Complete, Aug. 28, 2007, Document Version 1.00, 23 pages.
"LowPowerProxy:1 Service Template Version 1.01," For UPnP Version 1.0, Standardized Dcp, Aug. 28, 2007, Document Version 1.00, 18 pages.
"ManageableDevice:1 Device Template Version 1.01," for UPnP Version 1.0, Standardized DCP (SDCP) Jul. 20, 2010, 14 pages.
"ManageableDevice:2 Device Template Version 1.01," for UPnP Version 1.0, Standardized DCP (SDCP) Feb. 16, 2012, 23 pages.
"Many New ELAN Products Shipping Around Ces 2003," Lexington, KY, Home Toys, date unknown (CES 2003 held Jan. 9-19, 2003, Las Vegas, NV) 2 pages.

(56) References Cited

OTHER PUBLICATIONS

"Master's Projects of the KR&R Group," Faculty of Sciences, Vrije Universiteit, Amsterdam, URL unknown, publication date unknown, obtained on or prior to Apr. 22, 2009, 7 pages.
MCi200 Streamium Broadband Internet Micro System, Philips Electronics, 2001, 2 pages.
MC-i200 Streamium Micro Hi-Fi System manual, Philips Consumer Electronics North America, publication date unknown, 39 pages.
MCi250 Streamium Broadband Internet Micro System, Philips Electronics, 2002, 2 pages.
MC-i250 Wireless Broadband Internet Audio System, Philips Electronics, publication date unknown, 42 pages.
"Mediabolic Incorporates Support for UPnP Technology into the Mediabolic ONE Platform," Business Wire, Jan. 6, 2003, pp. 1-2.
"MediaManagement:1 Service," For UPnP Verson 1.0, Standardized DCP (SDCP) Mar. 22, 2011, Document Version 1.0, Service Template Version 2.00, 228 pages.
"MediaManagement:2 Service," For UPnP Verson 1.0, Standardized DCP (SDCP) Dec. 10, 2012, Document Version 1.0, Service Template Version 2.00, 192 pages.
Ritchie, J., "MediaRenderer:1 Device Template Version 1.01," For UPnP 1.0, Standardized DCP, Jun. 25, 2002, UPnP Forum, 12 pages.
"MediaRenderer:2 Device Template Version 1.01," for UPnP Version 1.0, Standardized DCP, Sep. 30, 2008, Version 1.0, 26 pages.
"MediaRenderer:3 Device," For UPnP Version 1.0, Standardized DCP (SDCP) Dec. 31, 2010, Device Template Version 1.01, 29 pages.
"MediaRenderer1.xml," date unknown, 1 page.
"MediaRenderer2.xml," date unknown, 1 page.
"MediaServer:1 and Media Render:1." http://upnp.org/specs/av/av1, p. 1, approved Jun. 24, 2002, printed Oct. 2/, 2013.
"MediaServer:1 Device Template Version 1.01 for UPnP 1.0," Contributing Members of the UPnP Forum, Jun. 25, 2002, 12 pages.
"MediaServer:2 Device Template Version 1.01," For UPnP Version 1.0, Approved Standard, May 31, 2006, Document Version 1.00, 24 pages.
"MediaServer:3 Device Template Version 1.01," For UPnP Version 1.0, Standardized Dcp, Sep. 30, 2008, Document Version 1.0, 26 pages.
"MediaServer:4 Device," For UPnP Version 1.0, Standardized DCP (SDCP) Dec. 31, 2010, Device Template Version 1.01, 29 pages.
"MediaServer1.xml," date unknown, 1 page.
"MediaServer2.xml," date unknown, 1 page.
"MediaServer3.xml," date unknown, 1 page.
"MegaTouch Combo Jukebox Owner's Manual," Copyright 2003, Merit Industries, Inc., PM0378-07, 58 pages.
"MegaTunes Owners Manual," Copyright 2004, Merit Industries, Inc., PM0396-07, 30 pages.
"Merit Remote Sound System Installation Manual," Copyright 2003, Merit Industries, Inc., PM0397-02, 14 pages.
"Messaging:1 Service," For UPnP Verson 1.0, Standardized DCP (SDCP) Mar. 22, 2011, Document Version 1.0, Service Template Version 2.00, 72 pages.
"Messaging:2 Service," For UPnP Verson 1.0, Standardized DCP (SDCP) Dec. 10, 2012, Document Version 1.0, Service Template Version 2.00, 74 pages.
DHWG/DLNA, "MHS Use Case Proposal Samsung," r1.0, Digital Home Working Group, Feb. 25, 2004, pp. 1-36.
"Microsoft Announces Windows Media Connect Technology, Enabling Seamless Media Transfer Between Windows XP-Based PCs and Consumer Electronics Devices," PR Newswire, Jan. 7, 2004, pp. 1-5.
Maloney, P., "Microsoft's MongoMusic.com "Sounds Like" a Possible Winner," RAIN Radio and Internet Newsletter, Sep. 26, 2000, 6 pages.
Henry, Alan, "MixxMaker: The Mix Tape Goes Online," Jan. 18, 2008, AppScout, found at <http://appscout.pcmag.com/crazy-start-ups-vc-time/276029-mixxmaker-the-mix-tape-goes-online#fbid=DfUZtDa46ye>, printed Nov. 15, 2011, 4 pages.

Tomas Bostrom, Susanne Eliasson, Per Lindtorp, Fabio Moioli and Mats Nystrom, "Mobile Audio Distribution," Royal Institue of Technology, Stockholm, Sweden, Personal Technologies (1999) vol. 3, Issue 4, pp. 166-172.
"Mobile Networking with WAP," Friedr, Vieweg, Sohn, 1st Edition 2000, 4 pages.
"Mobile Use Cases Passed for HNv1," Digital Home Working Group, Oct. 18, 2003, 18 pages.
"MongoMusic.com and Kerbango Team Up to Personalize Internet Radio for Consumers," Cupertino, CA and Menlo Park, CA, Mar. 13, 2000, 3 pages.
"MontaVista's Hard Hat Linux Embedded in World's First Stand-alone Internet Radio," Indian Wells, CA, Demo 2000, Feb. 7, 2000, 2 pages.
Spring, T., "Move MP3s to Home Stereo," Computerworld, Apr. 28, 2000, 3 pages.
Spring, T., "Move MP3s to Your Home Stereo," Cnn.com, May 1, 2000, (http://europe.cnn.com/2000/Tech/computing/05/01.mnp3.stereo.idg/index.html) 3 pages.
Knudsen, C., "MP3 Linux Players," Linux Journal, vol. 1999 Issue 63es, Jul. 1999, Article 10 (5 pages).
Hacker, S., "MP3: The Definitive Guide," O'Reilly, 1st Ed. Mar. 2000, 378 pages.
Hacker, S., "MP3: The Definitive Guide, Sample Chapter 6, Hardware, Portables, Home Stereos, and Kits," 1st Edition Mar. 2000, 32 pages.
"MSN—Music," http://music.msn.com/help/sync, copyright 2007 Microsoft, printed Nov. 16, 2007, 1 page.
Schmid, P., "Multimedia in the Living Room: From DVD Player to Media Center," Mar. 12, 2004 (www.tomsguide.com/us/multimedia-in-the-living-room,review-243-9.html) 4 pages.
Schmid, P., "Multimedia in the Living Room: From DVD Player to Media Center: 7. Cd3o C300," Tom's Guide—Home Theatre—Home Theatre Review, Mar. 12, 2004, 4 pages.
Schmid, P., "Multimedia in the Living Room: From DVD Player to Media Center: 9. Cd3o C300, Continued," Tom's Guide—Home Theatre—Home Theatre Review, Mar. 12, 2004, 4 pages.
Schmandt, Chris, "Multimedia Nomadic Services on Today's Hardware," IEEE Network Sep./Oct. 1994.
"MultiZone Audio Preamplifier Installation & Operation Guide: Four-Source, Six-Zone Preamplifier," A4.6Ci, Copyright 2002, Niles Audio Corporation, 107 pages.
"Multi-Zone With Escient Tune-Base CD Mgmt," AVS Forums, Nov. 11, 2000, Copyright 2013 AVS, 6 pages.
"Music Artist Cloud," at <http://artistcloud.camaris.be/>, copyright 2007, mac, printed Oct. 17, 2007, 2 pages.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
Rose, "Music in the Home: Interfaces for Music Appliances," Personal Technologies (2000) vol. 4, Issue 1, pp. 45-53.
Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrical Engineering, Mathematics and Computer Science, Delft University of Technology, Delft, the Netherlands, 2003, 23 pages.
Weiss, A., "Music Selection for Internet Radio," Department of Computer Science, University of Cantergury, New Zealand, Nov. 3, 2000, 56 pages.
Brown, B., et al., "Music Sharing as a Computer Supported Collaborative Application," HP Laboratories Bristol, HPL-2001-103, May 2, 2001, 21 pages.
"musicstrands.com—Because Music is Social," brochure, copyright 2006, MusicStrands, Inc., 2 pages.
"MyStrands Download," at <http://www.mystrands.com/overview.vm>, copyright 2003-2007, MediaStrands, Inc., printed Feb. 7, 2007, 3 pages.
"MyStrands Labs: Patent-pending Technologies," at <http://labs.mystrands.com/patents.html>, earliest description from Nov. 2004,printed Feb. 7, 2007, 5 pages.

(56) References Cited

OTHER PUBLICATIONS

"Napster.co.uk—Napster to Go," http://www.napster.co.uk/ntg.html, copyright 2003-2007 Napster, LLC, printed Nov. 15, 2007, 2 pages.
"National and Local Weather Forecast, Radar, Map and Report," http://www.weather.com/, copyright 1995-2007 The Weather Channel Interactive, Inc., printed Feb. 7, 2007, 3 pages.
NavTalk Cellular Phone/Gps Receiver Bill of Material, Garmin, Sep. 10, 1998.
NavTalk Quick Guide, Revision A, Garmin, Jan. 23, 1999, 3 pages.
"NEC to Demonstrate a Series of Mobile Internet Applications and Service Creation Software for the European Market at 3GSM 2003," JCN Newswire, Feb. 12, 2003, 2 pages.
"Network Gateway Solutions," SimpleDevices, Apr. 13, 2004, http://web.archive.org/web/20040413033546/http://www.simpledevices.co m/network gateway.shtml, 1 page.
"Networked MP3 Player Lineup Bows From cd3o," Twice, Jan. 9, 2003 (www.twice.com/news/networked-mp3-player-lineup-bows-cd3o-0) 1 page.
Lea, Rodger, "Networking Home Entertainment Devices with HAVi," Embedded Systems, Sep. 2000, 9 pages.
"NetX Getting Started Guide," Philips, date unknown, 7 pages.
"New Devices Boost MP3 Use at Home," CNET News, May 24, 2000, 3 pages.
Gribble, "The Ninja Jukebox," Ninja Research Group, presentation date unknown, Univ. of Cal. at Berkeley.
"NPR : National Public Radio : News & Analysis, World, US, Music & Arts," http://www.npr.org, Copyright 2007 NPR, printed Oct. 16, 2007, 7 pages.
"Nullsoft SHOUTcast," http://web.archive.org/web/20000815054138, Aug. 15, 2000, printed on Sep. 24, 2013.
"Omnifi DMSI User Manual," Omnifi Media, Jul. 2003, 36 pages.
"Oregan Networks Demonstrates UPnP Enabled," PR Newswire, Feb. 18, 2003, pp. 1-3.
Intel, "Overview of UPnP* AV Architecture: A Digital Media Distribution Technology for the Home," Research and Development at Intel, Version 1.00, Jul. 2, 2003, copyright 2003 Intel Corporation, 10 pages.
"FAQ," at <http://blog.pandora.com/faq/>, copyright 2005-2006, Pandora Media, Inc., printed Aug. 8, 2006, 20 pages.
"Pandora—Frequently Asked Questions," from <http:www.pandora.com>, obtained on or prior to Apr. 22, 2009, copyright 2005-2009, Pandora Media, Inc., 48 pages.
"Pandora Internet Radio—Find New Music, Listen to Free Web Radio," at <http://www.pandora.com/>, copyright 2005-2007, Pandora Media, Inc., printed Feb. 7, 2007, 1 page.
"Pandora Radio—Listen to Free Internet Radio, Find New Music—The Music Genome Project," at <http://www.pandora.com/mgp>, copyright 2005-2007, Pandora Media, Inc., printed Oct. 26, 2007, 1 page.
Patent Owner's Preliminary Response to Inter Partes Review of U.S. Pat. No. 8,050,652 (Inter Partes Review No. IPR2013-00594) Filed Dec. 26, 2013, 57 pages.
Patent Owner's Preliminary Response to Inter Partes Review of U.S. Pat. No. 8,214,873 (Inter Partes Review No. IPR2013-00598) Filed Dec. 26, 2013, 63 pages.
Patent Owner's Preliminary Response to Inter Partes Review of U.S. Pat. No. 8,028,323 (Inter Partes Review No. IPR2014-00709) Filed Aug. 5, 2014, 47 pages.
Patent Owner's Preliminary Response to Inter Partes Review of U.S. Pat. No. 8,214,873 (Inter Partes Review No. IPR2014-00723) Filed Aug. 11, 2014, 51 pages.
Patent Owner's Preliminary Response to Inter Partes Review of U.S. Pat. No. 8,050,652 (Inter Partes Review No. IPR2014-00737) Filed Aug. 20, 2014, 67 pages.
Patent Owner's Preliminary Response to Inter Partes Review of U.S. Pat. No. 8,214,873 (Inter Partes Review No. IPR2014-00766) Filed Aug. 28, 2014, 68 pages.
International Search Report for PCT/GB01/03069 mailed Oct. 11, 2002, 3 pages.

Adam Field, Pieter Hartel, Wim Mooij, "Personal DJ, an Architecture for Personalised Content Delivery," wvvw10, ACM 1-58113-348-0, May 1-5, 2001.
Petition for Inter Partes Review of U.S. Pat. No. 8,050,652 (Inter Partes Review No. IPR2015-00334) Filed Dec. 3, 2014, 64 pages.
Petition for Inter Partes Review of U.S. Pat. No. 8,214,873 (Inter Partes Review No. IPR2014-00766) Filed May 16, 2014, 52 pages.
Petition for Inter Partes Review of U.S. Pat. No. 8,028,323 (Inter Partes Review No. IPR2014-00709) Filed Apr. 30, 2014, 65 pages.
Petition for Inter Partes Review of U.S. Pat. No. 8,050,652 (Inter Partes Review No. IPR2014-00737) Filed May 8, 2014, 64 pages.
Petition for Inter Partes Review of U.S. Pat. No. 8,050,652 (Inter Partes Review No. IPR2015-00590) Filed Jan. 21, 2015, 62 pages.
Petition for Inter Partes Review of U.S. Pat. No. 8,028,323 (Inter Partes Review No. IPR2015-00337) Filed Dec. 3, 2014, 60 pages.
Petition for Inter Partes Review of U.S. Pat. No. 8,050,652 (Inter Partes Review No. IPR2013-00594) Filed Sep. 18, 2013, 65 pages.
Petition for Inter Partes Review of U.S. Pat. No. 8,214,873 (Inter Partes Review No. IPR2013-00598) Filed Sep. 18, 2013, 65 pages.
Petition for Inter Partes Review of U.S. Pat. No. 8,214,873 (Inter Partes Review No. IPR2014-00723) Filed May 1, 2014, 66 pages.
Petition for Inter Partes Review of U.S. Pat. No. 8,214,873 (Inter Partes Review No. IPR2015-00339) Filed Dec. 3, 2014, 64 pages.
Petitioner Yamaha Corporation of America's Reply to Patent Owner Response (Inter Partes Review No. IPR2013-00594) Filed Aug. 12, 2014, 21 pages.
Petitioner Yamaha Corporation of America's Reply to Patent Owner Response (Inter Partes Review No. IPR2013-00598) Filed Aug. 12, 2014, 22 pages.
Wallace, Brice, "Philips aims to blur TV-PC line," Deseret Morning News, Jan. 8, 2004, 3 pages.
"Philips Consumer Electronics Unveils 'Connected Planet' Strategy," Pressi.com, Aug. 28, 2003, pp. 1-3.
"PhoneManagement:1," For UPnP Verson 1.0, Standardized DCP (SDCP) Mar. 22, 2011, Document Version 1.0, Service Template Version 2.00, 53 pages.
"PhoneManagement:2," For UPnP Verson 1.0, Standardized DCP (SDCP) Dec. 10, 2012, Document Version 1.0, Service Template Version 2.00, 74 pages.
USDC N. Dist. of CA, Case No. C-99-5183 MHP, Plaintiffs' Memorandum of Points and Authorities in Opposition to Defendant Napster, Inc.'s Motion for Summary Adjudication on the Applicability of the 17 U.S.C. '512(a) Safe Harbor Affirmative Defense.
"PlayCD: 1 Sample Service Template for UPnP Version 1.0," Contributing Members of the UPnP Forum, 2001, 18 pages.
Belmont, "Playlist requirements," Intel, Oct. 29, 2003, pp. 1-3.
"News! Dec. 2001," Practically Networked, Dec. 2001, online <URL:http://www.practically.networked.com/news/news_12_01.htm> 7 pages.
"Presence:1 Service," For UPnP Verson 1.0, Standardized DCP (SDCP) Dec. 10, 2012, Document Version 1.0, Service Template Version 2.00, 37 pages.
"PrintBasic:1 Service Template Version 1.01," for UPnP Version 1.0, Approved Standard, Aug. 8, 2002, 42 pages.
"PrintEnhanced:1 Service Template Version 1.01," For UPnP Version 1.0, Standardized DCP, Oct. 28, 2006, Document Revision 1.01, 83 pages.
Griffith, Eric, "PRISMIQ MediaPlayer," http://www.wifiplanet.com/print/reviews/article.php/3091181/PRISMIQ-MediaPlayer.htm, printed Oct. 10, 2013, 2 pages.
PRISMIQ MediaPlayer User Guide, PRISMIQ, Inc. 2003, 44 pages.
PRISMIQ Teams with RealNetworks to Give Consumers Access to Rhapsody on Home Stereos Prismiq/Rhapsody Combo on Display During CES; Visit TechHome TechZone (Booth #17695, South Hall 2) and RealNetworks booth (#22611, South Hall) at Las Vegas Convention Center, 5 pages.
Little, T.D.C., et al., "Prospects for Interactive Video-On-Demand," (MCL Technical Report, Feb. 15, 1994) IEEE Multimedia, vol. 1, No. 3, Fall 1994, 22 pages.
Merkel, Oliver et al., "Protecting VoD the Easier Way," Proceedings of the sixth ACM International Conference on Multimedia, Sep. 13-16, 1998, Bristol, United Kingdom, 1998, pp. 21-28, 8 pages.

(56) References Cited

OTHER PUBLICATIONS

Young, Cliff, "Protium, an Infrastructure for Partitioned Applications," Bell Laboratories, Lucent Technologies, IEEE 2001.
Helbig, Tobias; Schreyer, Oliver, "Protocol for Browsing in Continuous Data for Cooperative Multi-Server and Multi-Client Applications," Philips Research Laboratories, IDMS'98, LNCS 1483, pp. 231-236, 1998.
Salonidis, T., "Proximity Awareness and Ad Hoc Network Establishment in Bluetooth," Electrical and Computer Engineering Department, University of Maryland; AT&T Labs Research; IBM T.J.Watson Research Center (2001) 26 pages.
"ProxiWeb Fact Sheet," web.archive.org/web/19991022065434/http://www.proxinet.com /products n serv/proxiweb, ProxiNet, Inc. 1999, 1 page.
"Q3 2002 SONICblue Earnings Conference Call—Final," FD (Fair Disclosure) Wire, Nov. 6, 2002, 10 pages.
"QoSDevice:1," For UPnP Version 1.0, Mar. 10, 2005, 28 pages.
"QoSDevice:1 Erratum," UPnP Forum, Jul. 14, 2006, 25 pages.
"QoSManager:1," For UPnP Version 1.0, Mar. 10, 2005, 34 pages.
"QoSManager:1 Erratum," UPnP Forum, Jul. 14, 2006, 31 pages.
"QoSManager:1 Second Erratum," UPnP Forum, Aug. 4, 2008, 2 pages.
"QoSManager:2 Erratum," UPnP Forum, Jul. 31, 2008, 2 pages.
"QoSPolicyHolder 1.0," For UPnP Version 1.02, Mar. 10, 2005, 16 pages.
"QoSPolicyHolder:1 Erratum," UPnP Forum, Jul. 14, 2006, 6 pages.
"RAClient:1 Device," for UPnP Version 1.0, Standardized DCP, Sep. 30, 2009, Document Version 1.0, Device Template Version 2.00, 13 pages.
"RADAConfig:1 Service," for UPnP Version 1.0, Standardized DCP, Sep. 30, 2009, Document Version 1.0, Device Template Version 2.00, 20 pages.
"RADAConfig:2 Service," For UPnP Version 1.0, Standardized DCP, Apr. 30, 2011, Document Version 1.0, Device Template Version 2.00, 38 pages.
"RADASync:1 Service," For UPnP Version 1.0, Standardized Dcp, Sep. 30, 2009, Document Version 1.0, Device Template Version 2.00, 29 pages.
"RADASync:2 Service," For UPnP Version 1.0, Standardized DCP, Apr. 30, 2010, Document Version 1.0, Device Template Version 2.00, 32 pages.
Baig, Edward, "Radio days: Out of the past, into the future," USA Today, Jan. 31, 2001, 4 pages.
Krigel, Beth Lipton, "Radio features at center of Net law," CNET News, at <http://news.cnet.com/Radio-features-at-center-of-Net-law/2100-1033_3-214752.html>, Aug. 24, 1998, printed Oct. 15, 2009, 2 pages.
Weller, Mary, "Radio Station Software: Programmes That Meet Your Stations Needs," Music & Media, Nov. 28, 1992, p. 11, Copyright 1995, Information Access Co., 3 pages.
Greenberg, K., "Radio the Hard-Drive Way," ADWEEK, Jun. 12, 2000, 2 pages.
"Radiolinja Finland Selects 724 Solutions X-treme Mobility Gateway; XMG Enables New Content-Rich Data Services," Business Wire, Jul. 8, 2003, 2 pages.
"RADiscoveryAgent:1 Device," For UPnP Version 1.0, Standardized DCP, Sep. 30, 2009, Document Version 1.0, Device Template Version 2.00, 13 pages.
"RADiscoveryAgent:2 Device," For UPnP Version 1.0, Standardized DCP, Apr. 30, 2010, Document Version 1.0, Device Template Version 2.00, 13 pages.
"RadiusClient:1," Service Template Version 1.01, For UPnP Version 1.0, Standardized DCP, Oct. 17, 2003, 12 pages.
"RAServer:1 Device," For UPnP Version 1.0, Standardized Dcp, Sep. 30, 2009, Document Version 1.0, Device Template Version 2.00, 14 pages.
"RAServer:2 Device," For UPnP Version 1.0, Standardized Dcp, Apr. 30, 2011, Document Version 1.0, Device Template Version 2.00, 16 pages.

"RATAConfig:1 Service," For UPnP Version 1.0, Standardized Dcp, Sep. 30, 2009, Document Version 1.0, Device Template Version 2.00, 54 pages.
"RCA Radio Photo," RCA, date unknown, 1 page.
"RCS Acquires Decision Inc.; Offers Complete Software Solution for Radio Station Programming Operations," Businesswire, Feb. 9, 1993, Copyright 1995, Reuters Info. Svcs., 2 pages.
Johnston, M., et al., "Real Networks," Case Study, revised Feb. 18, 1998 (copyright © Kotha & Johnston) 17 pages.
Akst, Daniel, "RealAudio Gives Rise to Online Radio Programs," Los Angeles Times, Jul. 8, 1996.
RealAudio Server, Administrator's Guide, Release 2.0, Progressive Networks, Inc., 1996.
"RealPlayer Plus Specifications," http://web.archive.org/web/19980121234859, Jan. 21, 1998, printed on Sep. 24, 2013.
RealPlayer 7 Plus User Manual, RealNetworks, Inc. 2000, 117 pages.
RealPlayer 8 Plus User Manual, RealNetworks, Inc. 2000, 112 pages.
"RealPlayer Plus 5.0 Makes Your Computer the World's Coolest Entertainment Center," http://web.archive.org/web/19980121234541/http://www.real.com, Jan. 21, 1998.
"RealPlayer Plus G2 Manual," Copyright 1998-1999, Real Networks, Inc., 82 pages.
RealServer Administration and Content Creation Guide, Version 4.0, Progressive Networks, Inc., 1995-1997.
RealServer Administration Guide RealServer 7.0 Powered by RealSystem G2, RealNetworks, 1998-1999.
RealServer Administration Guide RealServer G2, RealNetworks, 1997.
"Redband's Broadcasting's Audio Programs Now Available on the Kerbango Internet Tuning Service," San Francisco, CA, Sep. 21, 2000, 2 pages.
"Reinventing Radio," Kerbango Overview, Jul. 2000, Kerbango, Inc., 3 pages.
"Reinventing Radio: Internet Startup-Kerbango-Debuts at Upside's Launch," Kerbango Resources, Cupertino, California, Oct. 13, 1999, <http://www.tuner.espace.com/press/101399.html> 4 pages.
"TRM: The Universal Barcode for Music and Media from Relatable," found at <http://relatable.com/tech/trm.html>, copyright 2000-2003, Relatable, printed Oct. 3, 2011, 1 page.
"Relatable's Open Source Audio Signature Solution, TRM," found at <http://www.relatable.com/tech/trm.html>, on the Internet Archive, Copyright 2000, Relatable, printed Nov. 28, 2007, 2 pages.
"Relatable's Open Source Audio Signature Solution, TRM," http://web.archive.org/web/20001117082600/http://www.relatable.com/tec h/trm.html, copyright Relatable 2000, printed Nov. 28, 2007, 2 pages.
"Release Noties MC-i200/250," Philips, Date Unknown, 2 pages.
"Remote Access Architecture:1 for UPnP Version 1.0," 2009 UPnP, Sep. 30, 2009, pp. 1-30.
"Remote Access Architecture:2," For UPnP Version 1.0, Standardized Dcp, Apr. 30, 2011, Document Version 1.0, Service Template Version 2.00, 53 pages.
Wendorft, Roli, "Remote Execution of HAVi Applications on Inernet-Enabled Devices," Philips Research, IEEE, Jun. 25, 2001, 11 pages.
"RemoteUIClient:1 Service Template Version 1.01," Ffor UPnP version 1.0, Standardized DCP, Sep. 2, 2004, 29 pages.
"RemoteUIClientDevice:1 Device Template Version 1.01," For UPnP version 1.0, Standardized DCP, Sep. 2, 2004, 11 pages.
"RemoteUIServer Device:1 Device Template Version 1.01," For UPnP version 1.0, Standardized DCP, Sep. 2, 2004, 11 pages.
"RemoteUIServer:1 Server Template Version 1.01," For UPnP version 1.0, Standardized Dcp, Sep. 2, 2004, 20 pages.
"RenderingControl: 1 Service Template Version 1.01 for UPnP Version 1.0," Contributing Members of the UPnP Forum, Jun. 25, 2002, 63 pages.
"RenderingControl:1 Service Annex A—Control Point Requirements," for UPnP Version 1.0, Standardized DCP Annex, Oct. 6, 2010, Service Template Version 2.00, 5 pages.
"RenderingControl:1 Service Template Version 1.01," for UPnP Version 1.0, Standardized DCP, Jun. 25, 2002, 63 pages.

(56) References Cited

OTHER PUBLICATIONS

"RenderingControl:2 Service Annex A—Control Point Requirements," for UPnP Version 1.0, Standardized DCP Annex, Oct. 6, 2010, Service Template Version 2.00, 5 pages.
"RenderingControl:2 Service Template Version 1.01," for UPnP Version 1.0, Approved Standard, May 31, 2006, Document Version 1.00, 84 pages.
"RenderingControl:3 Service," For UPnP Version 1.0, Standardized DCP (SDCP) Dec. 31, 2010, Service Template Version 1.01, 144 pages.
"RenderingControl1.SyntaxTests.xml," date unknown, 6 pages.
"RenderingControl1.xml," date unknown, 11 pages.
"RenderingControl2.SyntaxTests.xml," date unknown, 7 pages.
"RenderingControl2.xml," date unknown, 14 pages.
Palenchar, Joseph, "Replay Tv to boost promotions, distribution. (Twice News)," HighBeam Research, Jun. 9, 2003, 2 pages.
ReplayTV From Wikipedia, the free encyclopedia, en.wikipedia.org/wiki/Replayty, printed on Sep. 3, 2013, 6 pages.
"Rhapsody—Full-length music, videos and more—Free," http://www.rhapsody.com/welcome.html, copyright 2001-2007 Listen.com, printed Feb. 7, 2007, 1 page.
"Rio Advanced Digital Audio Center, User's Guide," SONICblue, Inc., Copyright 2001-2002, 116 pages.
"Rio One User Guide," Copyright 2001, SONICblue Incorporated, 23 pages.
"Rio PMP300 User's Guide," Copyright 1998, Diamond Multimedia Systems, Ltd., 27 pages.
"Rio500 Getting Started Guide," Copyright 1999, Diamond Multimedia Systems, Ltd., 2 pages.
"RioReceiver—Getting Started," Copyright 2002, SONICblue, Inc., 4 pages.
Wolz, Ursula, "r-MUSIC, A Collaborative Music DJ for Ad Hoc Networks," Dept. of Computer Science, the College of New Jersey, Proceedings of the Fourth International Conference on Web Delivering of Music (WEDELMUSIC'04) 2004.
"Rockford's Omnifi(TM) Awarded TechTV's Best of CES," PR Newswire, Jan. 16, 2003, pp. 1-3.
"Roku Control Protocol—Functional Specification," Jul. 13, 2006, Version 2.0, Roku, LLC, 135 pages.
"Roku SoundBridge M1000 and M2000," PCMag.com, http://www.pcmag.com/article2/0,2817,1646246,00.asp, Sep. 20, 2004, 5 pages.
Bell, Ian, "Roku Soundbridge M1000 Review," http://www.digitaltrends.com/media-streamer-reviews/roku-soundbridge-m1000-review, Dec. 14, 2004, 8 pages.
"Roku SoundBridge M1000/M1001 Network Music System," [online] Jul. 18, 2012, <URL:http://www.amazon.com/Roku-SoundBridge-M1001-Network-System/dp/B000B|6AH8//> 6 pages.
"Roku SoundBridge Network Music Player," Copyright 2006, Roku, LLC, 2 pages.
"Roku SoundBridge Network Music Player User Guide," Roku, LLC, date unknown, 67 pages.
"Roku SoundBridge Network Music Player User Guide, Software V. 2.5," Copyright 2006, Roku, LLC, 74 pages.
"SoundBridge Radio Wi-Fi Music System User Guide, Software V. 2.5," Roku, LLC, date unknown, 51 pages.
"Roku SoundBridge Wi-Fi Setup Instructions," Revision 1.2, Aug. 31, 2004, 14 pages.
"Roku Unveils New Award-Winning Network Music Players; Roku SoundBridge Features Sleek Design, Large Display, Apple iTunes Support," http://www.businesswire.com/news/home/20040107005285/en, Jan. 7, 2004, 3 pages.
"Roku Unveils SoundBridge Music Player," Online Reporter, Jan. 10, 2004, pp. 1-2.
"User Guide for Software Release 1.5.18, HD1000," Copyright 2004, Roku, Llc (Revised 4/29/04) 34 pp.
Nickell, Joe Ashbrook, "Roll Your Own Radio," at <http://www.wired.com/print/culture/lifestyle/news/1998/08/14706>, Aug. 28, 1998, printed Oct. 13, 2009, 1 page.

"Roxio the Boom Box Music and recording reviews—CNET Reviews," http://reviews.cnet.com/music-and-recording/roxio-the-boom-box/4505-3669_7-3141440 . . . , printed Nov. 15, 2007, 4 pages.
"SB1—SqueezeboxWiki," Copyright 2012, Logitech (http://wiki.slimdevices.com/index.php?title=SB1&oldid=10934) 1 page.
"Scan:1.0 Service Template Version 1.01," For UPnP Version 1.0, Standardized DCP, Sep. 11, 2002, 54 pages.
"Scanner:1.0 Device Template Version 1.01," For UPnP Version 1.0, Standardized DCP, Sep. 11, 2002, 9 pages.
"ScheduledRecording:1 Service Annex A—Control Point Requirements," For UPnP Version 1.0, Standardized DCP Annex, Oct. 6, 2010, Service Template Version: 2.00, 5 pages.
"ScheduledRecording:1 Service Template Version 1.01," For UPnP Version 1.0, Approved Standard, May 31, 2006, Document Version 1.00, 267 pages.
"ScheduledRecording:2 Service," For UPnP Version 1.0, Standardized DCP (SDCP) Dec. 31, 2010, Service Template Version 1.01, 245 pages.
"ScheduledRecording:2 Service Annex A—Control Point Requirements," For UPnP Version 1.0, Standardized DCP Annex, Oct. 6, 2010, Service Template Version: 2.00, 5 pages.
"ScheduledRecording:2 Service Template Version 1.01," For UPnP Version 1.0, Standardized Dcp, Sep. 30, 2008, Document Version 1.0, 273 pages.
"Scheduled Recording1.SyntaxTests.xml," date unknown, 4 pages.
"ScheduledRecording1.xml," date unknown, 7 pages.
"ScheduledRecording2.SyntaxTests.xml," date unknown, 4 pages.
"ScheduledRecording2.xml," date unknown, 7 pages.
Madan, Sameer, "Search the Web without a headache," PC World (India), pp. 40-41, Feb. 1998, printed Dec. 20, 1999, 2 pages.
"Searching and Browsing Radio Time," URL unknown, publication date unknown, obtained on or prior to Apr. 22, 2009, 3 pages.
Lamantia, Joe, "Second Generation Tag Clouds," Feb. 23, 2006, at <http://www.joelamantia.com/blog/archives/ideas/second_generation_tag_clouds.html>, copyright 2006, Joe Lamantia, printed Nov. 29, 2007, 19 pages.
"SecurityConsole:1 Service Template for UPnP Device Architure 1.0," Contributing Members of the UPnP Forum, 2003, 20 pages.
Bussey, H., et al., "Service Architecture, Prototype Description, and Network Implications of a Personalized Information Grazing Service," INFOCOM '90, Ninth Annual Joint Conference of the IEEE Computer and Communication Societies, pp. 1046-1053.
"ServiceType:V Formatting (MS Word) Guidelines," Contribuing Members of the UPnP Forum, 2008, 26 pages.
"Set-top Solutions," SimpleDevices, Apr. 13, 2004, http://web.archive.org/web/20040413044713/http://wvvw.simpledevices.com/settop.shtml, 1 page.
Smyers, Scott, "Sharing Digital Content in the Home," Digital Home Working Group, Oct. 7, 2003, 17 pages.
Stone, Glen, "Sharing Digital Content in the Home," Digital Home Working Group, Oct. 23, 2003, 23 pages.
"SHOUTcast Online Documentation," http://web.archive.org/web/20000815054155, Jul. 20, 1999, printed on Sep. 24, 2013.
"SHOUTcast Online Documentation—Configuring your SHOUTcast Server," http://web.archive.org/web/20000620161230, Jul. 20, 1999, printed on Sep. 24, 2013.
"SHOUTcast Online Documentation—How SHOUTcast works," http://web.archive.org/web/20000620182733, Jul. 20, 1999, printed on Sep. 24, 2013.
"SHOUTcast Online Documentation—What is SHOUTcast?" http://web.archive.org/web/20000620145452, Jul. 20, 1999, printed on Sep. 24, 2013.
"SHOUTcast Online Documentation—FAQ Advanced Topics," http://web.archive.org/web/20000619163953, Jul. 20, 1999, printed on Sep. 24, 2013.
"SHOUTcast Online Documentation—FAQ Troubleshooting," http://web.archive.org/web/20000619191320, Jul. 20, 1999, printed on Sep. 24, 2013.
"SHOUTcast Online Documentation—What is the SHOUTcast Server?" http://web.archive.org/web/20000620063713, Jul. 20, 1999, printed on Sep. 24, 2013.

(56) References Cited

OTHER PUBLICATIONS

"SHOUTcast Online Documentation—What Platforms Are Supported," http://web.archive.org/web/20001029073229, Jul. 20, 1999, printed on Sep. 24, 2013.
"SHOUTcast Server—Version 1.7.x Available!," http://web.archive.org/web/20000815054151, Aug. 15, 2000, printed on Sep. 24, 2013.
"SimpleCenter," SimpleDevices, May 2, 2004, http://web.archive.org/web/20040502165145/http://simpledevices.com/sim plecenter.shtml, 1 pages.
"SimpleDevices Announces New Partnerships for its SimpleWare Integration and Interoperability Program," Business Wire, Jan. 15, 2004, pp. 1-3.
"SimpleDevices has developed a flexible, standards-based media server software development kit that transforms a gateway device into an intelligent and powerful media server," SimpleDevices, Apr. 13, 2004, http://web.archive.org/web/20040413143346/http://, 1 page.
"SimpleDevices Product Showcase," SimpleDevices, Apr. 14, 2004, http://web.archive.org/web/20040414041500/http://www.simpledevices.co m/showcase.shtml, 1 page.
"SimpleDevices Product Solutions," SimpleDevices, Apr. 14, 2004, http://web.archive.org/web/20040414072007/http://www.simpledevices.co m/solutions.shtml, 1 page.
"SimpleDevices Releases New Ver. Software, SimpleWare 2.0," PR Newswire, Jan. 9, 2003, pp. 1-4.
"SimpleDevices Releases New Version of its Software, SimpleWare 2.0," Jan. 9, 2002, http://web.archive.org/web/20040413144147/http://simpledevices.com/pre ss releases/01 09 2003 simpleware.shtml, 2 pages.
"Simplefi Wireless Digital Audio Receiver, Installation & User Guide," Copyright 2001, Motorola, Inc., 111 pages.
"SimpleWare Software Technologies," SimpleDevices, Apr. 13, 2004, http://web.archive.org/web/20040413042557/http://www.simpledevices.co m/products.shtml, 1 page.
"SimpleWare Software Technologies," SimpleDevices, Jul. 10, 2004, http://web.archive.org/web/20040710135809/http://www.simpledevices.co m/products.shtml, 1 page.
Gibbs, M., "Sit Back and Listen to the Tunes," Network World, Aug. 19, 2002, 5 pages.
SL300i Wifi Wireless Multimedia Link Instructions for use, www.philips.com/streamium, publication date unknown, 54 pages.
SL300i Wireless Multimedia Link, Philips Electronics, 2003, 2 pages.
"SL400i," SimpleDevices, Apr. 13, 2004, http://web.archive.org/web/20040413145728/http://simpledevices.com/sho wcase philips.shtml, 1 page.
SL400i Wifi Wireless Multimedia Link Instructions for use, www.philips.com/streamium, publication date unknown, 55 pages.
SL400i Wireless Multimedia Link, Philips Electronics, 2003, 2 pages.
SLIMP3—SqueezeboxWiki, Copyright 2012, Logitech (http://wiki.slimdevices.com/index.php?title=SLIMP3&oldid=10936) 1 page.
"SliMP3 Ethernet MP3 Player Owner's Manual," Slim Devices, Inc. 2002, 16 pages.
"SLIMP3 Network MP3 Player," Slim Devices, Inc. 2002, 2 pages.
"SLIMP3 Network MP3 Player Owners Manual," Copyright 2003, Slim Devices Inc., Revision Apr. 5, 2003, 15 pages.
Hayes, Conor; Cunningham, Padraig, "Smart Radio—a proposal," Dublin, Trinity College Dublin, Department of Computer Science, TCD-CS-1999-24, 1999, pp. 14.
"Smil 2.0," Editor Peiy Liu, Siemens Corporate Research, IEEE 2001.
Nwana, H. S., "Software Agents: An Overview," Knowledge Engineering Review, vol. 11, No. 3, pp. 205-244, Oct./Nov. 1996, 49 pages.
"SoftwareManagement:1 Service Template Version 1.01," for UPnP Version 1.0, Standardized DCP (SDCP) Jul. 20, 2010, 76 pages.

"SoftwareManagement:2 Service Template Version 1.01," For UPnP Version 1.0, Standardized DCP (SDCP) Feb. 16, 2012, 88 pages.
"SolarProtectionBlind:1 Device Template Version 1.01," Ffor UPnP Version 1.0, Standardized DCP, Sep. 9, 2008, 7 pages.
"Solutions for Content Providers," SimpleDevices, Inc., Apr. 13, 2004, http://web.archive.org/web/20040413025938/http://www.simpledevices.co m/content provider.shtml, 1 page.
"Solutions for Internet Service Providers," SimpleDevices, Apr, 13, 2004, http://web.archive.org/web/20040413031950/http://wvvw.simpledevices.co m/isp.shtml, 1 page.
Townley, J., "Sonicbox Releases iM Software Tuner," InternetNews.com, Apr. 11, 2000, 2 pages.
"Sony Unveils Palm-Powered Handheld Strategy," CNET News, Jul. 13, 2000, 5 pages.
"SoundBridge User Guide: Wireless Network Music Player, Software Version 2.5," Copyright 2006, Roku, LLC, 37 pages.
"Squeezebox (Network Music Player)," from Wikipedia, the free encyclopedia, en.wikipedia.org/wiki/Squeezebox_(network_music_player), Last Modified Mar. 31, 2012, 5 pages.
"Squeezebox Owner's Guide," Slim Devices, Inc., 2003, 22 pages.
"Squeezebox the wireless MP3 player for your digital stereo," Slim Devices, Inc., 2003, 2 pages.
Berniker, Mark, "StarSight launches stand-alone program guide receiver. (StarSight Telecast's CB1500 for cable television operators) (Brief Article)," Broadcasting & Cable, HighBeam Research, Dec. 5, 1994, 1 page.
Walton, Brian, "StarSight: the Future of Television Today," Washington Informer, HighBeam Research, Jun. 22, 1995, 2 pages.
"Start Listening with Last.fm," at <http://www.last.fm/>, date unknown but may date back as early as 2002, 1 page.
"Start Listening with Last.fm—Scrobbling You Say?" http://www.last.fm/, 1 page, Jul. 23, 2008.
Tatarinov, I., "Static Caching in Web Servers - Abstract," Proceedings of the 6th International Conference on Computer Communications and Networks, Sep. 22-25, 1997, 2 pages.
Ng, W.C.T., et al., "Streaming Multimedia Content Over Home Network With an Intelligent Controller," The 29th Annual Conference of the IEEE, Nov. 2-6, 2003, Copyright 2003 IEEE, pp. 1802-1807.
"Streamium MC-i200 Getting Started," Philips, May 31, 2002, 2 pages.
"Streamium Micro Hi-Fi System Mc-i200 Manual," Philips, Date Unknown, 39 pages.
"Streamium Micro Hi-Fi System MC-i200 Manual—English/French/Spanish Language Version," Philips, Date Unknown, 55 pages.
Nichols; Myers, "Studying the Use of Handhelds to Control Smart Appliances," School of Computer Science, Carnegie Mellon University, Proceedings of the 23rd International Conference on Distributed Computing Systems Workshops (ICDCSW'03), 2003 IEEE, 6 pages.
"Supercomm Products," Connected Planet, May 14, 2001, 1 page.
"SwitchPower:1 Service Template Version 1.02," for UPnP Version 1.0, Standardized DCP, May 1, 2011, 11 pages.
"Tag cloud in standalone player—Feedback and Ideas—Last.fm," at <http://www.last.fm/forum/21717//333289>, posting dated Oct. 4, 2007,copyright 2002-2007, Last.fm Ltd., printed Oct. 17, 2007, 2 pages.
Hearst, Marti A. et al., "Tag Clouds: Data Analysis Tool or Social Signaller?," Proceedings of the 41st Annual Hawaii International Conference on System Sciences (HICSS 2008), Jan. 7-10, 2008, Waikoloa, Big Island, Hawaii, p. 160, available from <http://csd12.computer.org/persagen/DLAbsToc.jsp?resourcePath=/dl/proceedings/&toc=comp/proceedings/hicss/2008/3075/00/3075toc.xml&DOI=10.1109/Hicss.2008.422>, 10 pages.
Cardoza, P., "Take a Look At the Latest Integrated Pda/Cell Phone Devices," [online] Tech Republic, Apr. 8, 2002 (downloaded on Jun. 11, 2013) Downloaded from the Internet: URL: <http://www.techrepublic.com/article/take-a-look-at-the-latest-integrated-pda-cell-phone-devices/>, 3 pages.

(56) References Cited

OTHER PUBLICATIONS

"TalkStreamLive.com—A Dynamic Directory of Streaming Radio," at <http://www.talkstreamlive.com/aboutus.aspx>, from the Internet Archive, dated Aug. 1, 2008, copyright 2006-2008, 3 pages.
"Telephony:1 Security Best Practice," For UPnP Verson 1.0, Standardized DCP (SDCP) Mar. 22, 2011, Document Version 1.0, Service Template Version 2.00, 27 pages.
"TelephonyArchitecture:1," For UPnP Verson 1.0, Standardized DCP (SDCP) Mar. 22, 2011, Document Version 1.0, Service Template Version 2.00, 24 pages.
"TelephonyArchitecture:2," For UPnP Verson 1.0, Standardized DCP (SDCP) Dec. 10, 2012, Document Version 1.0, Service Template Version 2.00, 23 pages.
"TelephonyClient:1 Device," For UPnP Verson 1.0, Standardized DCP (SDCP) Mar. 22, 2011, Document Version 1.0, Service Template Version 2.00, 12 pages.
"TelephonyClient:2 Device," For UPnP Verson 1.0, Standardized DCP (SDCP) Dec. 10, 2012, Document Version 1.0, Service Template Version 2.00, 9 pages.
"TelephonyServer:1 Device," For UPnP Verson 1.0, Standardized DCP (SDCP) Mar. 22, 2011, Document Version 1.0, Service Template Version 2.00, 13 pages.
"TelephonyServer:2 Device," For UPnP Verson 1.0, Standardized DCP (SDCP) Dec. 10, 2012, Document Version 1.0, Service Template Version 2.00, 10 pages.
"TemperatureSensor:1 Service Template for UPnP Device Architecture 1.0," Contributing Members of the UPnP Forum, 2003, 13 pages.
"TemperatureSetpoint:1 Service Template for UPnP Device Architecture 1.0," Contributing Members of the UPnP Forum, 2003, 17 pages.
Roli G. Wendorf; Maarten P. Bodlaender, "Tham 13.2 Remote Execution of HAVi Applications on Internet-Enabled Devices," IEEE 2001, 2 pages.
"The BroadcastWeb Network and Kerbango Sign Co-Marketing Agreement," Boca Raton, FL, Feb. 7, 2000, 3 pages.
Rouarch, Pierre, "The Cloud Search Beta," at <http://www.itcom3.com/thecloudsearch/aboutthecloudsearch.php>, copyright 2007, Pierre Rouarch, printed Oct. 17, 2007, 2 pages.
"The Computer Concepts Traffic System. You'll wonder how you managed without it.," Computer Concepts Corporation, dated Apr. 1990, 1 page.
Van Winkle, W., "The Easy Upgrade," CCNews, Mar. 11, 2003 (Archived at http://www.archive.org/web/20030311134950/http://www.ccnmag.com/index.php?sec+mag&id=134.0) 4 pages.
"The History of Broadcasting and Growth of Internet Audio," Kerbango, Inc., date unknown, 2 pages.
Scherf, K., "The Home Network Market: Data and Multimedia Connectivity, a Parks Associates White Paper," Copyright Sep. 2003, Parks Associates, 13 pages.
Raeder, A., "The Internet Express: Radio on the Internet," The Internet Express, Jul./Aug. 1996, Searcher: the Magazine for Database Professionals, pp. 22 and 24-27 (5 pages).
McCandless, Michael, "The MP3 revolution," IEEE Intelligent Systems, May/Jun. 1999.
Crutcher, Laurence, "The Networked Video Jukebox," IEEE Transactions on Circuits and Systems for Vide:O Technology, vol. 4, No. 2. Apr. 1994.
Moller, Hammar, "The new facilities for the Department for Light and Sound Design of the Theatre Academy of Finland," 95th Covention of AES, Oct. 7-10, 1993.
Goldberg, I., et al., "The Ninja Jukebox," Proceedings of the USITS '99: The 2nd USENIX Symposium on Internet Technologies & Systems, Boulder, Colorado, Oct. 11-14, 1999, 10 pages.
Ian Goldberg, Steven D. Gribble, David Wagner, and Eric A. Brewer, "The Ninja Jukebox," Proceedings of USITS' 99: The 2nd USENIX Symposium on Internet Technologies & Systems Boulder, Colorado, Usa, Oct. 11-14, 1999, 11 pages.
"The Ninja Project," http://web.archive.org/web/20000527172201, May 27, 2000, printed on Sep. 24, 2013.

"The Not So Hard Disk," Wheatstone Corporation, and "ENCO DAD486SX—Digital Audio Delivery System," ENCO Systems, Inc., on facsimile dated Dec. 22, 1993, 5 pages.
Robertson, M., et al., "The Official MP3.com Guide to MP3," Copyright 1999, MP3.com, Inc., San Diego, CA 30 pages.
Robertson, M., et al., "The Official MP3.com Guide to MP3," Copyright 1999, MP3.com, Inc., San Diego, CA 118 pages.
Mcconnell, Chris, "The tapeless revolution comes to radio (disk-based radio broadcasting storage, production and editing systems)," Broadcasting & Cable, v124, n41, p. 77, Oct. 10, 1994, Copyright 1995, Info Access Co., 4 pages.
Gilligan, Gregory, "The TV Is the Center of the Digital Home Connected Electronic Products That Work Together Are Highlight of Show," Richmond Times Dispatch, Jan. 9, 2004.
Gibbon, John F. et al., "The Use of Network Delay Estimation for Multimedia Data Retrieval," IEEE Journal on Selected Areas in Communications, vol. 14, No. 7, Sep. 1996, pp. 13761387, 12 pages.
"Thomson Multimedia Expands Reach of Digital Audio With Plans to Offer Internet Radio Products," Paris, Indianapolis, IN, Jun. 27, 2000, 4 pages.
Brandt, E., et al., "Time in Distributed Real-Time Systems," Carnegie Mellon University, Research Showcase, Computer Science Department, School of Computer Science, Paper 498, Jan. 1, 1999, 5 pages.
Atwood, "Timecast offers custom-designed radio," Billboard, May 11, 1996, p. 54.
Chung, Soon; Pereira, Anil, "Timed Petri Net Representation of the Synchronized Multimedia Integration Language (SMIL) of XML," Dept. of Computer Science and Engineering, Wright State University, Proceedings of the International Conference on Information.
"Join LinkedIn and See How You are Connected to TouchTunes. Its Free," TouchTunes—LinkedIn (date unknown) Downloaded on Jul. 18, 2012 (downloaded from the Internet: <URL:www.linkedin.com/company/touchtunes>) 2 pages.
"TouchTunes Software Manual," Copyright 2003, Merit Industries, Inc., PM0377-03, 22 pages.
Busby, C., "TouchTunes Tyranny: Why the Digital JukeBox Revolution is Revolting,"http://www.thebollard.bangordailynews.com/2009/10/07/touchtunes-tyranny.com) Oct. 7, 2009, 6 pages.
"TuneBase Pro MK-II a CD Library Management System, User's Guide," Document Version 05311999, May 31, 1999, Escient, 56 pages.
LaBanca, R., "Turtle Beach AudioTron," The Home Automation Forum, Copyright 1999 (Archived at http://www.archive.org/web/20021205173424/http://www.homeautomationforum.com/reviews/atron/a tron.html) 2 pages.
LaBanca, R., "Turtle Beach AudioTron Continued: But wait, there's more!" The Home Automation Forum, Oct. 23, 2002 (Archived at http://www.archive.org/web/20021023235309/http://www.homeautomationforum.com/reviews/atron/atron2.html) 3 pages.
LaBanca, R., "Turtle Beach AudioTron Continued: But What About Automation?" The Home Automation Forum, Nov. 4, 2002 (Archived at http://www.archive.org/web/20021104171610/http://www.homeautomationforum.com/reviews/atron/a tron3.html) 2 pages.
Bell, I., "Turtle Beach AudioTron Review," Apr. 17, 2002 (Archived at http://web.archive.org/web/20030103061851/http://www.designtechnica.com/reviews.php?op=showcontent&id=23 &page=3) 2 pages.
Bell, I., "Turtle Beach AudioTron Review," by Corsair, Apr. 17, 2002 (Archived at http://web.archive.org/web/20030212134345/http://www.designtechnica.com/reviews.php?op=showcontent &id=23) 2 pages.
"Turtle Beach AudioTron Review," WhiningDog.net, Jul. 31, 2002 (Archived at http://web.archive.org/web/20030202100233/http://www.whiningdog.net/Reviews/Gadgets/Audio/Mp 3/20020801-AudioTron/page1.htm) 2 pages.
"Turtle Beach AudioTron Review: Navigation and Playback," WhiningDog.net, Jul. 31, 2002 (Archived at http://web.archive.org/web/20030302225111/http://www.whiningdog.net/Reviews/Gadgets/Audio/MP3/20020801-AudioTron/page4.htm) 3 pages.

(56) References Cited

OTHER PUBLICATIONS

"Turtle Beach AudioTron Review: Other Stuff," WhiningDog.net, Jul. 31, 2002 (Archived at http://web.archive.org/web/20030310213307/http://www.whiningdog.net/Reviews/Gadgets/Audio/MP3/20020801-AudioTron/page5.htm) 3 pages.
"Turtle Beach AudioTron Review: Package Contents," WhiningDog.net, Jul. 31, 2002 (Archived at http://web.archive.org/web/20030212215140/http://www.whiningdog.net/Reviews/Gadgets/Audio/MP3/20020801-AudioTron/page2.htm) 4 pages.
"Turtle Beach AudioTron Review: Web Server Interface," WhiningDog.net, Jul. 31, 2002 (Archived at http://web.archive.org/web/20030107223623/http://www.whiningdog.net/Reviews/Gadgets/Audio/MP3/20020801-AudioTron/page3.htm) 3 pages.
Bell, I., "Turtle Beach AudioTron Review," By XMS, Apr. 17, 2002 (Archived at http://web.archive.org/web/20030220223536/http://www.designtechnica.com/reviews.php?op=showcontent&id=23&page=2) 2 pages.
"TV Meets the Web," Financial Times Information Limited, Sep. 10, 2002, 2 pages.
"Two-way Radio for Netizens," Computers Today, Mar. 6, 2000, 2 pages.
"TwoWayMotionMotor:1 Service Template Version 1.01," For UPnP Version 1.0, Standardized Dcp, Jul. 27, 2007, 30 pages.
Mohanty, "UCS Report Digital Home Working Group Board of Directors Meeting," Digital Home Working Group, May 12, 2004, pp. 1-43.
van der Heijden; Taylor, "Understanding WAP Wireless Applications, Devices, and Services," Artech House, 2000, pp. 98-99 (4 pages total).
UPnP, "Universal Plug and Play Device Architecture," Version 1.0, ftp://vtm.upnp.org/upnp/specs/arch/UPnPDA10_20000613.htm, Jun. 8, 2000, pp. 1-54.
Liu, "UPnP and Home Networking at Intel Developer Forum—Fall 2002," UPnPWorld Archives, Jul. 12, 2002, pp. 1-3.
Kang, Dong-Oh, "UPnP AV Architectural Multimedia System with an OSGi Platform," IEEE 2004, 5 pages.
Ritchie, J., et al., "UPnP AV Architecture Version 1.0," Jun. 25, 2002, URL:<http://upnp.org/specs/av/UPnP-av-AVArchitecture-v1-20020625.pdf> 22 pages.
Ritchie, J., et al., "UPnP AV Architecture: 0.83 for UPnP Version 1.0," Preliminary Design, Jun. 12, 2002, Copyright 2000 Contributing Members of the UPnP Forum, 22 pages.
"UPnP AV Architecture: 1 for UPnP Version 1.0," Standardized Dcp, Document Version 1.1, Sep. 30, 2008, 30 pages.
"UPnP AV Architecture: 2 for UPnP Version 1.0," Standardized Dcp, Dec. 31, 2010, 35 pages.
"UPnP AV Datastructure Template: 1," for UPnP Version 1.0, Standardized DCP, Document Version 1.0, Sep. 30, 2008, 28 pages.
"UPnP AVTransport:1 Service Template Version 1.01," for UPnP Version 1.0, Standardized DCP, Jun. 25, 2002, 67 pages.
Jeronimo, "UPnP Design by Example, A Software Developers Guide to Universal Plug and Play," Intel Press, Intel Corp. 2003, 109 pages.
Jeronimo, Weast, "UPnP Design by Example," http://intel.com/intelpress/upnp/index.htm, Dec. 20, 2003, 1 page.
"UPnP Device and Services Templates," ISO-IEC, Nov. 30, 2012, 156 pages.
"UPnP Device Architecture 1.0," UPnP Forum, Oct. 15, 2008, 80 pages.
"UPnP Device Architecture 1.1," UPnP Forum, Oct. 15, 2008, 136 pages.
"UPnP Device Architecture 1.1 Annex A—IP Version 6 Support," Mar. 15, 2011, 15 pages.
"UPnP Device Architecture V1.0 AnnexA—IP Version 6 Support," Contributing Members of the UPnP Forum, 1999-2002 Microsoft Corporation, 11 pages.
"UPnP FanSpeed:1 Service Template Version 1.01," For UPnP Device Architecture 1.0, Standardized DCP, Sep. 21, 2007, 13 pages.
"UPnP Implementers Corporation Certifies First Product in the New AV Device Category; Arcadyan Wireless Home A/V Platform to Display UPnP Certification Logo," Business Wire, Aug. 12, 2003, 3 pages.
"UPnP Low Power Architecture," For UPnP Version 1.0, Design Complete, Aug. 28, 2007, Document Version 1.00, 44 pages.
"UPnP Printer:1 Device Template Version 1.01," For UPnP Device Architecture 1.0, Standardized DCP, Oct. 15, 2008, 7 pages.
"UPnP Printer:1 Device Template Version 1.01, Annex A—Optional Service Addition Version 1.0," For UPnP Device Architecture 1.0, Standardized DCP, Oct. 15, 2008, 4 pages.
"UPnP QoS Architecture:1.0," For UPnP Version 1.0, Mar. 10, 2005, 28 pages.
"UPnP QoS Architecture:2," For UPnP Version 1.0, Standardized DCP, Oct. 16, 2006, Document Version: 1.00, 33 pages.
"UPnP QoSDevice:2 Service Template Version 1.01," For UPnP Version 1.0, Standardized DCP, Oct. 16, 2006, Document Version 1.00, 39 pages.
"UPnP QoSDevice:3 Service Template Version 1.01," For UPnP Version 1.0, Standardized DCP, Nov. 30, 2008, 113 pages.
"UPnP QoSDevice:3 Underlying Technology Interface Addendum Service Template Version 1.01," For UPnP Version 1.0, Standardized DCP, Nov. 30, 2008, 22 pages.
"UPnP QoSManager:2 Service Template Version 1.01," For UPnP Version 1.0, Standardized DCP, Jul. 31, 2008, Document Version 1.00, 37 pages.
"UPnP QoSManager:3 Service Template Version 1.01," For UPnP Version 1.0, Standardized DCP, Nov. 30, 2008, 89 pages.
"UPnP QoSPolicyHolder:2 Service Template Version 1.01," For UPnP Version 1.0, Standardized DCP, Oct. 16, 2006, Document Version 1.00, 16 pages.
"UPnP QoSPolicyHolder:3 Service Template Version 1.01," For UPnP Version 1.0, Standardized DCP, Nov. 30, 2008, 36 pages.
"UPnP Security Ceremonies Design Document for UPnP Device Architecture 1.0," Contributing Members of the UPnP Forum, 2003, 18 pages.
UPnP, "UPnP Vendor's Implementation Guide," http://www.upnp.org/download/UPnP_Vendor_Implementation_Guide, Jan. 5, 2001, pp. 1-8.
"UPnP Vendor's Implementation Guide," Jan. 5, 2001, 5 pages.
UPnP AVWorking Committee, "UPnP XML Data Files for Testing," Jun. 25, 2002, 1 page.
UPnP, UPnPF Membership Database Showing Current 2013 and pre May 2004, 30 pages.
UPnP, UPnPF Membership Database as of Sep. 2003, 92 pages.
"UPnP-av-SchemaFiles," Dec. 31, 2010, 46 pages.
"UPnP-av-SchemaFiles," Mar. 31, 2013, 13 pages.
"UPnP-av-SchemaFiles," Nov. 28, 2007, 12 pages.
"UPnP-av-TestFiles," Dec. 31, 2010, 86 pages.
"UPnP-av-TestFiles," Sep. 27, 2007, 142 pages.
"UPnP-basic-testFiles," Dec. 11, 2002, 3 pages.
"UPnP-cs-SchemaFiles," Mar. 6, 2008, 4 pages.
"UPnP-cs-TestFiles," Mar. 2, 2009, 147 pages.
"UPnP-dm-SchemaFiles," Feb. 16, 2012, 5 pages.
"UPnP-dm-SchemaFiles," Jan. 14, 2010, 4 pages.
"UPnP-dm-TestFiles," Feb. 16, 2012, 194 pages.
"UPnP-dm-TestFiles," Jan. 14, 2010, 233 pages.
"UPnP-gw-IGD-TestFiles," Dec. 10, 2010, 85 pages.
"UPnP-gw-IGD-TestFiles," Feb. 24, 2011, 96 pages.
"UPnP-gw-IGD-TestFiles," Sep. 21, 2001, 62 pages.
"UPnP-gw-SchemaFiles," Feb. 24, 2011, 3 pages.
"UPnP-gw-SchemaFiles," Nov. 3, 2009, 4 pages.
"UPnP-gw-WLAN-TestFiles," Oct. 17, 2003, 45 pages.
"UPnP-ha-DigitalSecurityCameraTestFiles," Mar. 24, 2005, 19 pages.
"UPnP-ha-HVAC-TestFiles," May 13, 2003, 31 pages.
"UPnP-ha-Lighting-TestFiles," Nov. 23, 2003, 14 pages.
"UPnP-ha-SolarProtectionBlind-TestFiles," Sep. 9, 2008, 7 pages.
"UPnP-Ip-SchemaFiles," Apr. 4, 2007, 4 pages.
"UPnP-Ip-TestFiles," Nov. 14, 2008, 7 pages.
"UPnP-phone-SchemaFiles," Dec. 10, 2012, 14 pages.
"UPnP-phone-SchemaFiles," Mar. 22, 2011, 3 pages.
"UPnP-phone-TestFiles," Dec. 10, 2012, 9 pages.

(56) References Cited

OTHER PUBLICATIONS

"UPnP-phone-TestFiles," Mar. 22, 2011, 18 pages.
"UPnP-pntr-SchemaFile," May 9, 2005, 110 pages.
"UPnP-pntr-TestFile," Oct. 28, 2009, 8 pages.
"UPnP-QoS Architecture:3," For UPnP Version 1.0, Standardized DCP, Nov. 30, 2008, 47 pages.
"UPnP-qos-SchemaFiles," Oct. 16, 2006, 13 pages.
"UPnP-qos-SchemaFiles," Dec. 5, 2008, 28 pages.
"UPnP-qos-TestFiles," Aug. 4, 2008, 26 pages.
"UPnP-qos-TestFiles," Nov. 23, 2008, 10 pages.
"UPnP-qos-TestFiles," Oct. 16, 2006, 14 pages.
"UPnP-ra-SchemaFiles," Sep. 30, 2009, 4 pages.
"UPnP-ra-TestFiles," Apr. 30, 2011, 36 pages.
"UPnP-ra-TestFiles," Sep. 30, 2009, 24 pages.
"UPnP-rui-TestFiles," Nov. 14, 2008, 9 pages.
"UPnP-scnr-TestFiles," Sep. 11, 2002, 21 pages.
"UPnP-sec-SchemaFiles," Nov. 20, 2003, 22 pages.
"UPnP-sec-TestFiles," Nov. 14, 2008, 15 pages.
"UpTo11.net—Music Recommendations and Search," at <http://wvvw.upto11.net/>, copyright 20052006, Upto11.net, printed Feb. 7, 2007, 1 page.
DHWG/DLNA, "1. Use Case Ecosystem Selection Criteria for Home Networking version 1.0 Guidelines," Version 1.0 draft Aug. 6, 2003, pp. 1-3.
DHWG/DLNA, "DHWG Use Case Proposal," Version 1.1, Digital Media Network Business, Samsung Electronics Co., Ltd, Aug. 28, 2003, pp. 1-15.
DHWG/DLNA, "Use Case Technical Selection Criteria for Home Networking version 1.0 Guidelines," Version 1.0 draft Aug. 11, 2003, pp. 1-2.
DHWG/DLNA, "Use Cases Passed for HNv1," DHWG, Sep. 11, 2003, pp. 1-74.
Gowan, M., "Use Your PC to Serve Up Music: Turn Your Pc Into a Music Server with Turtle Beach's Great-Sounding, Networked Digital-Music Player," PC World, Feb. 2, 2001, 2 pages.
Hochmair, H.H. et al., "User Interface Design for Semantic Query Expansion in Geo-data Repositories," Angewandte Geoinformatik 2006 - Beitrage zum 18, AGIT-Symposium Salzburg: Heidelberg: Wichmann, 2006, 10 pages.
"User's Guide ProxiWeb for Palm OS," web.archive.org/web/20000916115046/http://www.proxinet.com/products n serv/guide palm/#Toc465146931, printed on Sep. 4, 2013, 14 pages.
"UUIDS and GUIDS," Paul J. Leach, Microsoft, Feb. 24, 1997, 16 pages.
"Via DJ Digital Music Server," Copyright 2003, Elan Home Systems, 2 pages.
"Via DJ Digital Music Server Installation Manual," Copyright 2003, Elan Home Systems, 16 pages.
"Via DJ Digital Music Server Users Guide," Copyright 2003, Elan Home Systems, 33 pages.
Gebhard, Harald, "Virtual Inernet Broadcasting," University of Dortmund, Germany, IEEE Communicaitons Magazine, Jun. 2001.
"Virtual Replay TV for your PC," www.dvarchive.org, last updated Jul. 12, 2006, printed Sep. 3, 2013, 3 pages.
Paul, Baldine, "VTJukebox: Implementation Issues for RTP-Based Recording and On-Demand Multicast of Multimedia Conferences," AT&T Labs—Research, 1998.
"WANCableLinkConfig:1 Service Template Version 1.01 for UPnP Version 1.0," Contributing Members of the UPnP Forum, 2001, 25 pages.
"WANCommonlnterfaceConfig:1 Service Template Version 1.01 for UPnP Version 1.0," Contributing Members of the UPnP Forum, 2001, 24 pages.
"WANConnectionDevice:1 Device Template Version 1.01 for UPnP Version 1.0," Contributing Members of the UPnP Forum, 2001, 13 pages.
"WANConnectionDevice:2 Device Template Version 1.01," for UPnP Versions 1.0 and1.1, Standardized DCP (SDCP), Version 1.00, Sep. 10, 2010, 13 pages.

"WANDevice:1 Device Template Version 1.01," For UPnP Version 1.0, Standardized DCP, Nov. 12, 2001, 12 pages.
"WANDevice:2 Device Template Version 1.01," for UPnP Versions 1.0 and 1.1, Proposed DCP (PDCP), Version 1.0, Sep. 10, 2010, 11 pages.
"WANDSLLinkConfig:1 Service Template Version 1.01 for UPnP Version 1.0," Contributing Members of the UPnP Forum, 2001, 27 pages.
"WANEthernetLinkConfig:1 Service Template Version 1.01 for UPnP Version 1.0," Contributing Members of the UPnP Forum, 2001, 10 pages.
"WANIPConnection:1 Service Template Version 1.01 for UPnP Version 1.0," Contributing Members of the UPnP Forum, 2001, 74 pages.
"WANIPConnection:2 Service," for UPnP Version 1.0, Standardized DCP (SDCP) Sep. 10, 2010, Service Template Version 2.00, 85 pages.
"WANIPv6FirewallControl:1 Service," For UPnP Version 1.0, Standardized DCP (SDCP), version 1.00, Dec. 10, 2010, Service Template Version: 2.00, 39 pages.
"WANPOTSLinkConfig:1 Service Template Version 1.01 for UPnP Version 1.0," Contributing Members of the UPnP Forum, 2001, 21 pages.
"WANPPPConnection:1 Service Template Version 1.01 for UPnP Version 1.0," Contributing Members of the UPnP Forum, 2001, 89 pages.
Smith, Patricia, "WebCompass Takes Web Searching in the Right Direction," Seybold Report on Desktop Publishing, vol. 10, No. 10, pp. 1-9, found at <http://www.seyboldseminars.com/seybold_report/reports/D1010001.htm>, copyright 1996, Seybold Publications Inc., 9 pages.
"Webradio Com," http://www.webradio.com/eflp/web+radio/pid73231/D284974/C2243539, Copyright 2007 www.webradio.com, printed Oct. 16, 2007, 1 page.
"Welcome to Internet Talk Radio from Talkzone.com," at <http://www.talkzone.com/> from the Internet Archive, dated Jul. 19, 2008, copyright 2007-2008, Syndication Networks Corp., 2 pages.
"Welcome to Kerbango! Entertainment," Kerbango, Inc., Apr. 8, 2000 (Archived at <URL:http://www.kerbango.com/tuner/index.html?fcn_menu=1&tuning_id=10&bwc=) 1 page.
"Welcome to Kerbango! Music," Kerbango, Inc., May 11, 2000 (Archived at <URL:http://www.kerbango.com/tuner/index.html?fcn_menu=1&tuning_id=1&bwc=) 1 page.
"Welcome to Kerbango! News," Kerbango, Inc., May 11, 2000 (Archived at <URL:http://www.kerbango.com/tuner/index.html?fcn_menu=1&tuning_id=7&bwc=) 1 page.
"Welcome to the Merit Technical Center," Merit Industries, Inc., Revised Aug. 24, 2004, 1 page.
"What is BlogTalkRadio," at <http://www.blogtalkradio.com/whatis.aspx> from the Internet Archive, dated Feb. 28, 2009, copyright 2009, appears that it may have existed in 2008, BlogTalkRadio.com, 2 pages.
"What is the Lansonic Digital Audio Server," [online] Aug. 15, 2000 [Downloaded from the Internet on Aug. 23, 2013] URL: <web.archive.org/web/20000815200431/http://www.lansonic.com/product.htm> (pp. 3-4 of Yamaha Corporation of America Exhibit 1013) 2 pages.
Ricca-Smith, "Science & Technology: Wired for sound and Video," Independent (UK) Ltd., Jan. 14, 2004, 4 pages.
Manes, S., "Wired Jukeboxes," Forbes, Dec. 10, 2001, 4 pages.
Frodigh, M., et al., "Wireless Ad Hoc Networking—The Art of Networking Without a Network," Ericsson Review No. 4, 2000, 16 pages.
Lakhani, Amit, "Wireless Application Protocol (WAP) and I-Mode: An insight," Stevens Institute of Technology, Apr. 7, 2001, 10 pages.
Bard, "Wireless Convergence of PC and Consumer Electronics in the e-Home," Connected and Extended PC Lab, Intel. Corp., Intel Technology Journal Q2, 2001, 11 pages.
"Wireless LAN Networking—Whitepaper," U.S. Robotics, IEEE Computer Society (2009) 12 pages.
Hartwig, Stephan, "Wireless Microservers," Pervasivie Computing, IEEE, 2002, 9 pages.

(56) References Cited

OTHER PUBLICATIONS

"WLANAccessPointDevice:1 Device Template Version 1.01," For UPnP Version 1.0, Standardized DCP, Oct. 17, 2003, 15 pages.
"WLANConfiguration:1, Service Template Version 1.01," For UPnP Version 1.0, Standardized DCP, Oct. 17, 2003, 71 pages.
Declaration of Andrew Wolfe, Ph.D., with regard to U.S. Pat. No. 8,050,652, Jan. 21, 2015 (Inter Partes Review No. IPR2015-00590), 48 pages.
"World's First Standalone Internet Radio Unveiled by Kerbango," PR Newswire, Indian Wells, California, DEMO 2000, Feb 7, 2000, 4 pages.
"World-Wide Internet Radio: Internet Audio Mini Hi-Fi System," FW-I 1000, Jun. 2001, Royal Philips Electronics N.V., 2 pages.
"www.com and Kerbango, Inc. Joint Forces to Take Internet Radio Beyond the Computer," Los Angeles, May 22, 2000, 3 pages.
"Xantech IR-DC4 (IR/RS232 Interface Module) Installation Instructions," Xantech, Nov. 16, 1998, 4 pages.
"XHTML-Print Photo Templates for UPnP PrintEnhanced:1," For UPnP Version 1.0, Design Complete—Version 1.0, May 4, 2005, 79 pages.
"XHTML-Print/CSS Print Profile Guidelines for PrintEnhanced:1," For UPnP Version 1.0, Design Complete Version 1.0, May 4, 2005, 55 pages.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
"YouTube—Broadcast Yourself.," at <http://www.youtube.com/>, copyright 2007, YouTube, LLC, printed Oct. 26, 2007, 2 pages.
"Zen Portable Media Center User's Guide," Creative Technology Ltd., Jul. 2004, 52 pages.
"Zoned Audio/Video Z Series," Elan Home Systems, Copyright 2003, 8 pages.

\* cited by examiner

WIRELESS SPEAKER FOR RECEIVING FROM A MOBILE PHONE DIRECTIONS TO RECEIVE AND RENDER A PLAYLIST FROM A CONTENT SERVER ON THE INTERNET

CROSS-REFERENCE TO RELATED APPLICATIONS

This application is a continuation of U.S. patent application Ser. No. 14/311,690 filed Jun. 23, 2014, entitled METHOD, DEVICE, AND SYSTEM FOR DIRECTING A WIRELESS SPEAKER FROM A MOBILE PHONE TO RECEIVE AND RENDER A PLAYLIST FROM A CONTENT SERVER ON THE INTERNET, which is a continuation of U.S. patent application Ser. No. 13/207,113, filed on Aug. 10, 2011, entitled "METHOD, SYSTEM, AND COMPUTER-READABLE MEDIUM FOR EMPLOYING A FIRST DEVICE TO DIRECT A NETWORKED AUDIO DEVICE TO RENDER A PLAYLIST," which is a continuation of U.S. patent application Ser. No. 10/840,109, filed May 5, 2004, entitled "METHOD AND SYSTEM FOR EMPLOYING A FIRST DEVICE TO DIRECT A NETWORKED AUDIO DEVICE TO OBTAIN A MEDIA ITEM," now U.S. Pat. No. 8,028,323, each of which is hereby incorporated herein by reference in its entirety.

FIELD OF THE INVENTION

The present invention relates generally to a method and system for playing music. The present invention relates more particularly to a digital entertainment network wherein playlists are obtained by communicating attributes of the playlists to a playlist server and wherein songs are obtained by communicating information representative of the songs to a content server.

BACKGROUND

Traditionally, music has been provided to listeners by either a broadcast method or a purchase method. According to the broadcast method, music is broadcast to listeners by such means as radio and cable systems. The owners of the music are typically compensated by the broadcaster via either the American Society of Composers, Authors and Publishers (ASCAP) or Broadcast Music Incorporated (BMI). These two agencies monitor the playing of music by broadcasters, collect royalties from the broadcasters, and distribute the royalties to the copyright owners of the music.

However, according to the broadcast method the listener has little or no control over which selections are played. Generally, a listener must tune in to a radio station or select a cable channel that plays the type of music that the listener enjoys with the expectation that songs that the listener enjoys will occasionally be played. Too frequently, these songs are not played as often as the listener would prefer.

According to the purchase method, a listener purchases prerecorded music stored on media such as compact discs (CDs). The listener may then play the songs as many times as desired. Copyright owners are paid royalties out of the purchase price of the music.

However, the purchase method requires that a substantial price be paid for the music, at least in part because of the virtually unlimited use associated therewith. Listeners appear to be becoming less willing to pay the purchase price for such prerecorded music, particularly as alternative methods for obtaining music become more popular.

The purchase method suffers from the additional disadvantage of requiring that media containing the desired songs be utilized. Such media is somewhat bulky, particularly when a large number of selections are desired. In some instances, it may not be practical to carry all of the songs desired because of the volume and/or weight of the media required. Such media is also undesirably subject to degradation due to use and mishandling. For example, scratches on a CD may inhibit its use.

A newer method of providing music to listeners is becoming increasingly popular. It is this method of providing music that is apparently making listeners less willing to pay the purchase price for music that is prerecorded on media. According to this newer method of providing music, the music is downloaded from the Internet or otherwise obtained (such as by trading with friends), as a data file. One popular example of such a data file is an MP3 file. MP3 is short for Moving Picture Experts Group 1, audio layer 3.

Although music embodied in data files can be obtained legitimately, such as via such services like iTunes (a trademark of Apple Computer, Inc.), the opportunity to download or trade music data files for free has heretofore hampered this legitimate method of obtaining music.

As such, although the prior art has recognized, to a limited extent, the problem of distributing music, the proposed solutions have, to date, been ineffective in providing a satisfactory remedy. Therefore, it is desirable to provide a method for distributing music that is convenient, does not involve the use of media, and which provides for the payment of royalties.

BRIEF SUMMARY

While the apparatus has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The subject matter described herein specifically addresses and alleviates the above mentioned deficiencies associated with the prior art. More particularly, according to one aspect the claimed subject matter comprises a standalone speaker device comprising a network transceiver facilitating communication between the standalone speaker device and a touchscreen cellular phone over a WIFI network. The standalone speaker device is not directly coupled to a stereo, a television, or a computer and is not one of a stereo, television, and computer. The standalone speaker device is operable to provide to the touchscreen cellular phone a device identifier that identifies the standalone speaker device. The standalone speaker is further operable to receive from the touchscreen cellular phone a playlist received from a server over an Internet connection, the playlist comprising a plurality of audio item indicators, each audio item indicator indicating an audio item, the audio item indicators arranged in a predetermined sequence for audio items indicated by the audio item indicators to be played in the predetermined sequence; The standalone speaker is further operable to send to the server, over the Internet, an audio item indicator. The standalone speaker is further operable to receive from the server, over the Internet, without user input at the standalone speaker device, an audio item indicated by the audio item indicator. The standalone speaker is further operable to render, by the standalone speaker device, without user input at the standalone speaker device, the audio item from the server. The standalone speaker device, the touchscreen cellular phone, and the server are all separate devices, According to one aspect, the standalone speaker device is operable to join the Wi-Fi network, broadcast wirelessly the standalone speaker device identifier on the WIFI network, and discover at least one other wireless standalone speaker device on the WIFI network.

According to another aspect, the server further comprises a playlist server and a content server, and wherein the playlist server and the content server are separate devices, and wherein the standalone speaker device is further operable to stream the audio item, download the audio item, and/or cache the audio item.

In one embodiment, in order to render the audio item from the server the standalone speaker device is further operable to receive, from the touchscreen cellular phone, a control message directing the standalone speaker device to alter one of a volume parameter, a tone parameter, and a balance parameter of the standalone speaker device According to another embodiment, a system is provided that comprises a standalone speaker device, a touchscreen cellular phone, and a server. The standalone speaker device comprises a first network transceiver facilitating communication between the standalone speaker device and a touchscreen cellular phone over a WIFI network. The standalone speaker device is operable to provide to the touchscreen cellular phone a device identifier that identifies the standalone speaker device. The standalone speaker device is further operable to receive from the touchscreen cellular phone a playlist, the playlist comprising a plurality of audio item indicators, each audio item indicator indicating an audio item, the audio item indicators arranged in a predetermined sequence for audio items indicated by the audio item indicators to be played in the predetermined sequence. The standalone speaker device is further operable to send to the touchscreen cellular phone an audio item indicator and receive, from the touchscreen cellular phone, without user input at the standalone speaker device, an audio item indicated by the audio item indicator of the plurality of audio item indicators. The standalone speaker device is further operable to render, by the standalone speaker device, without user input at the standalone speaker device, the audio item. The standalone speaker device is not directly connected to one of a stereo, television, and computer and is not one of a stereo, television, and computer.

The touchscreen cellular phone comprises a second network transceiver facilitating communication between the standalone speaker device and the touchscreen cellular phone over the WIFI network, the touchscreen cellular phone and a server over the Internet. The touchscreen cellular phone is operable to receive from the standalone speaker device a device identifier that identifies the standalone speaker device and send to the standalone speaker device the playlist. The touchscreen cellular phone is further operable to receive from the standalone speaker device an audio item indicator and receive from the server the audio item indicated by the audio item indicator; The touchscreen cellular phone is further operable to send to the standalone speaker device the audio item indicated by the audio item indicator and render, at the touchscreen cellular phone, the audio item indicated by the audio item indicator.

The server comprises a third network transceiver facilitating communication between the touchscreen cellular phone and the server over the Internet. The server is operable to receive from the touchscreen cellular phone a playlist attribute. The server is further operable to send to the touchscreen cellular phone the playlist indicated by the playlist attribute and receive from the touchscreen cellular phone the audio item indicator. The server is further operable to send to the touchscreen cellular phone the audio item indicated by the audio item indicator According to one aspect, the server is further operable to facilitate audio item browsing for ones of a plurality of devices, wherein the touchscreen cellular phone is one of the plurality of devices, facilitate audio item searching for ones of the plurality of devices, facilitate playlist browsing for ones of the plurality of devices, and facilitate playlist searching for ones of the plurality of devices According to another embodiment, a system is provided that comprises a standalone speaker device, a touchscreen cellular phone, and a server. The standalone speaker device comprises a first network transceiver facilitating communication between the standalone speaker device and a touchscreen cellular phone over a WIFI network. The standalone speaker device is operable to provide to the touchscreen cellular phone a device identifier that identifies the standalone speaker device. The standalone speaker device is further operable to receive from the touchscreen cellular phone a playlist, the playlist comprising a plurality of audio item indicators, each audio item indicator indicating an audio item, the audio item indicators arranged in a predetermined sequence for audio items indicated by the audio item indicators to be played in the predetermined sequence. The standalone speaker device is further operable to send to a server an audio item indicator and receive, from the server, without user input at the standalone speaker device, an audio item indicated by the audio item indicator of the plurality of audio item indicators. The standalone speaker device is further operable to render, by the standalone speaker device, without user input at the standalone speaker device, the audio item. The standalone speaker device is not directly connected to one of a stereo, television, and computer and is not one of a stereo, television, and computer The touchscreen cellular phone comprises a second network transceiver facilitating communication between the standalone speaker device and the touchscreen cellular phone over the WIFI network, the touchscreen cellular phone and a server over the Internet. The touchscreen cellular phone is operable to: receive from the standalone speaker device a device identifier that identifies the standalone speaker device and send to the standalone speaker device the playlist.

The server comprises a third network transceiver facilitating communication between the touchscreen cellular phone and the server over the Internet. The server is operable to receive from the touchscreen cellular phone a playlist attribute and send to the touchscreen cellular phone the playlist indicated by the playlist attribute. The server is further operable to receive from the standalone speaker device the audio item indicator; and send to the standalone speaker device the audio item indicated by the audio item indicator.

In one embodiment, the server is further operable to receive from the plurality of devices a plurality of requests to join a sharing service, facilitate construction of a buddy list for ones of the plurality of devices, and facilitate chat messaging between ones of the plurality of devices and other ones of the plurality of devices.

In one embodiment, the server is further operable to receive real-time activity information from ones of ones of the plurality of devices and send the real-time activity information to other ones of the plurality of devices, wherein the real-time activity information reflects audio items rendered at the standalone speaker device As used herein, the term network transceiver includes any circuit or device that facilitates communication via a network. Examples of network transceivers include Ethernet network interface cards (NICs) and circuits, as well as Bluetooth and WiFi cards and circuits.

These, as well as other advantages of the present invention, will be more apparent from the following description and drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
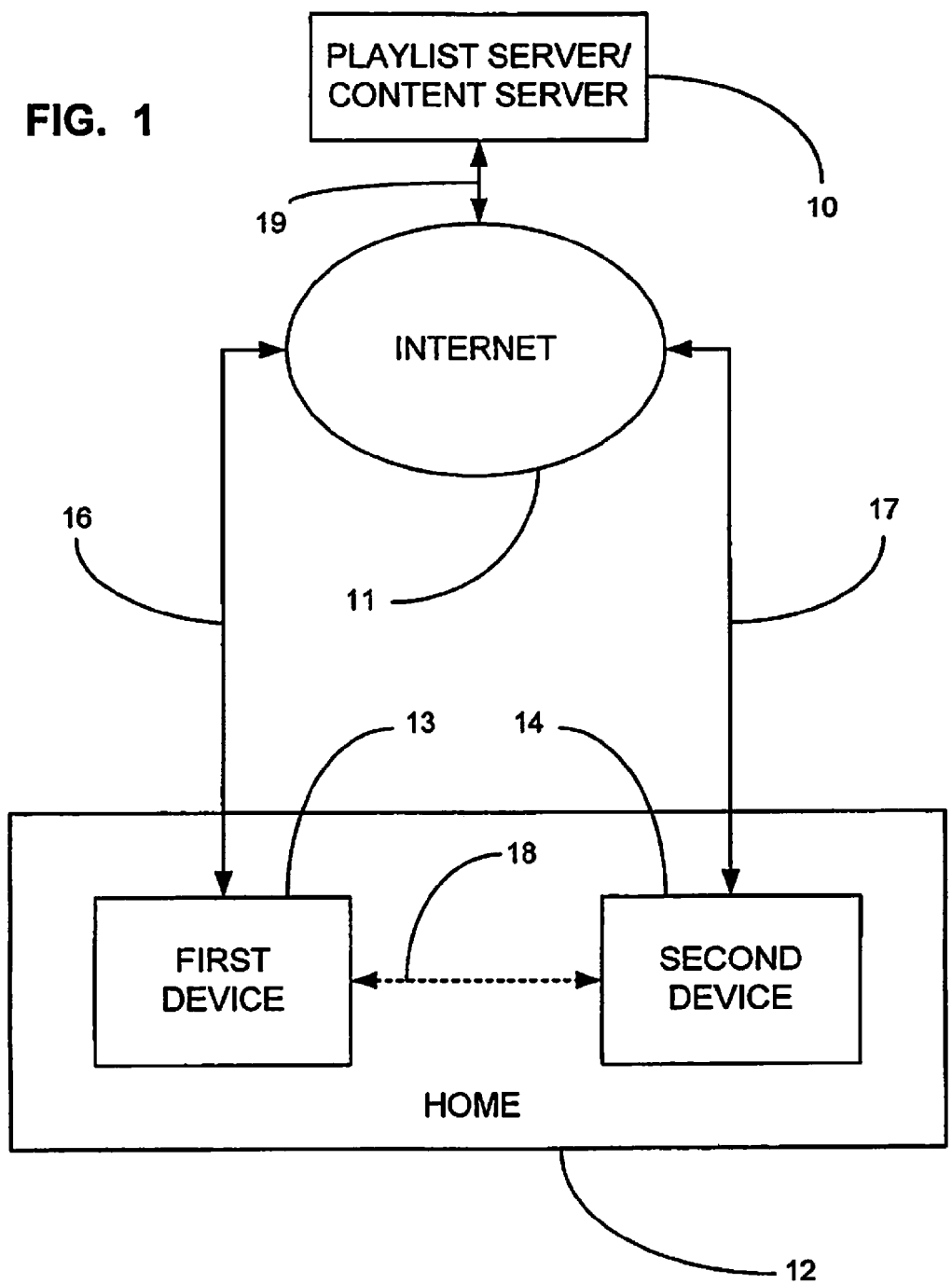
FIG. 1 is a block diagram showing an exemplary embodiment of the digital entertainment system of the present invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

Thus, the detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments that are also intended to be encompassed within the spirit of the invention.

The digital entertainment network of the present invention is preferably a fully integrated plug and play technology platform that delivers secure anytime, anywhere, on-demand multimedia content for digital home systems.

The digital entertainment network provides efficient and ubiquitous wireless and web-enabled control over digital home systems by enabling users to access and manage music content using a variety of control devices and by delivering such content to a wide variety of different rendering devices.

On-demand delivery of content, such as streaming music, is provided utilizing such user-friendly features such as customized playlists, collaboration, music management tools, and search capability.

The present invention preferably provides a plug and play control point that has the software intelligence that forms the basis for a truly integrated entertainment network system. This control point architecture delivers the ability to unify content, such as music or other types of multimedia content, with control applications that enable system users to access content from a variety of different remote control devices and deliver such content to a variety of rendering devices.

For example, the control point enables a digital entertainment network user to utilize a PDA or other device to browse for music on the Internet, then select and play a song on an MP3 player or the like, or even on stand-alone audio speakers. In another embodiment, the control point allows a user to choose a song via a set-top device, then play that music on a television, stereo system, or the like.

Preferably, the present invention comprises a web services based component that provides users with on-demand music streamed to a variety of devices, such as MP3 players, set-top boxes and home stereo systems. Thus, according to one aspect, the present invention is a web-based content and music management system that offers users a number of desirable features via a web browser.

These features preferably include web-based music catalog browsing via jukebox interface, search capability (to find artists and specific selections), the use of standard playlists, the use of custom playlists (created by each user), the ability to select different devices on which to play songs, the ability to view a user's activity over a given time period or in real-time with the activity streamer, collaboration, the ability to find buddies with the same music preferences you have in your playlists, the ability to share playlists with buddies, the ability to view buddies' activity based on various time periods, instant messaging for chatting among users, and the use of a set top box to facilitate the use of playlists and the streaming of content.

According to one aspect, the digital entertainment network of the present invention comprises a set-top box that provides users with on-demand music streamed to a variety of devices. The set-top box is a web-based content and music management system that offers users a list of features including the need for little or no setup (plug into Ethernet and video out, audio out), content catalog browsing, search capability (to find artists and specific selections), the use of standard playlists, the use of custom playlists (created by each user), the ability to select different devices on which to play songs, the ability to view your activity over a given time period or in real-time with the activity streamer, collaboration, the ability to find buddies with the same music preferences you have in your playlists, the ability to share playlists with buddies, the ability to view buddies' activity based on various time periods, and instant messaging for chatting among users.

The digital entertainment network of the present invention comprises control devices that allow users to communicate with the control point and give commands to render music/multimedia content on various different rendering devices. Examples of control devices include the personal digital assistant (PDAs) and set-top boxes.

According to one aspect of the present invention, a PDA based control application allows users to roam the house and play music content that is accessed via the PDA and is available via an Internet based service. According to one aspect, the content is played via set-top boxes, i.e., rendering devices, which may be located throughout the home.

The digital entertainment network also includes rendering devices that receive instructions from the control point and thereby render music/multimedia content. Rendering device examples include the set-top devices, home stereo systems and televisions. A variety of different types of rendering devices are possible. Audio content, such as music, may be rendered on audio rendering devices such as speakers, a stereo, and a television. Similarly, audio/video content, such as movies and television shows, may be rendered on televisions, stand alone monitors, and computer monitors. Indeed, either audio or audio/video content may be rendered on a variety of other types of devices, such as cellular telephones, PDAs, and laptop computers.

According to one aspect of the present invention, a set-top device is a key rendering device that plays music content on other rendering devices, such as televisions and stereo systems, throughout the home.

The digital entertainment network of the present invention optionally comprises a billing application for handling the financial transaction activities associated with streaming content payment and usage. The billing application preferably performs functions such as transaction and usage logging for billing processing, automated billing of customers, automated notification of the inability to charge a credit card on file (exception handling), and automated calculation and wire transfer of funds to content providers.

The present invention is illustrated in FIGS. 1-8, which depict presently preferred embodiments thereof.

Referring now to FIG. 1, a preferred embodiment of the present invention comprises a playlist server/content server 10 that is in communication with a network, preferably a wide area network such as the Internet 11. Also in communication with the network are a first device 13 and a second device 14, which are both typically located within a common structure, such as a home or office 12. The first device 13 generally assumes the function of the control point, although the second device 14 may have this functionality, as well.

The playlist server/content server 10 may be a single server. Alternatively, the playlist server and the content server may be two separate servers. Indeed, the playlist server may comprise a plurality of separate servers and/or the content server may similarly comprise a plurality of different servers.

The playlist server/content server is in bi-directional communication with the Internet 11, as indicated by arrow 19. The first device 13 is in bi-directional communication with the Internet 11, as indicated by arrow 16. The second device 14 is in bi-directional communication with the Internet 11, as indicated by arrow 17.

The first device is in communication with the second device, as indicated by arrow 18. The first device may be in either unidirectional or bi-directional communication with the second device 14.

The first device 13 may comprise any of a plurality of different types of devices. For example, the first device 13 may comprise a handheld portable device such as a personal digital assistant (PDA), a palmtop computer, an MP3 player, a telephone, or a remote control for a music rendering device. The first device may alternatively comprise a non-portable device, such as a desktop computer, a television, or a stereo.

The second device 14 may comprise the same type of device as the first device 14 or may alternatively comprise a different type of device with respect thereto. Thus, the first and second devices may comprise portable devices, non-portable devices, or any combination thereof.

The second device may also comprise one or more smart speakers. As defined herein, standalone smart speakers are speakers that are not connected to a device such as a stereo, television, or computer. Smart speakers are typically in communication with a network and can thus receive content therefrom. Typically, smart speakers comprise dedicated signal conditioning circuitry such as audio amplifiers.

According to one embodiment of the present invention, the first device 13 comprises a remote control for the second device 14. Thus, the second device may comprise a music rendering device such as a stereo, a television, or a home computer and the first device may comprise a handheld remote control therefor.

Any desired number of first and second devices may be provided according to the present invention. For example, the first device may comprise a remote control that controls a plurality of second devices, such as a television, a DVD player, and a stereo system.

Figure 2:
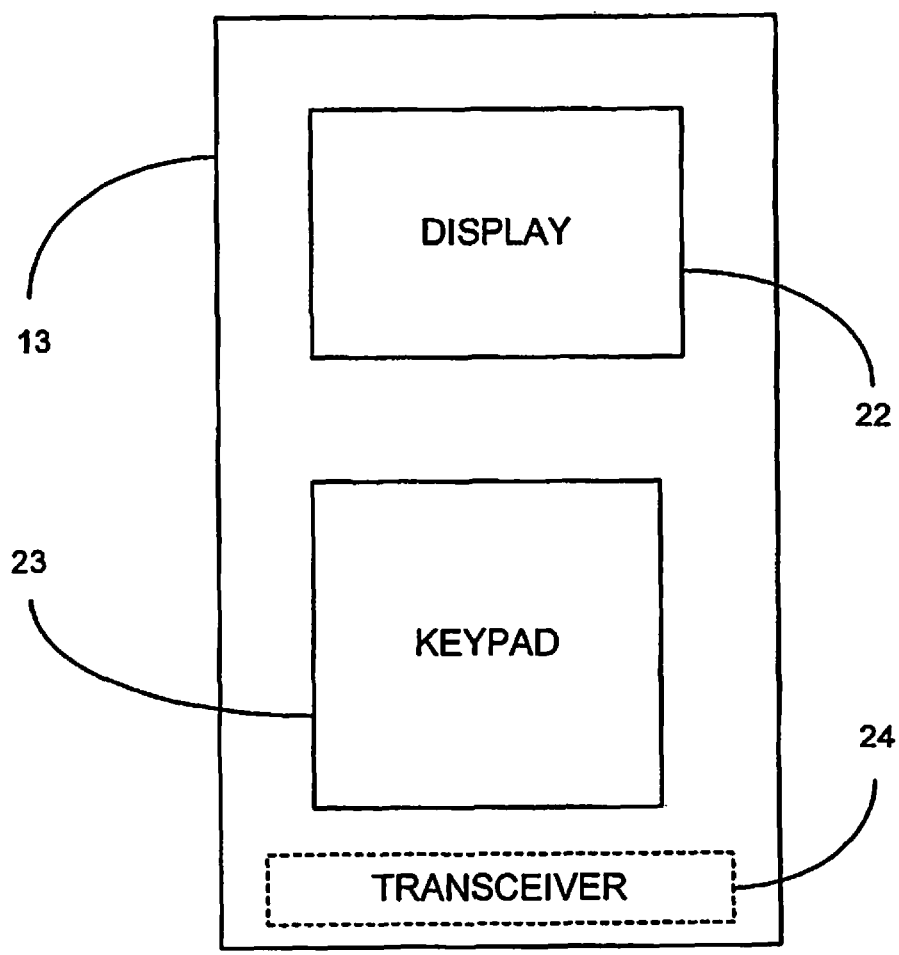
FIG. 2 is a block diagram showing further detail of an exemplary first device or remote control of FIG. 1.

Referring now to FIG. 2, the first device 13 may comprise a handheld portable device that comprises a display 22, a keypad 23, and a network transceiver 24. The display 22 facilitates viewing and selection of playlist names, as well as viewing and selection of songs within a playlist, as discussed in detail below. The keypad 23 facilitates selection of playlist names and selection of songs, as also discussed in detail below.

The display 22 may optionally comprise a touchscreen display and the keypad may optionally be omitted. In this instance, all selection may be performed via the touchscreen display.

The network transceiver 24 preferably comprises a wireless network transceiver, such network transceiver conforming to the Bluetooth (a trademark of Bluetooth SIG, Inc.) standard and/or conforming to the WiFi (a trademark of the WiFi Alliance) standard.

The device shown in FIG. 2 may also be the second device 14 according to one aspect of the present invention. However, for explanatory purposes it may sometimes be beneficial to think of the first device as a small handheld portable device such as a PDA or dedicated remote control that can function to control the second device and it may similarly sometimes be beneficial to think of the second device as a larger music rendering device such as a stereo, television, or personal computer. Of course, such embodiments of the present invention are by way of example only, and not by way of limitation.

Having described the general structures of the present invention, the general operation thereof will next be described with reference to FIGS. 3 and 4. In operation, the digital entertainment network of the present invention provides convenient access to a very large database of music without requiring that the music be stored and kept by the listener on media such as CDs This convenient access is provided by maintaining the database of music at a remote location, i.e., in an Internet based content server 10.

That is, the present invention generally does not attempt to store songs within the music rendering devices themselves, but rather generally downloads songs via a network, as needed. Such operation simplifies the construction and operation of the music rendering devices by eliminating the need for large storage capacities. The elimination of the need for large storage capacities results in a cost savings for manufacturing and purchasing the music rendering devices.

Downloading the music on an as-needed basis provides access to a very large database of songs that contains many more selections than can be stored on contemporary music rendering devices. Downloading the music on an as-needed basis also facilitates the payment of royalties to the music owners in a manner that is fair to both listeners and music owners.

One exception to downloading of music on an as-needed basis according to the present invention is optionally the use of caching. Songs that are played repeatedly may be cached, so as to mitigate the need for a network connection and thus mitigate the need for the bandwidth associated therewith. The playing of cached songs can be reported via the network and royalties paid as though the song had been downloaded strictly on an as-needed basis.

Preferably, the present invention comprises a first device that may operate in two different ways. According to a first way of operation, as shown in FIG. 3 and discussed in detail below, a listener selects a song to be played from a playlist on the first device and the song is then played on the first device. According to a second way of operation, as shown in FIG. 4 and discussed in detail below, a listener selects a song to be played from a playlist on the first device and the song is then played on another device, e.g., a second device.

Figure 3:
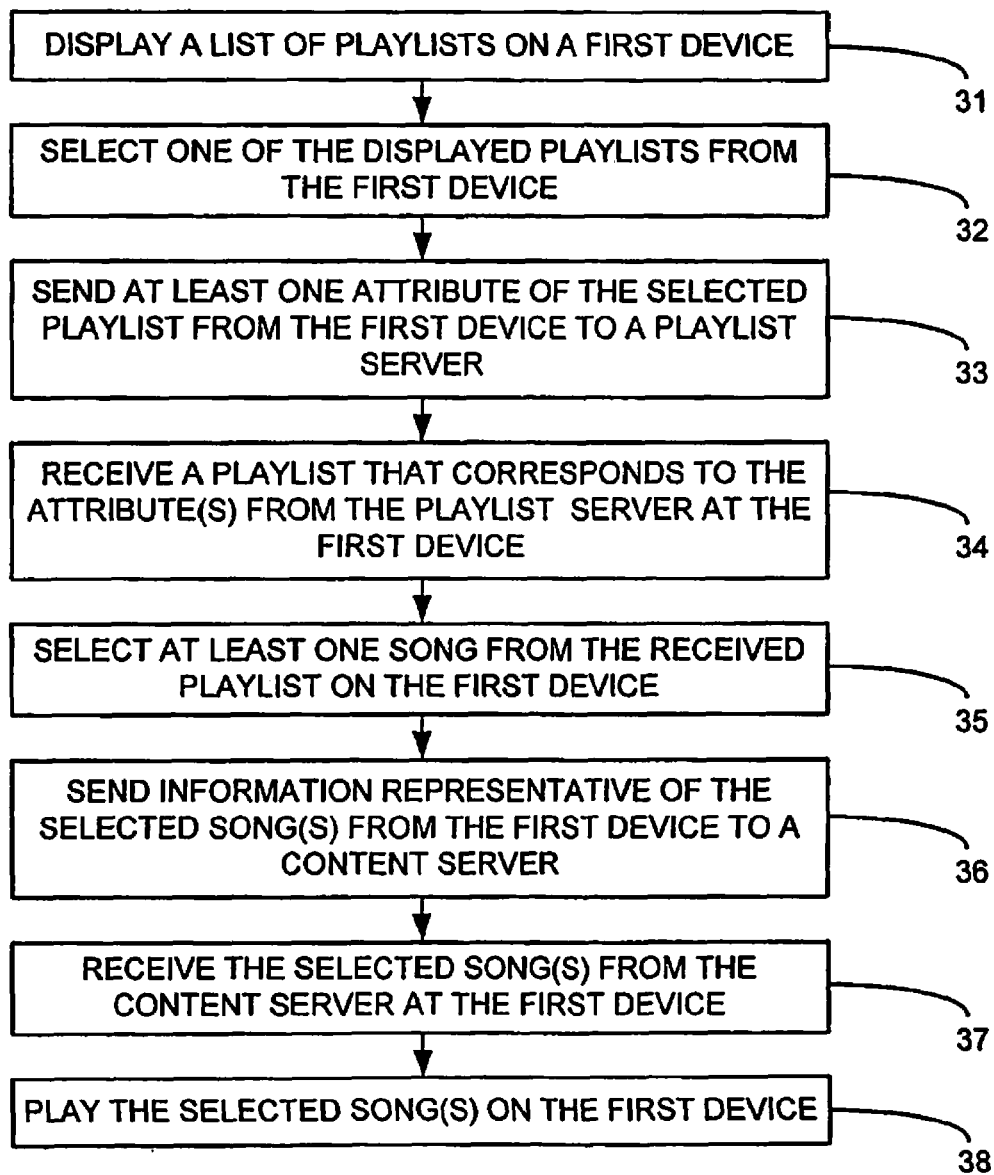
FIG. 3 is a flow chart showing one way of operating a digital entertainment system of the present invention.

Referring now to FIG. 3, the first way of operation of the first device is illustrated. A list of playlists is displayed on the first device as shown in block 31. The list of playlist is a list of playlist names, numbers, or other indicia indicative of individual playlists. For example, the list of playlists may include graphic symbols or icons in addition to or in place of other indicia. As used herein, the term playlist name includes any indicia that are uniquely representative of a playlist.

Each item on the list of playlists is representative of a particular playlist. Each playlist may come from any one of a variety of sources. For example, a playlist may be compiled by a user, a playlist may be obtained from someone else, or a playlist may be formed by a computer using an algorithm that attempts to identify songs that will suit the tastes of the listener.

The playlists are stored on a playlist server and are downloaded to the first device and the second device as requested by the listener. As mentioned above, the playlist server may be the same server as the content server.

Optionally, playlists as well as songs may be cached on the first device and/or the second device.

The list of playlists may be displayed upon the display 22 of the first device or may be displayed in any other desired manner. For example, the list of playlists may be displayed on the monitor of another device.

One of the displayed playlists is selected by the listener as shown in block 32. The selected playlist is a playlist that is expected to contain one or more songs that the listener would like to listen to. For example, the displayed list of playlists may contain a playlist named rock favorites, a playlist named country favorites, and a playlist named classical favorites. If the listener wants to listen to classical music that is on the playlist named classical favorites, the playlist named classical favorites is selected.

The desired playlist may be selected by using a touchscreen display of the first device 13, may be selected using the keypad 23, or may be selected by any other desired means.

At least one attribute of the selected playlist is sent from the first device to a playlist server as shown in block 33. The attribute(s) may comprise, for example, the name of a playlist, the number of a playlist, and/or any other unique identifier of a playlist.

Alternatively, the attribute(s) may comprise one or more parameters that are indicative of the type of music that the listener would like to hear. For example, the attribute(s) may comprise a code that indicates that a list of the top ten country hits for the week that is to be returned. The user may preferably compile sets of such parameters so as to facilitate the retrieval of custom, up to date playlists from the playlist server. Such parameters may be compiled directly on the first device or on any other device, such as a personal computer.

A playlist that corresponds to the attribute(s) is sent from the playlist server and is received by the first device as shown in block 34. This playlist is a list of songs containing at least one song that the listener would like to hear.

The listener selects at least one song from the received playlist, as shown in block 35. Either a single song may be selected, or a plurality of songs may be selected. The song(s) may be selected by using a touchscreen display of the first device 13, may be selected using the keypad, or may be selected by any other desired means.

Information representative of the selected song(s) is sent to a content server 10. The information may comprise the name(s) of the songs, the number(s) of the songs, or any other unique identifier thereof.

The selected song(s) are communicated from the content server 10 to the first device 13 via the Internet 11 as shown in block 37. The format of the selected songs may be MP3, WAV, or any other desired format.

The selected songs are played by the first device 13 as shown in block 38. The selected songs may be played in the order selected, in random order, or in any other desired order. The order can preferably be changed at any time.

The songs may be played via one or more speakers that are part of the first device 13, by one or more speakers that are in communication with the first device 13 (such as via a wired or wireless connection), by headphones, by earphones, or by any other desired means.

The volume, tone, and balance of the songs is preferably adjustable via the first device 13, such as via the display 22 and/or keypad 23 thereof.

Figure 4:
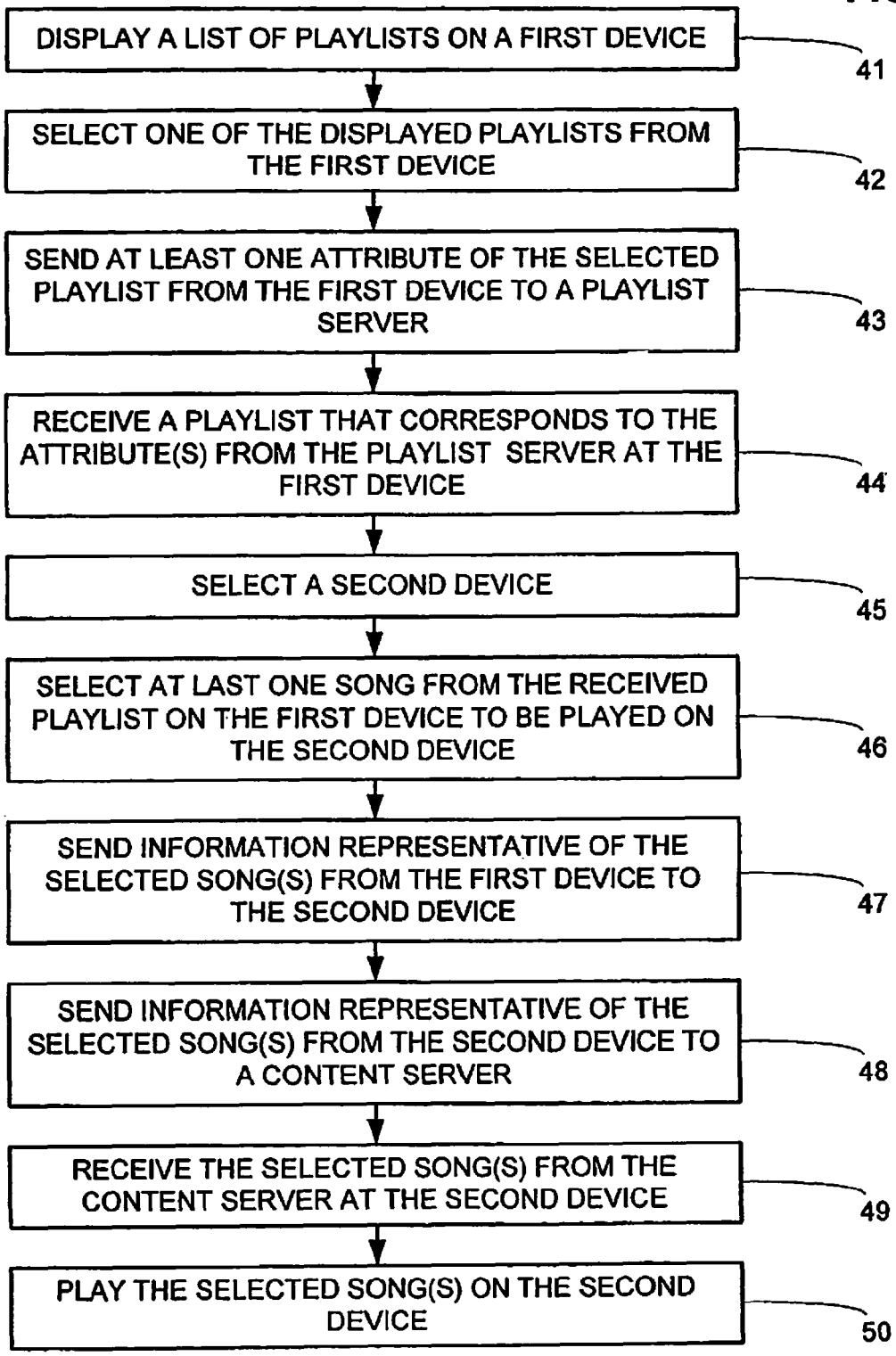
FIG. 4 is a flow chart showing another way of operating a digital entertainment system of the present invention.

Referring now to FIG. 4, the second way of operation of the first device is illustrated. According to this second way of operation, a list of playlists is displayed as shown in block 41, one of the playlists is selected as shown in block 42, at least one attribute is sent to the playlist server as shown in block 43, and a playlist is received as shown in block 44, all in the same fashion as in the first way of operation discussed above.

According to the second way of operation, the song is played on a device other than the first device 13. Thus, a second device 14 typically must be selected as shown in block 45. A particular second device may be selected from a list of second devices that is displayed on the first device 13. For example, a listener's desktop computer may be selected from a list having the desktop computer, a television, and a stereo listed thereon.

Preferably the list of second devices is dynamic and is automatically updated, such as via the use of a device discovery process that is described in detail below. Alternatively, the list of second devices may be pre-configured by the listener and then manually updated, as desired.

At least one song is selected from the playlist as shown in block 46 and as discussed above.

Information representative of the selected song(s) is sent from the first device 13 to the second device 14. This information tells the second device 14 what song(s) are to be played. However, the second device does not typically have the selected songs stored therein. In some instances the selected songs may be cached within a memory of the second device 14, as discussed above.

The second device 14 sends information representative of the selected song(s) to a content server. Optionally, the second device also sends at least one attribute of the playlist from which the song(s) were selected on the first device 13 to the playlist server, as well.

The selected song(s) are received from the content server by the second device as shown in block 44 and are ready for playing. Optionally, the same playlist that is presently available for display on the first device is received from the playlist server, such that it is also available for display on the second device.

Generally, songs may be selected and played from the second device 14, as well as from the first device 13, such that it is beneficial to display the playlist on the second device 14. Even if songs cannot be selected and displayed from the second device 14, it may still be beneficial to view the playlist thereon.

The selected song is played on the second device 14 as shown in block 50 and discussed above. Parameters of the song such as volume, tone, and balance are optionally controllable from the first device 13.

Optionally, playlist and/or songs are cached in the first device 13 and/or the second device 14. Caching is particularly beneficial when the same songs and/or playlist are used repeatedly.

Although playlists and/or songs may be cached so as to mitigate the need for repeated downloading thereof from the playlist/content server 10, the memory requirements of the first device 13 and second device 14 are substantially reduced. This is true because the first device 13 and the second device 14 of the present invention do not store a substantial quantity of playlists or songs thereon.

That is, the first device 13 and the second device 14 of the present invention do not have to store all of the songs that a listener wishes to hear thereon. Rather, any such storage is generally incidental. Typically, a large number of the songs played by the first device 13 and the second device 14 are stored on the content server 10 and are communicated via the Internet 11 to the first device 13 and/or the second device 14 as needed.

Of course, such remote storage reduces the need for memory for the first device 13 and the second device 14, thereby desirably reducing the cost and size thereof and also enhancing the reliability thereof.

Figure 5:
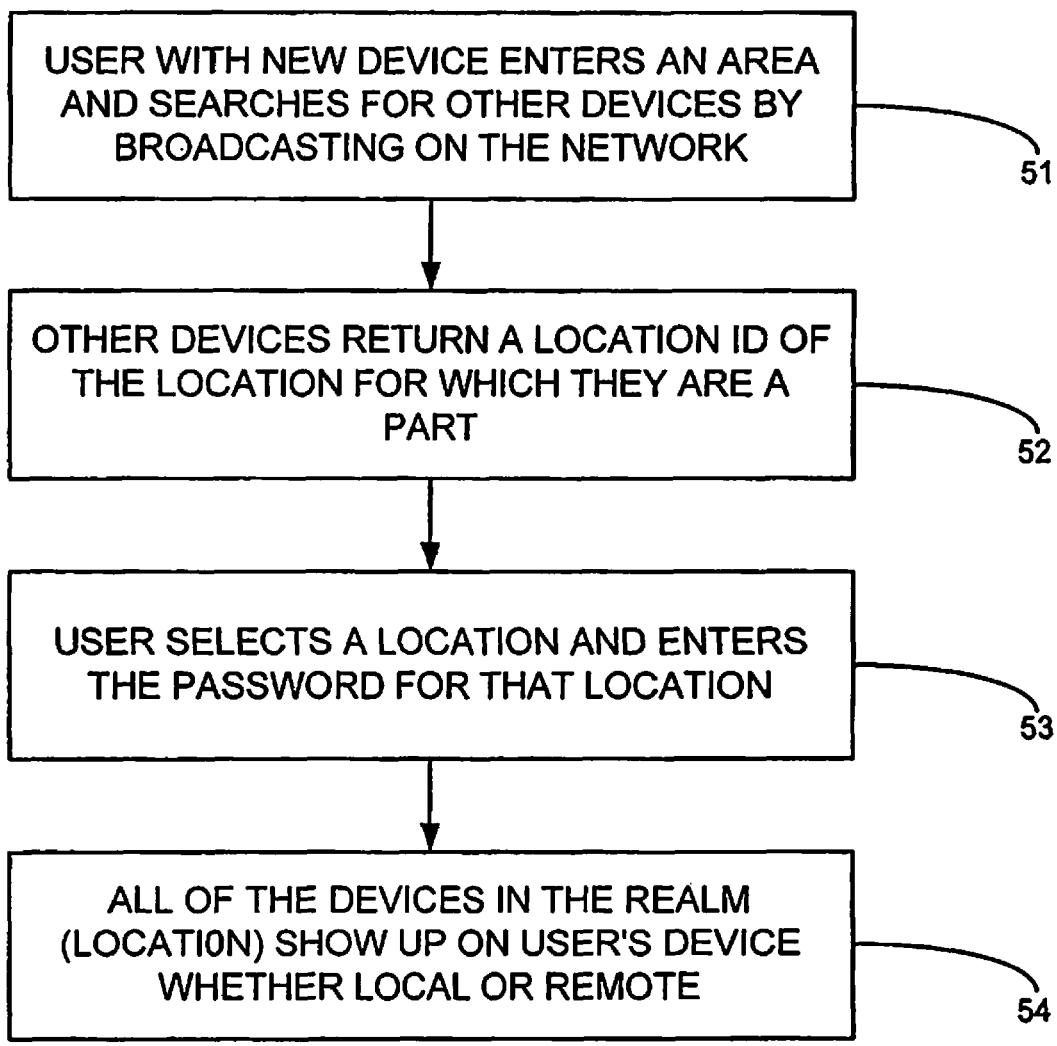
FIG. 5 is a flow chart showing operation of a discovery process wherein devices of the present invention recognize one another.

Referring now to FIG. 5, according to one aspect of the present invention all of the devices within an area, such as the area within which the devices can receive each other's wireless broadcast signals, are aware of one another and communicate with one another. When a new device enters the area, the existing devices become aware of the new device and the new device becomes aware of the existing devices via a discovery process.

According to this discovery process, all devices may periodically broadcast an identification code and a password. The identification code uniquely identifies the device. The password authorizes the device to communicate with other devices within the area.

When a new device enters the area, the new device and the existing devices communicate with one another. This may be done either directly or via a server, as discussed in detail below. The new device recognizes any of the other devices that have an acceptable password and displays a list of the other devices on its list of available devices, so that the other devices may be selected as second devices for playing of songs, as discussed above.

Similarly, the devices already in the area recognize the new device if the new device has an acceptable password, and the devices already in the area display the new device in their list of available devices so that the new device may be selected as a second device for the playing of songs, if desired.

Alternatively, when a user enters a place with a new device, he can search for other devices by broadcasting on the network (whether wired or wireless), as shown in block 51. The other devices will return a location ID for the location or realm of which they are a part, as shown in block 52. The user can then select a desired one of the locations and enter the correct password for that location, as shown in block 53. Once this is done, then all of the devices in that realm will show up regardless of whether they are local or remote, as shown in block 54. The user is then free to do whatever the user wants to do with the other devices, if the security is set up to allow other users to control the other devices. For example, the user may play a song through another device or download a song therefrom.

Figure 8:
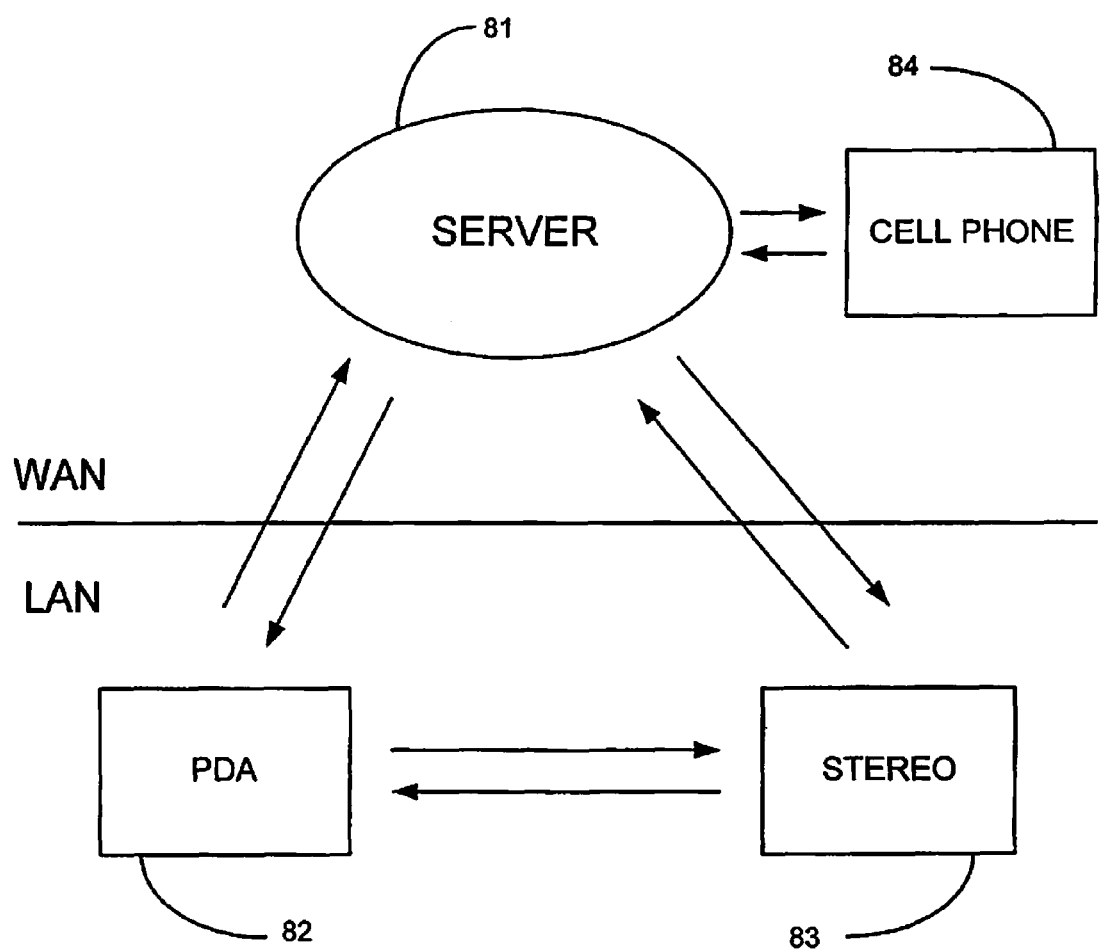
FIG. 8 is a block diagram showing the discovery process for both a local device and a remote device.

Referring now to FIG. 8, the discovery process is described in further detail. Preferably, a device can obtain a list of other devices in one of two different ways. According to a first way of obtaining lists of other devices, the lists are obtained through a server whether the device obtaining the lists is a local device or a remote device. According to a second way of obtaining lists of other devices, the lists are obtained directly from the other devices themselves, as long as the device obtaining the lists and the other devices are all local devices.

A local device is a device that is on the same local area network (LAN) as the other devices. That is, devices are considered to be local with respect to one another if they are all on the same local area network. A remote device is a device that is not on the same local area network as the other devices.

According to the first way of obtaining device lists, server 81, preferably on a wide area network such as the Internet, facilitates communication of a list of devices to a new device. The server may be the same server as the playlist server/content server 10 of FIGS. 1, 6, and 7 or may be a different server.

For example, if PDA 82 is a new device entering the area of a wireless local area network, a user may enter a user name or ID, a location identifier, and a password into the PDA 82. The user name or ID identifies the user to the rest of the local area network. An example of a user name or ID would be Joes PDA.

The location entry identifies the network that the user wants to become part of. For example, a network at Joe's house may be conveniently named Joes House.

The password is typically necessary to be part of the local area network. That is, the local area network will typically not allow a new device to log thereon without the correct password. The use of passwords may optionally be omitted, if desired.

Once the appropriate ID, location, and password have been entered, then the PDA 82 communicates with the server 81, such as via a wireless access point. The server 81 maintains a list of the devices on the local area network and communicates this list to the new device, i.e., the PDA 82.

The PDA 82 may then be used to select and control another device on the local area network, such as stereo 83. That is, the user may select the stereo 83 from the list of devices on the local are network and then may command the stereo to play a song or playlist of songs on the playlist of the PDA 82. The PDA 82 may also be used to control parameters of the song being played on the stereo 83, such as volume, tone, and balance. The PDA 82 may also be used to control the order in which the songs are played.

The PDA 82 may directly control the stereo 83, as indicated by the arrows therebetween. Alternatively, the PDA 82 may control the stereo through the server 81, particularly in those instance wherein communication directly between the PDA 82 and the stereo 83 are not adequately facilitated, such as when the distance therebetween is too great or when an obstruction (such as a wall or a larger piece of furniture) blocks the signal between the PCA 82 and the stereo 83.

When a new device can become part of the local area network, as described above, then the new device is a local device. However, in some instances a remote device may similarly be used to control a device on the network, such as the stereo 83, even though the remote device is not part of the local area network.

For example, the cell phone 84 is a remote device because it is not part of the local area network that the stereo 83 is on. However, the cell phone 84, may still communicate with the server 81, so as to obtain the list of devices on the local area network therefrom. It is still necessary for the cell phone user to enter an ID, location, and password into the cell phone, as was done with the PDA.

The remote device, i.e., cell phone 84, may similarly be used to control the stereo. However, the control signal will be communicated from the cell phone 84 to the server 81 through the server, since direct communication between the cell phone 84 and the stereo is typically not facilitated. Thus, the server 81 functions as a gateway for the remote device to communicate with devices on the local area network.

Preferably, the list of devices communicated from the server 81 to a new device, e.g., PDA, contains an indication as to whether devices on the list are local or remote with respect to the local area network. Thus, the new device knows whether commands to other devices must go through the server 81 or not.

According to the second way of obtaining a list of devices, instead of obtaining the list from the server 81, each device continuously broadcasts its presence, so as to facilitate auto-detection thereof. Thus, each device individually compiles its own list of other devices by monitoring the broadcasts therefrom. Preferably, a user must enter an ID, location, and password, as discussed above.

According to either method for obtaining a list of devices, a particular physical location, such as a coffee shop for example, may contain a plurality of logical locations or realms. Thus, a user may select a particular logical location to log onto. For example, one group of people at the coffee shop may be logged onto a location or local area network named Joes Coffee Group, while another group of people is logged onto a different location or local area network named Bills Coffee Group. A person newly entering the physical location, i.e., the coffee shop, may choose which group to join.

However, the new person must have the correct password for the logical location that he wishes to join. The password may be obtained by requesting it form someone in the logical location. Logging on to the logical location causes a list of devices (or users) to be communicated to the new user's device and also causes the new user's device to be added to the device lists of the other users, as discussed above.

According to one embodiment of the present invention, the first device comprises a remote control for a set-top box and the second device comprises a rendering device that receives signals from the set-top, such as a television or stereo. This embodiment of the present invention is illustrated in FIGS. 6 and 7 and is described in detail below.

Figure 6:
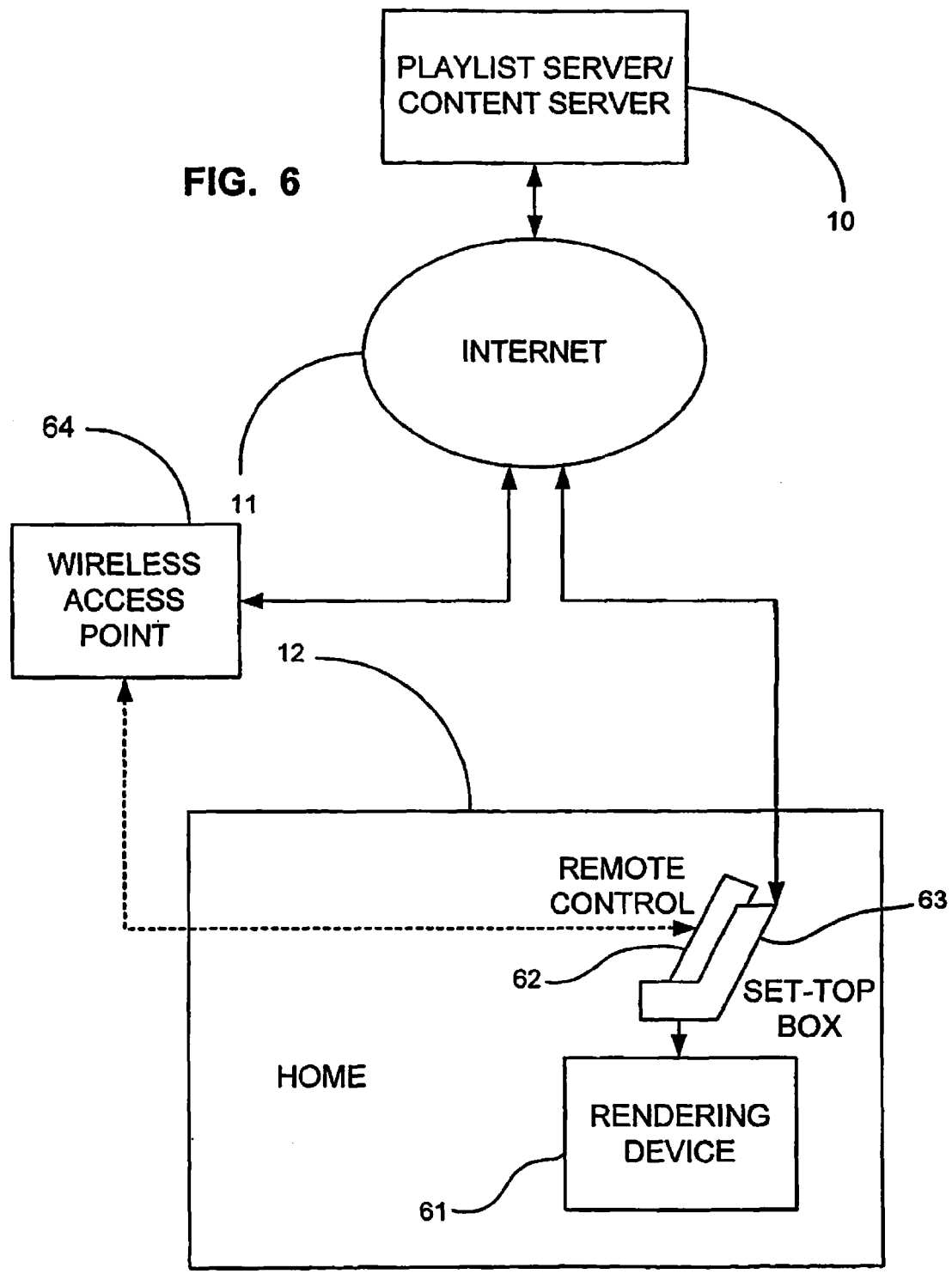
FIG. 6 is a block diagram showing an exemplary embodiment of the digital entertainment network of the present invention, wherein a set-top box has a removable remote control disposed within a cradle thereof.
Figure 7:
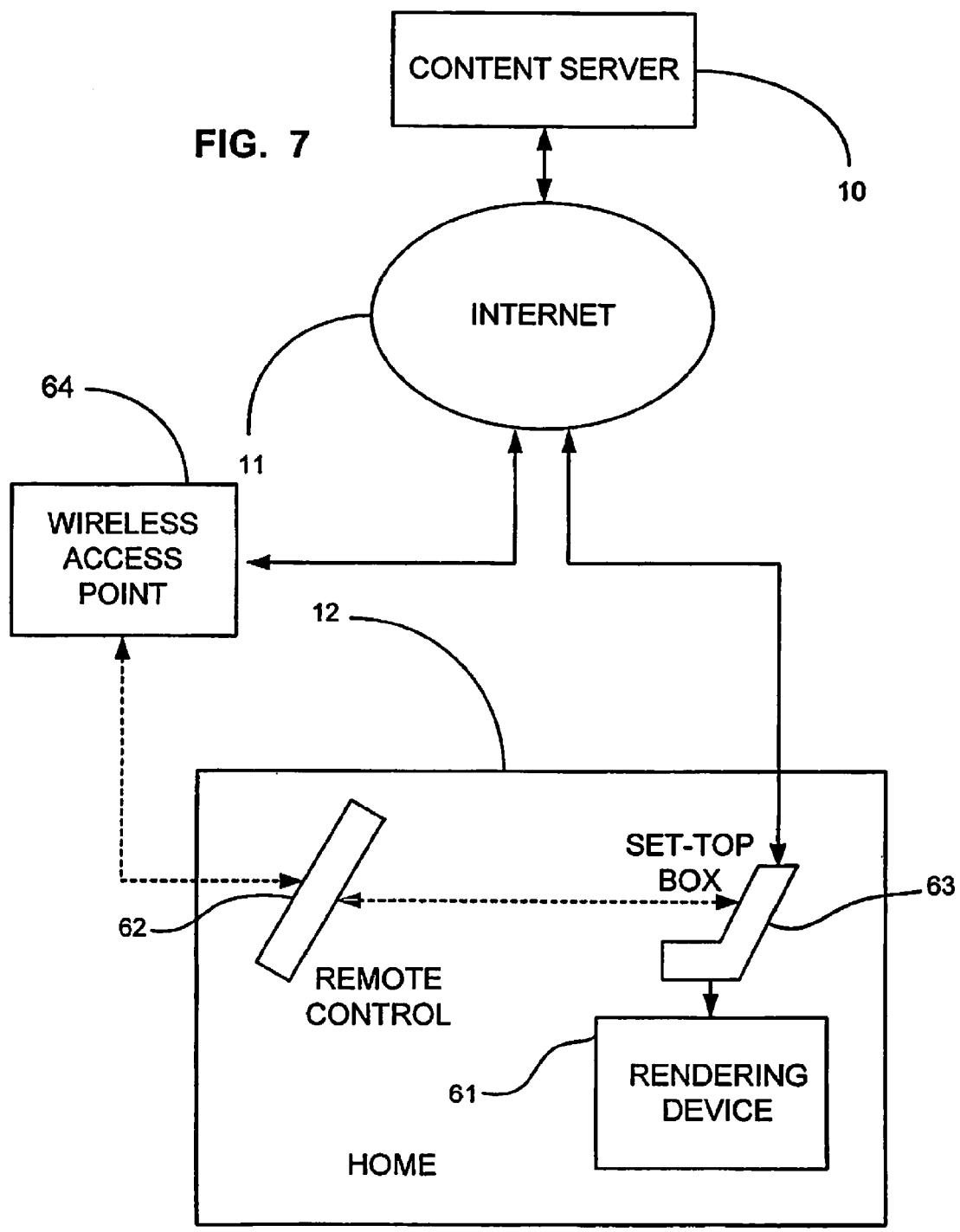
FIG. 7 is a block diagram showing the digital entertainment network of FIG. 6, wherein the set-top box has the removable remote control disposed out of the cradle thereof.

Referring now to FIG. 6, one embodiment of the present invention comprises a set-top box 63 that provides a signal to a rendering device, such as a television or stereo 61. The set-top box is in communication with the Internet 11. A playlist server/content server 10 is also in communication with the Internet, as described above.

Optionally, the set-top box functions as a cable television box in addition to functioning as a portion of the digital entertainment network of the present invention.

A remote control 62 for the set-top box 63 preferably fits into a cradle defined by at least a portion of the set-top box. The remote control 62 communicates wirelessly with the set-top box to control operation of the rendering device 61.

The remote control 62 is in wireless communication with the Internet 11, such as via a wireless access point or wireless router 64.

The remote control 62 defines a first device, as described in detail above. The set-top box, in combination with the rendering device 61, defines a second device as also described in detail above.

Thus, playlists can be requested by the remote control 62 and downloaded from the playlist server 10 via the Internet 11 thereto. Similarly, songs may be downloaded to the remote control 62. The songs may be played on the remote control 62 or may be played on the rendering device 61 in its role as a second device as described above.

For example, a song may be previewed on the remote control 62, even while another song is being played on the rendering device 61. A song may be listened to solely on the remote control 62 as the remote control is carried about at home. Such listening may be via one or more speakers built into the remote control 62 or may be via earphones.

Optionally, the set-top box comprises a display, so that playlists and songs can be selected therefrom. Playlists and songs are downloaded to the set-top box in its role as a second device, as discussed above.

The remote control 62 may be used while cradled by the set-top box 63, as shown in FIG. 6. Alternatively, the remote control 62 may be used while removed from the set-top box 63, as shown in FIG. 7.

Chat is preferably provided by the first 13 and/or second 14 devices of the present invention. Chat may be used for collaboration among listeners, such as for the compilation and/or exchange of playlists. Such chat may be implemented as voice chat or as text chat in a fashion similar to Internet Relay Chat (IRC), Microsoft Instant Messenger (IM), or AOL Instant Messenger (IM).

According to one aspect of the present invention, playlist recommendations may be provided to a listener. These playlist recommendations may be provided by the playlist server and may be based upon the listening habits of the listener or upon previous playlist requests. The listening habits of the listener may be determined from playlist and/or song downloads from the playlist server and/or the content server. That is, a playlist recommendation of a playlist of the top ten contemporary songs may be made by the playlist server to a listener who continually listens to several of the songs on this playlist. Similarly, a playlist recommendation of a playlist of the top ten country songs may be made to a listener who has requested playlists containing country songs.

The playlist server may also provide playlist recommendations based upon the playlists of others. That is, the playlist server may be configured to recognize when two or more people appear to have similar listening habits and may then recommend the playlists of one of these people to others of the same group.

The wireless communications discussed herein may be effected via a network, such as a network conforming to the Bluetooth (a trademark of Bluetooth SIG, Inc.) standard and/or conforming to the WiFi (a trademark of the WiFi Alliance) standard.

Communications between the first and second devices may be either via a network or via dedicated non-network communications devices such as those utilizing any desired form of wireless data transfer, including those using infrared (IR) and radio frequency (RF).

Although the content described herein is music, those skilled in the art will appreciate that other types of content, including both audio and non-audio content, are likewise subject to use by the present invention. For example, the content may comprise talks, speeches, comedy sketches, stories or books that are read aloud, pictures, video, software, or data.

It is understood that the exemplary digital entertainment network described herein and shown in the drawings represents only presently preferred embodiments of the invention. Indeed, various modifications and additions may be made to such embodiments without departing from the spirit and scope of the invention. Thus, various modifications and additions may be obvious to those skilled in the art and may be implemented to adapt the present invention for use in a variety of different applications.

What is claimed is:

1. A standalone speaker device comprising:
a network transceiver facilitating communication between the standalone speaker device and a touchscreen cellular phone over a wireless network, wherein the standalone speaker device is operable to:
provide to the touchscreen cellular phone a device identifier that identifies the standalone speaker device;
receive from the touchscreen cellular phone a playlist received from a server over an Internet connection, the playlist comprising a plurality of audio item indicators, each audio item indicator indicating an audio item, the audio item indicators arranged in a predetermined sequence for audio items indicated by the audio item indicators to be played in the predetermined sequence;
send to the server, over the Internet, an audio item indicator;
receive from the server, over the Internet, without user input at the standalone speaker device, an audio item indicated by the audio item indicator;
render, by the standalone speaker device, without user input at the standalone speaker device, the audio item from the server;
send real-time activity information reflecting the audio item has been rendered,
wherein the standalone speaker device, the touchscreen cellular phone, and the server are all separate devices, wherein the standalone speaker device is not directly connected to one of a stereo, television, and computer, and wherein the standalone speaker device is not one of a stereo, television, and computer.

2. The standalone speaker device of claim 1 further comprising:
the standalone speaker device further operable to:
join the wireless network;
broadcast wirelessly the standalone speaker device identifier on the wireless network; and
discover at least one other wireless standalone speaker device on the wireless network.

3. The standalone speaker device of claim 1 wherein the server further comprises a playlist server and a content server, and wherein the playlist server and the content server are separate devices, and wherein the standalone speaker device is further operable to:
stream the audio item.

4. The standalone speaker device of claim 1 wherein the server further comprises a playlist server and a content server, and wherein the playlist server and the content server are separate devices, and wherein the standalone speaker device is further operable to:

download the audio item.

5. The standalone speaker device of claim 1 wherein the server further comprises a playlist server and a content server, and wherein the playlist server and the content server are separate devices, and wherein the standalone speaker device is further operable to:

cache the audio item.

6. The standalone speaker device of claim 1 wherein the playlist was identified based on a searchable playlist attribute, the playlist attribute chosen from the group consisting of a playlist name, a playlist number, a playlist unique identifier, a music type, a music genre, an artist, an audio item identifier identifying an audio item found in the playlist, an instrument, a record company, a region, a country, a state, a city, a school, a listening habit of the user, a listening habit of another user, and an ethnicity.

7. The standalone speaker device of claim 1 where in order to render the audio item from the server the standalone speaker device is further operable to:

receive, from the touchscreen cellular phone, a control message directing the standalone speaker device to alter one of a volume parameter, a tone parameter, and a balance parameter of the standalone speaker device.

8. The standalone speaker device of claim 1 wherein the playlist is a recommended playlist algorithmically generated based on a playlist attribute, the playlist attribute chosen from the group consisting of a playlist name, a playlist number, a playlist unique identifier, a music type, a music genre, an artist, an audio item identifier identifying an audio item found in the playlist, an instrument, a record company, a region, a country, a state, a city, a school, a listening habit of the user, a listening habit of another user, and an ethnicity.

9. The standalone speaker device of claim 1 wherein the audio item does not flow through the touchscreen cellular phone.

10. A system comprising:

a standalone speaker device comprising:
a first network transceiver facilitating communication between the standalone speaker device and a touchscreen cellular phone over a wireless network, wherein the standalone speaker device is operable to:
provide to the touchscreen cellular phone a device identifier that identifies the standalone speaker device;
receive from the touchscreen cellular phone a playlist, the playlist comprising a plurality of audio item indicators, each audio item indicator indicating an audio item, the audio item indicators arranged in a predetermined sequence for audio items indicated by the audio item indicators to be played in the predetermined sequence;
send to the touchscreen cellular phone an audio item indicator;
receive, from the touchscreen cellular phone, without user input at the standalone speaker device, an audio item indicated by the audio item indicator of the plurality of audio item indicators; and
render, by the standalone speaker device, without user input at the standalone speaker device, the audio item, wherein the standalone speaker device is not directly connected to one of a stereo, television, and computer, and
wherein the standalone speaker device is not one of a stereo, television, and computer; and
the touchscreen cellular phone comprising:
a second network transceiver facilitating communication between the standalone speaker device and the touchscreen cellular phone over the wireless network, the touchscreen cellular phone and a server over the Internet, and
wherein the touchscreen cellular phone is operable to:
receive from the standalone speaker device a device identifier that identifies the standalone speaker device;
send to the standalone speaker device the playlist;
receive from the standalone speaker device an audio item indicator;
receive from the server the audio item indicated by the audio item indicator;
send to the standalone speaker device the audio item indicated by the audio item indicator; and
render, at the touchscreen cellular phone, the audio item indicated by the audio item indicator; and
the server comprising:
a third network transceiver facilitating communication between the touchscreen cellular phone and the server over the Internet, wherein the server is operable to:
receive from the touchscreen cellular phone a playlist attribute;
send to the touchscreen cellular phone the playlist indicated by the playlist attribute;
receive from the touchscreen cellular phone the audio item indicator;
send to the touchscreen cellular phone the audio item indicated by the audio item indicator;
receive real-time activity information from ones of a plurality of devices enabled to access the standalone speaker device, wherein the touchscreen cellular phone is one of the plurality of devices; and
send the real-time activity information to other ones of the plurality of devices, wherein the real-time activity information reflects audio items rendered at the standalone speaker device.

11. The system of claim 10 further comprising:
the standalone speaker device further operable to:
join the wireless network;
broadcast wirelessly the standalone speaker device identifier on the wireless network; and
discover at least one other wireless standalone speaker device on the wireless network.

12. The system of claim 10 where in order to render the audio item from the server the standalone speaker device is further operable to:

receive, from the touchscreen cellular phone, a control message directing the standalone speaker device to alter one of a volume parameter, a tone parameter, and a balance parameter of the standalone speaker device.

13. The system of claim 10 wherein the playlist is a recommended playlist algorithmically generated based on a playlist attribute, the playlist attribute chosen from the group consisting of a playlist name, a playlist number, a playlist unique identifier, a music type, a music genre, an artist, an audio item identifier identifying an audio item found in the playlist, an instrument, a record company, a region, a country, a state, a city, a school, a listening habit of the user, a listening habit of another user, and an ethnicity.

14. The system of claim 10 wherein the server further comprises a playlist server and a content server, and wherein the playlist server and the content server are separate devices, and wherein the standalone speaker device is further operable to:
stream the audio item; and
cache the audio item.

15. The system of claim 10 further comprising:
the server further operable to:
facilitate audio item browsing for the ones of the plurality of devices;
facilitate audio item searching for ones of the plurality of devices;
facilitate playlist browsing for ones of the plurality of devices; and
facilitate playlist searching for ones of the plurality of devices.

16. The system of claim 15, wherein the playlist are searchable by a playlist attribute, the playlist attribute chosen from the group consisting of a playlist name, a playlist number, a playlist unique identifier, a music type, a music genre, an artist, an audio item identifier identifying an audio item found in the playlist, an instrument, a record company, a region, a country, a state, a city, a school, a listening habit of the user, a listening habit of another user, and an ethnicity.

17. The system of claim 15 further comprising:
the server further operable to:
receive from the plurality of devices a plurality of requests to join a sharing service;
facilitate construction of a buddy list for ones of the plurality of devices; and
facilitate chat messaging between ones of the plurality of devices and other ones of the plurality of devices.

18. A system comprising:
a standalone speaker device comprising:
a first network transceiver facilitating communication between the standalone speaker device and a touchscreen cellular phone over a wireless network, wherein the standalone speaker device is operable to:
provide to the touchscreen cellular phone a device identifier that identifies the standalone speaker device;
receive from the touchscreen cellular phone a playlist, the playlist comprising a plurality of audio item indicators, each audio item indicator indicating an audio item, the audio item indicators arranged in a predetermined sequence for audio items indicated by the audio item indicators to be played in the predetermined sequence;
send to a server an audio item indicator;
receive, from the server, without user input at the standalone speaker device, an audio item indicated by the audio item indicator of the plurality of audio item indicators; and
render, by the standalone speaker device, without user input at the standalone speaker device, the audio item,
wherein the standalone speaker device is not directly connected to one of a stereo, television, and computer, and
wherein the standalone speaker device is not one of a stereo, television, and computer; and
the touchscreen cellular phone comprising:
a second network transceiver facilitating communication between the standalone speaker device and the touchscreen cellular phone over the wireless network, the touchscreen cellular phone and a server over the Internet, and wherein the touchscreen cellular phone is operable to:
receive from the standalone speaker device a device identifier that identifies the standalone speaker device; and
send to the standalone speaker device the playlist;
the server comprising:
a third network transceiver facilitating communication between the touchscreen cellular phone and the server over the Internet, wherein the server is operable to:
receive from the touchscreen cellular phone a playlist attribute;
send to the touchscreen cellular phone the playlist indicated by the playlist attribute;
receive from the standalone speaker device the audio item indicator;
send to the standalone speaker device the audio item indicated by the audio item indicator;
receive real-time activity information from ones of a plurality of devices enabled to access the standalone speaker device, wherein the touchscreen cellular phone is one of the plurality of devices; and
send the real-time activity information to other ones of the plurality of devices, wherein the real-time activity information reflects audio items rendered at the standalone speaker device.

19. The system of claim 18 further comprising:
the standalone speaker device further operable to:
join the wireless network;
broadcast wirelessly the standalone speaker device identifier on the wireless network; and
discover at least one other wireless standalone speaker device on the wireless network.

20. The system of claim 18 wherein the server further comprises a playlist server and a content server, and wherein the playlist server and the content server are separate devices, and wherein the standalone speaker device is further operable to:
stream the audio item; and
cache the audio item.

21. The system of claim 18 where in order to render the audio item from the server the standalone speaker device is further operable to:
receive, from the touchscreen cellular phone, a control message directing the standalone speaker device to alter one of a volume parameter, a tone parameter, and a balance parameter of the standalone speaker device.

22. The system of claim 18 wherein the playlist is a recommended playlist algorithmically generated based on a playlist attribute, the playlist attribute chosen from the group consisting of a playlist name, a playlist number, a playlist unique identifier, a music type, a music genre, an artist, an audio item identifier identifying an audio item found in the playlist, an instrument, a record company, a region, a country, a state, a city, a school, a listening habit of the user, a listening habit of another user, and an ethnicity.

23. The system of claim 18 further comprising:
the server further operable to:
facilitate audio item browsing for the ones of a plurality of devices;
facilitate audio item searching for the ones of the plurality of devices;

facilitate playlist browsing for the ones of the plurality of devices; and facilitate playlist searching for the ones of the plurality of devices.

24. The system of claim 23, wherein the playlist are searchable by a playlist attribute, the playlist attribute chosen from the group consisting of a playlist name, a playlist number, a playlist unique identifier, a music type, a music genre, an artist, an audio item identifier identifying an audio item found in the playlist, an instrument, a record company, a region, a country, a state, a city, a school, a listening habit of the user, a listening habit of another user, and an ethnicity.

25. The system of claim 23 further comprising:

the server further operable to:

receive from the plurality of devices a plurality of requests to join a sharing service;

facilitate construction of a buddy list for ones of the plurality of devices; and facilitate chat messaging between ones of the plurality of devices and other ones of the plurality of devices.

\* \* \* \* \*